(12) United States Patent
Bauknecht et al.

(10) Patent No.: US 7,927,247 B2
(45) Date of Patent: Apr. 19, 2011

(54) MULTI-SPEED AUTOMATIC TRANSMISSION

(75) Inventors: Gert Bauknecht, Friedrichshafen (DE);
Peter Ziemer, Tettnang (DE); Armin Gierling, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 701 days.

(21) Appl. No.: 11/659,462

(22) PCT Filed: Aug. 8, 2005

(86) PCT No.: PCT/EP2005/008600
§ 371 (c)(1),
(2), (4) Date: Feb. 11, 2008

(87) PCT Pub. No.: WO2006/015845
PCT Pub. Date: Feb. 16, 2006

(65) Prior Publication Data
US 2008/0269003 A1    Oct. 30, 2008

(30) Foreign Application Priority Data
Aug. 6, 2004 (DE) ................. 10 2004 038 286

(51) Int. Cl.
*F16H 3/62* (2006.01)
(52) U.S. Cl. ..................... 475/275; 475/276
(58) Field of Classification Search .......... 475/275–278, 475/284
See application file for complete search history.

(56) References Cited

U.S. PATENT DOCUMENTS

| 3,971,268 A | * | 7/1976 | Murakami et al. ........... 475/276 |
| 4,038,888 A | * | 8/1977 | Murakami et al. ........... 475/276 |
| 4,624,154 A | * | 11/1986 | Kraft et al. ........... 475/66 |
| 5,106,352 A | | 4/1992 | Lepelletier |
| 6,139,463 A | | 10/2000 | Kasuya et al. |
| 6,634,980 B1 | * | 10/2003 | Ziemer ........... 475/275 |
| 7,118,509 B2 | * | 10/2006 | Tabata et al. ........... 475/276 |
| 2002/0142880 A1 | | 10/2002 | Hayabuchi et al. |
| 2002/0183154 A1 | | 12/2002 | Ziemer |
| 2003/0083173 A1 | | 5/2003 | Miyazaki et al. |
| 2004/0072648 A1 | | 4/2004 | Dreibholz et al. |
| 2004/0116238 A1 | | 6/2004 | Ziemer |
| 2005/0085332 A1 | | 4/2005 | Ziemer |

FOREIGN PATENT DOCUMENTS

| DE | 199 49 507 | 4/2001 |
| DE | 101 15 987 | 10/2002 |
| DE | 102 50 373 | 7/2003 |
| DE | 102 10 348 | 10/2003 |
| DE | 102 21 095 | 7/2004 |
| DE | 103 18 565 | 11/2004 |

(Continued)

*Primary Examiner* — Ha D. Ho
(74) *Attorney, Agent, or Firm* — Davis & Bujold, P.L.L.C.

(57) ABSTRACT

An automatic transmission having input and output drive shafts (AN, AB), a planetary gearset (VS), a main planetary gearset (HS), with three uncoupled input elements and one output element, and shift elements (A, B, C, D, E, F). An input element of gearset (VS) couples with shaft (AN). An output element of gearset (VS) rotates slower than shaft (AN). An element of gearset (VS) is fixed to a transmission housing. The first input element of gearset (HS) is connected, via elements (B, C), to the output element of gearset (VS). The first input element of gearset (HS) is connectable, via element (F), with shaft (AN). The second input element of gearset (HS) is connectable, via element (A), with the output element of gearset (VS). The third input element of gearset (HS) is connectable, via elements (D, E), with shaft (AN). The output element of the gearset (HS) couples shaft (AB).

26 Claims, 26 Drawing Sheets

FOREIGN PATENT DOCUMENTS

| | | |
|---|---|---|
| EP | 0 997 663 | 5/2000 |
| EP | 1 375 962 | 1/2004 |
| EP | 1 510 728 | 3/2005 |
| JP | 2001182785 | 7/2001 |
| JP | 2001 349395 | 12/2001 |
| JP | 2002 295 609 | 10/2002 |
| JP | 2002 323 098 | 11/2002 |
| WO | WO 03/087624 | 10/2003 |
| WO | WO 03/095865 | 11/2003 |
| WO | WO 2005/026579 | 3/2005 |
| WO | WO 2005/100819 | 10/2005 |

* cited by examiner

| GEAR | ENGAGED SHIFTING ELEMENTS | | | | | |
|---|---|---|---|---|---|---|
| | A | B | C | D | E | F |
| 1 | ● | | | ● | | |
| 2 | ● | | ● | | | |
| 3 | ● | ● | | | | |
| 4 | ● | | | | | ● |
| 5 | ● | | | | ● | |
| 6 | | | | | ● | ● |
| 7 | | ● | | | ● | |
| 8 | | | ● | | ● | |
| R1 | | ● | | ● | | |
| R2 | | | | ● | | ● |

Fig. 1B
Prior Art

MULTI-SPEED AUTOMATIC TRANSMISSION

This application is a national stage completion of PCT/EP2005/008600 filed Aug. 6, 2004, which claims priority from German Application Serial No. 10 2004 038 286.7 filed Aug. 8, 2005.

FIELD OF THE INVENTION

The invention concerns a multistage automatic transmission.

BACKGROUND OF THE INVENTION

Automatic transmissions having a plurality of gear stages, which are not group shiftable, are known in many various designs. U.S. Pat. No. 5,106,352 discloses a 6-speed automatic transmission, with a simple transfer planetary gearset, is placed co-axially with a double carrier, four shaft, main-sided planetary gearset, which is designed as a Ravigneaux-planetary gearset. This design is provided with five shifting elements. Further, the transfer planetary gearset is constructed as a non-shiftable step down stage with a sun gear which is fixed to the transmission housing. The arrangement permits the output speed of rotation to be less than the speed of rotation of the input drive shaft of the automatic transmission. The output speed of rotation can be transferred by way of two clutches to two different elements of the main planetary gearset, wherein one of these two elements is fixed by a first brake to the transmission housing. This input element to the main planetary gearset, can optionally be connected to the output element of the transfer planetary gearset or fixed to the transmission housing. This input element in the following is designated as the "first input element of the main planetary gearset". Accordingly the other input element of the main planetary gearset, which again can be connected to the output element of the transfer planetary gearset, will be known in the following as the "second input element of the main planetary gearset". The speed of rotation of the drive shaft is directed through a third clutch to a third input element of the main planetary gearset and this third element is fixed to the housing of the transmission by a second brake. A fourth element of the main planetary gearset serves as the output element of the main planetary gearset and is exclusively, directly connected with an output shaft of the automatic transmission.

A plurality of alternative arrangements of the integral components in the automatic transmission described in U.S. Pat. No. 5,106,352 is disclosed in U.S. Pat. No. 6,139,463 and DE 102 10 348 A1.

In the unpublished DE 102 21 095.0 of the Applicant, an advanced development of the known 6-gear automatic transmission, as taught by the U.S. Pat. No. 5,106,352, is described. This development increases the number of available gears from six to seven. Further, in this development, compared to the U.S. Pat. No. 5,106,352, the transfer planetary gearset is constructed in a more simple, positive-planetary gearset in a double planetary gear construction and an additional sixth shifting element has been added. One carrier of the transfer planetary gearset forms, in this developed arrangement, an input element of the transfer planetary gearset, and is fixed to the input drive of the automatic transmission. A sun gear of the transfer planetary gearset can be fixed to the transmission housing as compared to the additional sixth gear stage of the U.S. Pat. No. 5,106,352. Correspondingly, a ring gear of the transfer planetary gearset serves as an output element of the transfer planetary gearset which output element can be connected to two different elements of the main gearset. This ring gear turns with a speed of rotation less than, or equal to, the speed of rotation of the input drive shaft. For this kinematic coupling of the individual gearset elements and shifting elements, DE 102 21 095.0 discloses a plurality of different arrangement embodiments of the transmission components wherein the components act in relation to one another.

In the JP 2001/182785A describes a further development of the 6-gear automatic transmission made known by U.S. Pat. No. 5,106,352, wherein the transmission is improved to have available an 8-gear shifting capability. Compared to the U.S. Pat. No. 5,106,352, the transfer planetary gearset now appears as a simple, non-shiftable positive-planetary gearset in a double construction and an additional sixth shifting element is added thereto. A carrier of the transfer planetary gearset forms, in this arrangement an input element of the transfer planetary gearset which is rigidly fixed to the input drive shaft of the automatic transmission. A sun gear of the transfer planetary gearset is anchored to a transmission housing. Correspondingly, a ring gear of the transfer planetary gearset forms the output element of the transfer planetary gearset. This output element can be connected with two different elements of the main gearset and always turns with a speed of rotation which is less than the speed of rotation of the input drive shaft. Compared to the U.S. Pat. No. 5,106,352, via the additional sixth shifting element, the first input element of the main gearset—can optionally be fixed with the main gearset or to the input element of the main gearset or, alternately, being anchored onto the transmission housing—can be fixed with the input drive shaft of the transmission. Taking into consideration the spatial arrangement of the shifting elements relative both to one another and to the planetary gearsets, JP 2001/182785 A proposes that the two shifting elements can be connected with the ring gear of the transfer planetary gearset, by way of the first and second input elements of the main gearset. Further, with the additional sixth element of U.S. Pat. No. 5,106,352 being axially positioned as an assembly unit between the transfer planetary gearset and the main gearset. When this is done, the situation is once again within the U.S. Pat. No. 5,106,352 known (fifth) shifting element, by way of which the input drive shaft can be connected with the third input element of the main gearset, upon the opposite side of which, this assembly unit can be placed, that is to say, on that side of the main gearset which is remote from the transfer planetary gearset. Further, the JP 2001/182785 teaches that arranging the additional sixth shifting element of the U.S. Pat. No. 5,106,352 within the component group, radially over the shifting element, by way of which the first input element of the main gearset can be connected with the ring gear of the transfer planetary gearset.

In the unpublished DE 10318565.8 of the Applicant, an improved component arrangement of the known 8-gear automatic transmission of JP 2001/182785 A is described. In relation to the basic construction of the 6-gear automatic transmission according to U.S. Pat. No. 5,106,352, in order to make only comparatively minor constructive changes, DE 103 18 565.8 proposes that the spatial arrangement of the transfer planetary gearset, with the known 6-gear automatic transmission, including the Ravigneaux main planetary gearset and the first five shifting elements being retained, while maintaining given relative locations in the transmission housing, the additional sixth shifting element is to be placed in the transmission housing on the side of the transmission proximal the driving motor axially between a transmission housing wall and a first shifting element. The output element of the transfer planetary gearset can be connected with the input element of the main gear train, via the sixth shifting element, as seen in the assembled state, between the transmission wall and the transfer planetary gearset. The additional sixth shifting element relative to the U.S. Pat. No. 5,106,352 is accordingly placed on the side of the transfer planetary gearset, remote from the main gear train.

The present invention, proposes to further develop the multi-speed automatic transmission as seen in JP 2001/182785 A and DE 103 18 565.8 to create alternate component assemblies for the planetary gearsets with eight transfer gears and the six shifting elements.

SUMMARY OF THE INVENTION

The invention is based on the JP 2001/182785 A, as well as the unpublished DE 103 18 565.8 of the Applicant, which described transmission possibilities for multi-speed automatic transmissions with at least eight forward gears, comprising an input drive shaft, an output drive shaft, a transfer planetary gearset made as a double planetary gearset, a main gearset made as a coupled planetary gearset with at least three uncoupled input elements, an output element, and at least six shifting elements. By way of selective engagement of two of the shifting elements, a speed of rotation of the input drive shaft is conveyed to the output drive shaft in such a manner, that to change from an existing driving gear to the next successive higher or lower gear, only one shifting element need be disengaged or engaged. The total disclosure of the DE 103 18 565.8 is hereby incorporated by reference as a part of the disclosure of the present invention.

One input element of the transfer planetary gearset is permanently connected with the input drive shaft. An output element of the transfer planetary gearset always turns at a speed of rotation, less than that of the input drive shaft. A third element of the transfer planetary gearset is fixed to the transmission housing. The output speed of rotation of the transfer planetary gearset can be transferred via two different input elements of the main planetary gearset. The speed of rotation of the input drive shaft can be diverted via two other shifting elements to two different input elements of the main planetary gearset. The output element of the main planetary gearset is permanently connected with the output drive shaft.

In an advantageous embodiment of this transmission design, as an 8-gear automatic transmission, a (coupled) carrier of the input-sided planetary gearset, forms an input element which is permanently coupled bound to the input drive shaft, a ring gear of the transfer planetary gearset, forms an output element, and couples with two different input elements of the main planetary gearset, and a sun gear of the transfer planetary gearset, forms a third element which is fixed to the transmission housing. The transfer gearset and the main planetary gearset are co-axial to one another. The main planetary gearset can be designed as a double-carrier, four shaft transmission, Ravigneaux planetary gearset, with a first sun gear as a first input element of the main planetary gearset, which can optionally be attached to the ring gear of the transfer planetary gearset or the input drive shaft or fixed to the transmission housing. In this case, a second sun gear would form a second input element of the main planetary gearset, which could be fixed to the ring gear of the transfer planetary gearset and have a (coupled) carrier as the third input element of the main planetary gearset which, can optionally be fixed with the input drive shaft or fixed to the transmission housing. Additionally, a ring gear serves as an output element of the main planetary gearset, which is permanently connected with the output drive shaft. In this case:

an input element of the first shifting element, is connected to the output element of the transfer planetary gearset;

an output element of the first shifting element, is connected to the second input element of the transfer planetary gearset;

an input element of the second shifting element is connected to the output element of the transfer planetary gearset;

an output element of the second shifting element, is connected to the first input element of the main planetary gearset;

an input element of the third shifting element, is connected to the transmission housing;

an output element of the third shifting element, is connected to the first input element of the main planetary gearset;

an input element of the fourth shifting element, is connected to the transmission housing;

an output element of the fourth shifting element, is connected to the third input element of the main planetary gearset;

an input element of the fifth shifting element, is connected to the input drive shaft;

and output element of the fifth shifting element, is connected to the third input element of the main planetary gearset;

an input element of the sixth shifting element, is connected to the input drive shaft;

an output element of the sixth shifting element, is connected to the first input element of the main planetary gearset, and the output element of the main planetary gearset is permanently connected to the output drive shaft.

The main planetary gearset can also be designed as a two-carrier, four-shaft transmission with two coupled, single carrier planetary gearset, such that, for example, the first input element of the main planetary gearset can be optionally connected, (a) with the ring gear of the transfer planetary gearset, (b) bound to the input drive shaft or c) connected to the first input element. The first input element comprises a sun gear of the first of the two single-carrier, planetary gearsets of the main planetary gearset and a carrier of the second of the two single-carrier planetary gearsets of the main planetary gearset. The second input element of the main planetary gearset, which can be connected to the ring gear of the transfer planetary gearset is formed by a sun gear of the second of the two single-carrier planetary gearsets of the main planetary gearset. The third input element of the main planetary gearset, which element can be optionally connected to the input drive shaft or be fixed to the wall of the transmission housing, can be formed by way of a carrier of the first of two single-carrier planetary gearsets of the main planetary gearset and of a ring gear of the second of the two single-carrier planetary gearsets of the main planetary gearset. A ring gear of the first of the two single-carrier planetary gearsets of the main planetary gearset can be connected as an output element of the main planetary gearset, which is continually connected with the output drive shaft. In this case, the connection of the input and the output elements of the six shifting elements corresponds to the three input elements of the main planetary gearset of the previously described example of the Ravigneaux main planetary gearset connection.

The main planetary gearset can also serve as a "three carrier, five shaft transmission" with three coupled single carrier planetary gearsets or yet form a "reduced three carrier, five shaft transmission" with three coupled single-carrier planetary gearsets, wherein at least two of these single carrier planetary gearsets are coupled together (i.e., reduced) by way of a common carrier and an additional common central gear (also either by way of their sun gears or by their ring gears). In manner analogous to the above, it is possible that the main planetary gearset can also serve as a "reduced" four-carrier, six shaft transmission, wherein the four, supposedly available and mutually connected, single-carrier planetary gearsets are combined, such that the main planetary gearset only need possess two carriers. In contrast to the connection of the six shifting elements to the input element of a main planetary gearset of the type "double-carrier, four shaft planetary transmission", in regard to the kinematic input and output elements of the third and sixth shifting elements relating to the main planetary gearset elements, various advantages are offered, among them being:

the input element of the third shifting element is fixed to the transmission housing;

the output element of the third shifting element is connected to the first input element of the main planetary gearset or is connected to an input element of the main gearset whose speed of rotation is similar tot his input element;

the input element of the sixth shifting element is connected to the input drive shaft, and the output element of the sixth shifting element is connected with the first input element of the main planetary gearset or is connected to an input element which has a speed of rotation similar to the input element of the main planetary gearset.

In all the embodiment, the shifting distribution includes: in the first forward gear, the first and the fourth shifting elements are engaged; in the second forward gear, the first and the third shifting elements are engaged; in the third forward gear, the first and the second shifting elements are engaged; in the fourth forward gear, the first and the sixth shifting elements are engaged; in the fifth forward gear, the first and fifth shifting elements are engaged; in the sixth forward gear, the fifth and sixth shifting elements are engaged; in the seventh forward gear, the second and fifth shifting element are engaged, and in the eighth forward gear, the third and fifth shifting elements are engaged. As to the reverse direction, the fourth shifting element and additionally the second or the sixth shifting elements are engaged.

According to the invention, it is proposed to use a servoapparatus for activating the sixth shifting element to rotate continually at the speed of rotation of the first input element of the main planetary gearset. The output element of the sixth shifting element, which is bound to the first input element of the main planetary gearset, under these conditions, picks up the servoapparatus of the sixth shifting element. As is generally customary, the servoapparatus of the sixth shifting element possesses a pressure chamber and a piston for activating a disk (set) of the sixth shifting element, and an additional pressure equalizing space for offsetting the dynamic coupling pressure of the rotating pressure chamber. Since the servoapparatus of the sixth shifting element now rotates at the output speed of rotation of the output of the sixth shifting element, and this output speed of rotation, is kinematically coupled to the output speed of rotation of the transmission, the control, i.e., the regulation, of the coupling pressure, in the course of shifting, evokes undesirable speed of rotation variations of the input drive shaft of the transmission, even when the dynamic pressure offsetting means has not been constructively, ideally designed or a dynamic pressure offsetting, in general, has not even been considered. Such undesirable speed of rotation variations can, for example, result from an out-of-round rotation of one of the internal combustion motors which drives the transmission. An additional advantage is the reduced level of speed of rotation of the servoapparatus—which is counter to the state of the technology—in the sixth shifting element in a considerable extent of the operation of the transmission, that is to say, in the first, second, third, seventh and eighth gears thereof. Advantageous for the supply of pressure means into the pressure chamber of the servoapparatus of the sixth shifting element is also the fact, that in the case of a gear change, from the third to the fourth forward gear, and from the seventh forward gear, the filling of this pressure chamber starts at a lower speed of rotation level than is found in the state of the technology.

A servoapparatus, which serves for the activation of the second shifting element, which is likewise kinematically coupled with the first input element of the main planetary gearset—in accordance with the spatial demand of the second shifting element, relative to the sixth shifting element and to the planetary gearsets—can rotate either at the same speed of rotation of the first input element of the main planetary gearset, or rotate at the same speed of rotation of the output element of the second shifting element. The servoapparatus of the second shifting element is either combined with the output element of the second shifting element, which the output element is connected with the first input element of the main planetary gearset or, on the other hand, becomes engaged with the input element of the second shifting element, which is connected to the output element of the transfer planetary gearset. As is generally conventional, the servoapparatus of the second shifting element incorporates at least one pressure chamber and a piston for the activating of a disk set of the second shifting element, and, advantageously, a pressure chamber to offset the dynamic coupling pressure of the rotating pressure chamber.

In a first embodiment of the invention, provision is made, in regard to the arrangement of components, that the second and the sixth shifting elements, when seen in a spatial manner, be placed in an area located axially between the transfer planetary gearset and a wall of the transmission housing, which extends radially. Again, in relation to space demand, this would be on the side of the transfer planetary gearset remote from the main planetary gearset. In this matter, it is also possible for the housing wall to be an outer wall of the transmission housing proximal to the drive motor of the transmission.

In a second embodiment of the invention, in regard to the order of components, provision is made, in which the second and the sixth shifting elements, seen spatially, are placed in an axial configuration, at least partially, in an area between the transfer planetary gearset and the main planetary gearset.

Accordingly with this arrangement, the second and the sixth shifting elements form a sub-assembly, which is located axially between the first and the third shifting element and/or axially between the first shifting element and the main planetary gearset and/or radially between the fifth and the third shifting element and/or between the fifth shifting element and the main planetary gearset and/or axially beside the first shifting element (particularly axially beside a disk set of the first shifting element) and/or axially beside the third shifting element (especially, beside a disk set of the third shifting element).

Thus, within the confines of several extended assemblies of these first and second inventive embodiments, there is proposed for the second and the adjacently situated sixth shifting elements, a common disc carrier, respectively built with differently designed construction. For example, this common disk carrier can be as an outer disk carrier of the sixth shifting element, inside disk carrier of the second shifting element or an outer disk carrier of the second shifting element and, moreover, an inner disk carrier of the sixth shifting element.

This can be further extended in that the design can be an outer disk carrier of both shifting elements. When viewed axially, it is possible that the disk set of the second shifting element in this arrangement, can be placed at least partially radially beyond, or at least partially radially below or even axially beside the disk packet of the sixth shifting element.

In a third embodiment of the invention, in regard to the arrangement of the components, provision can be made, that the sixth shifting element, spatially regarded, can be located partially in an area axially between the transfer planetary gearset and a radially extending housing wall of the transmission, again spatially seen, on the side of the transfer planetary gearset remote from the main planetary gearset, and the second shifting element is located at least partially in an area lying axially between the transfer planetary gearset and the main planetary gearset. Advantageously, the fifth shifting element is located between the transfer planetary gearset and the main planetary gearset, axially adjacent the transfer planetary gearset. The housing wall can be the outer wall of the transmission housing is proximal to the drive motor of the transmission.

In a fourth embodiment of the invention, in regard to the arrangement of the component, provision is made that the second shifting element, spatially observed, is to be placed partially in an are axially located between the transfer planetary gearset and a radially extending wall of the transmission housing, again seen spatially, on the side of the transfer planetary gearset, remote from the main planetary gearset, and the sixth shifting element, again seen as a spatial requirement, is placed at least partially in an area located axially between the transfer planetary gearset and the main planetary gearset. Advantageously, the second shifting element, in this arrangement, again spatially observed, is placed on the side of the first shifting element opposite from the sixth shifting element. The sixth shifting element, as seen from an occupied space requirement, can be placed between the fifth and the third shifting element and/or axially between the fifth shifting element and the main planetary gearset and/or axially beside the fifth shifting element and/or axially beside the third shifting element. The housing wall can be an outer wall of the transmission housing is proximal to the drive motor of the transmission.

In the case of the previously stated individual variations of the design arrangements of the second and the sixth shifting elements and their servoapparatuses, it is possible that the respective disk sets of the second and the sixth shifting elements, upon engagement of these elements—in regard to the pressure chamber associated with the piston of the individual servomechanism—can be activated by either compression or tension. Correspondingly, a plurality of variations can arise in regard to the spatial distribution of the individual pressure chambers for activating the disks of the second, i.e., the sixth shifting element and—insofar as the rotational pressure of the rotating pressure chamber is offset—the respective pressure offset chamber of the servoapparatuses of the second and sixth shifting element are located relative to one another and to the neighboring components.

In connection with a particular placement, with the disk set of the second shifting element being located at least radially partially above the disk packet of the sixth shifting element, there is room for a plurality of variants, which are detailed below, the features of which, at least partially, can be combined with one another:

the disk packet and the servoapparatus of the sixth shifting element are placed substantially within a clutch space of the second shifting element, which is formed by an outer disk carrier of the second shifting element;

the servoapparatuses of the second and the sixth shifting element are placed at least principally on the side of the disk sets of the second and sixth shifting element, remote from the transfer planetary gearset;

the pressure chamber of the servoapparatus of the sixth shifting element is placed closer to the transfer planetary gearset than the pressure chamber of the servoapparatus of the second shifting element;

the pressure chamber of the servoapparatus of the sixth shifting element, viewed axially, borders the pressure offset chamber of the servoapparatus of the second shifting element and is, in particular, separated from this disks of the common disc carrier for the second and the sixth shifting element;

the pressure chamber of the servoapparatuses of the second and sixth shifting elements are axially aligned and are in close proximity to one another, and are, in particular, separated from one another by way of disks of the common disk carrier for the second and the sixth shifting element;

the piston of the servoapparatus of the second shifting element (for example, an activation element bound with this piston for the activating of the disks of the second shifting element) includes in a outwardly extending radial direction the disk set of the second shifting element;

the pressure chamber of the servoapparatus of the second shifting element, when observed in a radial direction, is substantially radially positioned above the pressure chamber of the servoapparatus of the sixth shifting element;

the pressure offset chamber of the servoapparatus of the second shifting element, when observed along the axis, is at least substantially radially located above the pressure offset chamber of the servoapparatus of the sixth shifting element;

the pressure offset chamber of the servoapparatus of the second shifting element is filled with lubricating material by the pressure offset chamber of the servoapparatus of the sixth shifting element;

the pressure offset chamber of the servoapparatus of the second shifting element is placed nearer the transfer planetary gearset than the pressure chamber of the servoapparatus of the second shifting apparatus;

the pressure offset chamber of the servoapparatus of the sixth shifting element is placed nearer the transfer planetary gearset than the pressure chamber of the servoapparatus of the sixth shifting element.

In respect to placement, the disk set of the sixth shifting element, as seen in the axial direction, is located at least partially radially beyond a disk set of the second shifting element. From this arrangement, advantageous variations are possible, the features of which can be, at least partially, combined with one another. These variations follow:

the disk packet and the servoapparatus of the second shifting element are, substantially placed within a clutch space of the sixth shifting element, formed by an outer disk carrier of the sixth shifting element;

the servoapparatuses of the second and sixth shifting elements are axially aligned and placed proximate to the transfer planetary gearset, whereby the disk set of the second and sixth shifting element is placed on the side of servoapparatuses of the second and sixth shifting elements, remote from the transfer planetary gearset;

the pressure chamber of the servoapparatus of the second shifting element is placed in axial alignment to and contingent to the pressure offset chamber of the servoapparatus of the sixth shifting element and is separated therefrom by disks of the common disk carrier for the second and the sixth shifting elements;

the pressure chamber of the servoapparatuses of the second and the sixth shifting elements are axially aligned to and contingent to each other and are separated from each other by disks of the common disk carrier of the second and the sixth shifting elements;

the pressure chamber of the servoapparatus of the sixth shifting element, when seen in the axial direction, is placed substantially radially beyond the pressure chamber of the servoapparatus of the second shifting element;

the pressure offset chamber of the servoapparatus of the sixth shifting element, when seen in the axial direction, is substantially placed radially beyond the pressure offset chamber of the servoapparatus of the second shifting element;

the pressure offset chamber of the servoapparatus of the sixth shifting element is filled with lubricating material by way of the pressure offset chamber of the servoapparatus of the second shifting element;

the pressure offset chamber of the servoapparatus of the second shifting element is placed nearer to the transfer planetary gearset then the pressure offset chamber of the servoapparatus of the second shifting element; and the pressure offset chamber of the servoapparatus of the sixth shifting element is placed nearer to the transfer planetary gearset than the pressure offset chamber of the servoapparatus of the sixth shifting element.

Referring now to an assembly, the disk packet of the second and the disk set of the sixth shifting elements are located axially adjacent to one another, giving rise to the following advantageous variations, the features of which can be combined with one another:

the pressure offset chamber of the servoapparatus of the sixth shifting element is closer to the transfer planetary gearset than the pressure offset chamber of the servoapparatus of the second shifting element;

the piston of the servoapparatus of the sixth shifting element (i.e., an activation element bound with this piston for activating the disks of the sixth shifting element) axially overlaps in a radial direction the disk set of the second and the sixth shifting elements.

Now considering another arrangement the second shifting element, when spatially observed, is at least partially placed in an area, axially located between the transfer planetary gearset and the main planetary gearset and the sixth shifting element, when spatially observed is located partially on the side of the transfer planetary gearset remote from the main planetary gearset and the sixth shifting element has a dynamic pressure offsetting, from which emerge the following advantageous variations:

the pressure chamber of the servoapparatus of the sixth shifting element is closer to the transfer planetary gearset than the pressure offset chamber of the servoapparatus of the sixth shifting element, and the pressure offset chamber of the servoapparatus of the sixth shifting element is closer to the transfer planetary gearset than the pressure chamber of the servoapparatus of the sixth shifting element.

In a further arrangement, the second shifting element, when spatially observed, is at least partially placed on the side of the transfer planetary gearset, remote from the main planetary gearset, and the sixth shifting element, likewise spatially seen, is placed partially in a zone which is located axially between the transfer planetary gearset and the main planetary gearset and further, the sixth shifting element possesses a dynamic pressure offset, such that the pressure offset chamber of the servoapparatus of the sixth shifting element is closer to the transfer planetary gearset than the pressure chamber of the servoapparatus of that same shifting element.

Corresponding to the conventionally inventive component arrangements, provision can also be made, in that: the input element of the second shifting element, connected to the output element of the transfer planetary gearset, and/or the input element of the sixth shifting element, connected to the drive shaft of the transmission, can encompass in a radial outward manner the common disk set of the second and sixth shifting elements. In addition to the above, the output element of the second shifting element, attached to the first input element of the main planetary gearset and the output element of the sixth shifting element, attached to first input element of the main planetary gearset, can completely encompass the first and fifth shifting elements in a radial outward direction. Alternative to this, it is possible that the output element of the second shifting element can enter in the axial direction, a clutch space of the sixth shifting element which, by way of an external disk carrier, forms this sixth shifting element.

BRIEF DESCRIPTION OF THE DRAWINGS

The invention will now be described, by way of example, with reference to the accompanying drawings in which the reference numbers of comparable components are rendered the same in all corresponding Figures. There is shown in:

FIG. 1B is a shifting pattern of the transmission in accord with FIG. 1;

DETAILED DESCRIPTION OF THE INVENTION

Figure 1A:
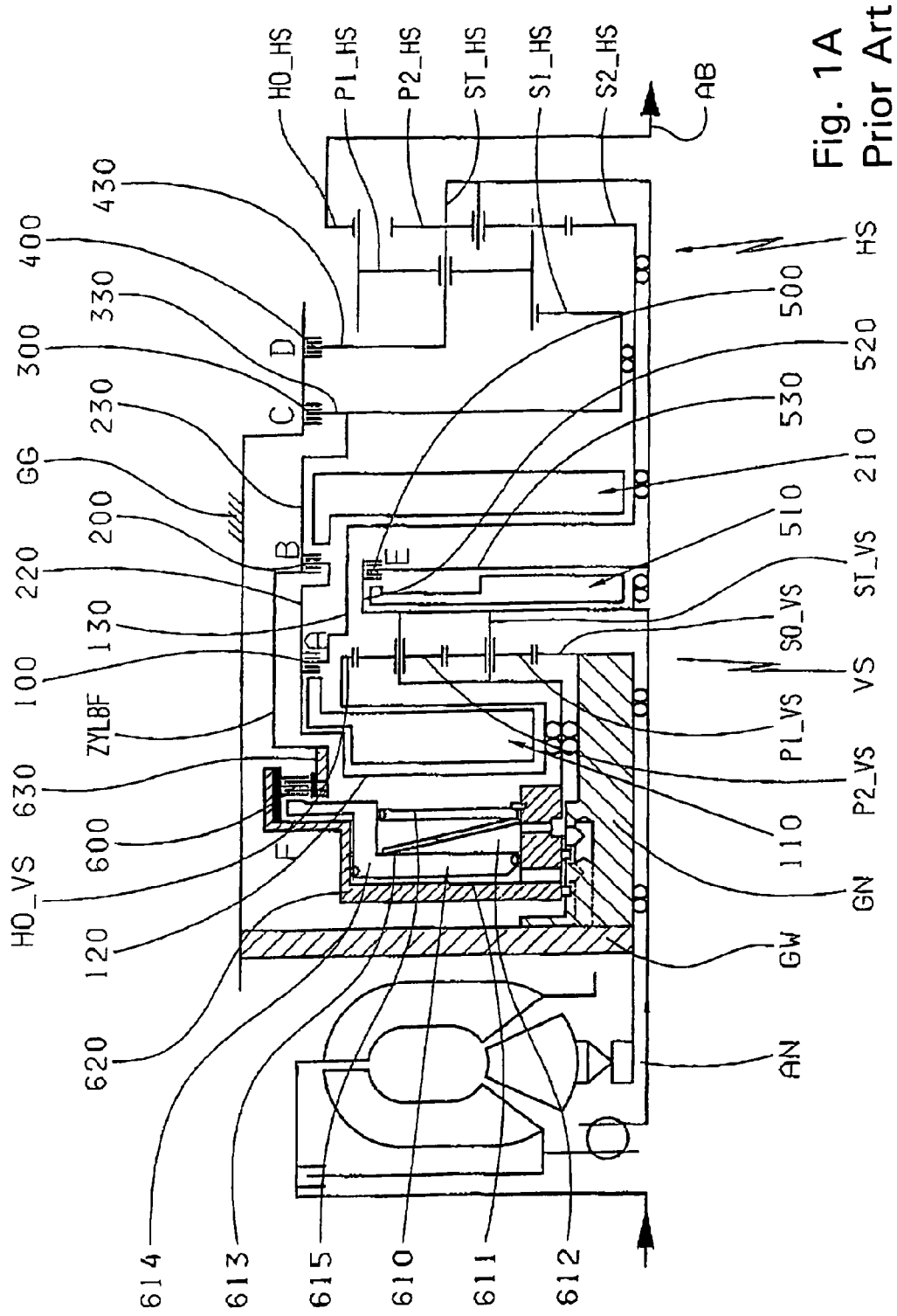
FIG. 1A is a transmission in schematic outline in accord with the conventional state of the technology.

To assure a complete understanding of the invention, as a first step, the basic state of the conventional technology of the invention will be explained. FIG. 1A shows the transmission scheme of the current, genetically developed state of the technology, as disclosed, for example, in DE 103 18 565.8, while FIG. 1B expresses the corresponding scheme of the shifting modes. In FIG. 1A the reference number AN designates an input (to the transmission) drive shaft of the illustrated automatic transmission. The drive shaft AN is in active connection in the automatic transmission with a driving motor (not shown) and in the depicted illustration is shown that the active connection of the drive shaft is by way of a torque converter with a torsion damper and a converter by-passing clutch. AB designates an output shaft running co-axially with the input drive shaft AN of the automatic transmission and is actively engaged with at least on other drive shaft of the vehicle. Obviously, it is possible, that instead of the torque converter, a frictional clutch could be used as an element for startup and acceleration in the automatic transmission and be set between the drive motor and the automatic transmission. A further possibility is that the drive motor can be connected with the input drive shaft AN of the transmission by only a simple torsion damper, a double-mass flywheel or a rigid shaft whereby, in such a case, a frictional shifting element must be installed within the automatic transmission to serve as an acceleration element of the transmission.

The automatic transmission possesses an transfer planetary gearset, namely VS and a principal, co-axially arranged gearset HS which is placed approximately beside the transfer gearset VS. The transfer gearset VS is designed in double planetary configuration, positive-planetary gearset with a ring gear HO_VS, having a sun gear SO_VS as well as a carrier ST_VS constructed from two individual carriers, onto which a gear engagement, which is torsionally mounted, is established with the inner planetary gears P1_VS, which mesh with the sun gear SO_VS and an outer planet gear P2_VS, which meshes with the inner planetary gears P1_VS and the ring gear HO_VS. In this arrangement, the transfer planetary gearset VS functions a non-shiftable reduction stage and produces an output speed of rotation, which, where value is concerned, is less than an input speed of rotation of the input drive shaft AN of the automatic transmission. In this respect, the sun gear SO_VS of the transfer planetary gearset VS is fixed to a transmission housing GG and the carrier ST_VS remains in continual connection with the drive shaft AN. The ring gear HO_VS forms also the output element of the transfer planetary gearset VS and can be connected by way of two shifting elements, namely A, B, with individual input elements of the main planetary gearset HS.

The main planetary gearset HS is designed as a coupled, double carrier, four shaft planetary gear train, with three uncoupled input elements and one output element, the construction form is that of Ravigneaux gearset, torsionally mounted with two sun gears S1_HS and S2_HS, one ring gear HO_HS as well as one coupled carrier ST_HS on the long planetary gears P1_HS, which mesh with the first sun gear S1_HS and the ring gear HO_HS, and short planetary gears P2_HS, which mesh with the second sun gear S2_HS and the long planetary gears P1_HS. In this way, the first sun gear S1_HS forms the first input element of the main planetary gearset HS, the second sun gear forms the second input element S2_HS of the main planetary gearset HS, the coupled carrier ST_HS forms the third input element of the main planetary gearset HS and the ring gear HO_HS forms the output element of the main planetary gearset HS.

The automatic transmission possesses, in total, six shifting elements A to F. The shifting elements A, B, E, and F are designed as clutches, while the shifting element C and D are brakes. In regard to this, the second sun gear S2_HS of the main planetary gearset HS, by way of the first shifting element A, can be bound to the ring gear HO_VS of the transfer planetary gearset VS. Furthermore, in this respect, the first sun gear S1_HS of the main planetary gearset HS, by way of the second shifting element B can be connected to the ring gear HO_VS of the transfer planetary gearset VS, by way of the third shifting element C, can be fixed to the transmission housing GG and by way of the sixth shifting element F, can be connected to the drive shaft AN. Further, in this matter, the carrier ST_HS of the main planetary gearset HS, by way of the fourth shifting element D can be affixed to the transmission housing GG and by way of the fifth shifting element E, can be connected with the drive shaft AN. As a result of this connection system, of the individual elements of the main planetary gearset HS with the individual shifting elements, the carrier ST_HS of the main planetary gearset HS can also be connected with the first sun gear S1_HS of the main planetary gearset HS, this being done by way of a simultaneous engagement of the fifth and the sixth shifting elements, namely E, F. The ring gear HO_HS of the main planetary gearset HS is continually and exclusively fixed to the output drive shaft AB.

Figure 1C:
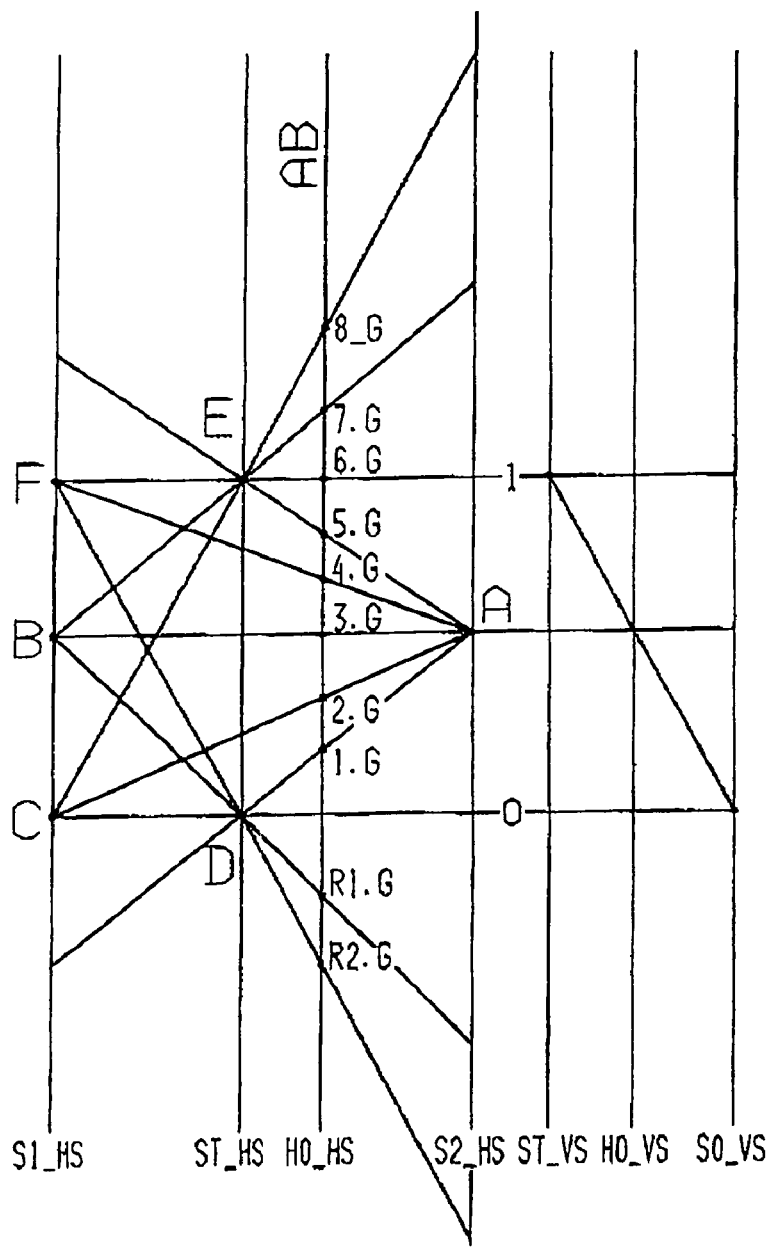
FIG. 1C is a speed of rotation chart of the transmission in accord with FIG. 1.

FIG. 1B shows a shifting pattern, as illustrated in FIG. 1A, of a multistage automatic transmission. There are a total of eight forward gear stages in free shifting in the group shifting manner which, when shifting out of the currently activated gear stage into the next higher or lower gear stage, respectively, only one shifting element need by disengaged and an addition shifting element engaged. In the first gear stage, namely "1", clutch A and brake D are engaged, in the second gear stage "2", clutch A and brake C are engaged; in the third gear stage "3" clutches A and B are engaged; in the fourth gear stage "4" clutches A and F are engaged; in the fifth gear stage "5" clutches A and E are engaged; in the sixth gear stage "6" clutches E and F are engaged; in the seventh gear stage "7" clutches B and E are engaged and in the eighth stage "8" brake C and clutch E. In a first reverse gear stage "R1" clutch B and brake D are engaged. It is possible that also a second reverse gear stage "R2" can be provided, in which clutch F and brake D are engaged. FIG. 1C shows a plan of speeds of rotation of the multistage, automatic transmission as illustrated in FIG. 1A.

Referring again to FIG. 1A, the disk set as well as the input and output elements of the shifting elements are designated as units. In other words, the disk set of the first shifting element A is designated with 100, the input element of the first shifting element A is referred to as 120, the output element of the first shifting element A is found under the number 130. Likewise a servoapparatus for the activation of the disk set 100 of the first shifting element A has the reference number 110. Correspondingly, the disk sets of the other shifting elements B, C, D, E and F fall under the respective reference numbers of 200, 300, 400, 500 and 600. The input elements of the other shifting elements B, E and F are, respectfully found under 220, 520 and 620. Correspondingly, the output elements of the shifting elements B, C, D, E and F are designated, again respectively, under 230, 330, 430, 530, and 630, while the servoapparatuses of the remaining clutches B, E and F, which activate the respective disk sets 200, 500 and 600 are, respectively numbered as 210, 510, and 610.

In consideration of the spatial arrangement of the shifting elements and gearsets relative to one another within the transmission housing GG, DE 103 18 565.8 teaches the following:

The fifth shifting element E, which is designed as a clutch, when observed spatially, is placed between the transfer planetary gearset VS and the main planetary gearset HS in an axial position, wherein it axially borders on the transfer planetary gearset VS. The second shifting element B, which likewise is designed as a clutch, is again placed between the transfer planetary gearset VS and the main planetary gearset HS, wherein the disk packet 200 of this clutch B, in spatial relationship, is located somewhat radially beyond the disk packet 500 of clutch E and the servoapparatus 210 of clutch B axially borders on clutch E on a side of clutch E remote from the transfer planetary gearset VS. Viewed axially in the direction of the main planetary gearset HS, first, the third shifting element C, which is designed as a brake, locks with clutch B, then the fourth shifting element D, likewise designed as a brake, attaches on clutch B and finally onto the main planetary gearset HS. The disk set 100 of the shifting element A, which is designed as a clutch, is, spatially observed, placed somewhat above the transfer planetary gearset VS. The servoapparatus 110 of clutch A is at least substantially on that side of the transfer planetary gearset VS, which is remote from the main planetary gearset HS. On that side of the servoapparatus 110 of clutch A, is remote from the transfer planetary gearset VS, when axially observed between clutch A and a input drive sided, transmission housing affixed housing wall GW, thus on the side of clutch A and the side of the transfer planetary gearset VS from the main planetary gearset HS, is placed the sixth shifting element F, which is designed as a clutch.

To provide a constructive model example for a servoapparatus of a shifting element, FIG. 1A shows the servoapparatus 610 of the sixth shifting element F in a more detailed depiction. Thus, this servoapparatus 610 is placed within a cylindrical shaped disk carrier, which forms the input element 620 of clutch F, and, correspondingly rotates at the speed of rotation of the input drive shaft AN of the transmission. The servoapparatus 610 possesses a pressure chamber 611, which is formed by way of a shell surface section of the disk carrier of clutch F and a piston 614 of the servoapparatus 610. By pressurizing of this pressure chamber 611, the piston 614 is forced against the counter-force of a reset element 613 of the servoapparatus 610, which is here pictured as a plate spring, hence moving toward the transfer planetary gearset VS. This movement then activates, i.e., engages the disk set 600 of clutch F. To attain, advantageously, complete offsetting of dynamic pressure of the rotating pressure chamber 611, the servoapparatus 610 has additionally a pressure offset chamber 612, which can be filled with a non-pressurized lubricant. The pressure offset chamber 612 is formed by a surface of the piston 614 and a sealing plate 615. The input element 620 is rotatably mounted on a transmission housing fixed hub GN, which extends outward and axially from the point of being fixed on the transmission housing wall GW in the interior of the transmission housing GG in the direction of the transfer planetary gearset VS up to the sun gear SO_VS of the transfer planetary gearset VS and is rotationally fixed with this sun gear SO_VS. Correspondingly, this transmission housing affixed hub GN possesses also feed channels for conducting pressure and lubricating fluids to the pressure offset chamber or the pressure offset chamber of clutch F.

All of the following inventive examples of a transmission scheme, that is to say, a constructed assembly in accord with the present invention, are based on the principles given by the presented kinematic structure in keeping with FIG. 1A showing the automatic transmission in accord with the state of the technology. This means, respectively, an assembly with an input drive shaft AN, an transfer planetary gearset VS as a positive-planetary gearset in double planetary structure, which, via one of its shifting elements is always connected to the input drive shaft AN and accordingly produces an output speed of rotation is less than the speed of rotation of the input drive shaft AN, and has a main planetary gearset HS which is co-axially to the transfer planetary gearset VS, which has at least two mutually coupled planetary gearsets, and possesses at least three independent input elements and one subordinate output element, along with six shifting elements A to F, the selective closing of which, the speed of rotation of the input drive shaft AN can be so transmitted between the transfer- and main planetary gearsets VS, HS, producing at least eight forward gear stages. In this arrangement, the output speed of rotation of the transfer planetary gearset VS can be transmitted to via first and second shifting elements A and B to two different input elements of the main planetary gearset HS. In addition, the speed of rotation of the input drive shaft AN, by way of a fifth shifting element E can be transferred to a third input element of the main planetary gearset. Further, the speed of rotation of the input drive shaft AN, by way of a sixth shifting element F can be transmitted to the input element of the main planetary gearset HS which also, by way of the second shifting element B can be connected to the output element of the transfer planetary gearset VS. In addition, the output element of the main planetary gearset HS is continually connected with the output drive shaft AB of the transmission.

Seven different inventive transmission schemes, shown in FIGS. 2 to 8, are based, first, on the presented gearset types shown in FIG. 1A of the main planetary gearset HS, namely a Ravigneaux main planetary gearset and, second, on the component assembly shown in FIG. 1A regarding the gearsets and shifting elements within the transmission.

Now observing FIG. 2, a first exemplary transmission scheme in accord with the present invention will be explained, based on the transmission scheme as set forth in FIG. 1A, which followed the state of the technology. As is easily seen in FIG. 2, the kinematic structure of the transmission incorporated the arrangement of FIG. 1A, which includes a input drive shaft AN, and an output drive shaft AB, running co-axially to the input drive shaft AN, the structure further possesses a positive-planetary gearset of a double planetary construction, this is designated as the transfer planetary gearset VS, and having, co-axial to the transfer planetary gearset VS, a main planetary gearset HS, which is built as a coupled two-carrier, four shaft, planetary gearset in the fashion of the Ravigneaux gearset with two sun gears, namely S1_HS, S2_HS and only one ring gear HO_HS, and also possesses six selective, pairwise, shiftable shifting elements A to F for transmitting a speed of rotation from the input drive shaft AN via the transfer planetary gearset VS and the main planetary gearset HS to the output drive shaft AB. As is featured in FIG. 1A, a sun gear SO_VS of the transfer planetary gearset VS is fixed to the transmission housing and a coupled carrier ST_VS of the transfer planetary gearset VS is bound in a rotationally fixed manner to the input drive shaft AN, whereby a ring gear HO_VS of the transfer planetary gearset VS produces, when compared to the input drive shaft AN, a lower speed of rotation of the transfer planetary gearset VS. Again as in FIG. 1A, the first sun gear S1_HS of the main planetary gearset HS forms the first input element thereof and can be connected by way of clutch B with the ring gear HO_VS of the transfer planetary gearset VS and by way of clutch F can be bound to the input drive shaft AN. Further, by way of the brake C, the first sun gear S1_HS can be connected to the transmission housing GG. The second sun gear S2_HS of the main planetary gearset HS is the second input element thereof can be connected by way of clutch A with the ring gear HO_VS of the transfer planetary gearset VS. Further, a coupled carrier ST_HS of the main planetary gearset HS, which is the third input element, by way of clutch E, can be connected with the input drive shaft AN and by way of the brake D can be affixed to the transmission housing wall GG. The single ring gear HO_HS of the main planetary gearset HS, which is the output element thereof, and which is always rotationally fixed to the output shaft AB. As to even further possible arrangements of the main planetary gearset, explanations will be provided later.

Figure 2:
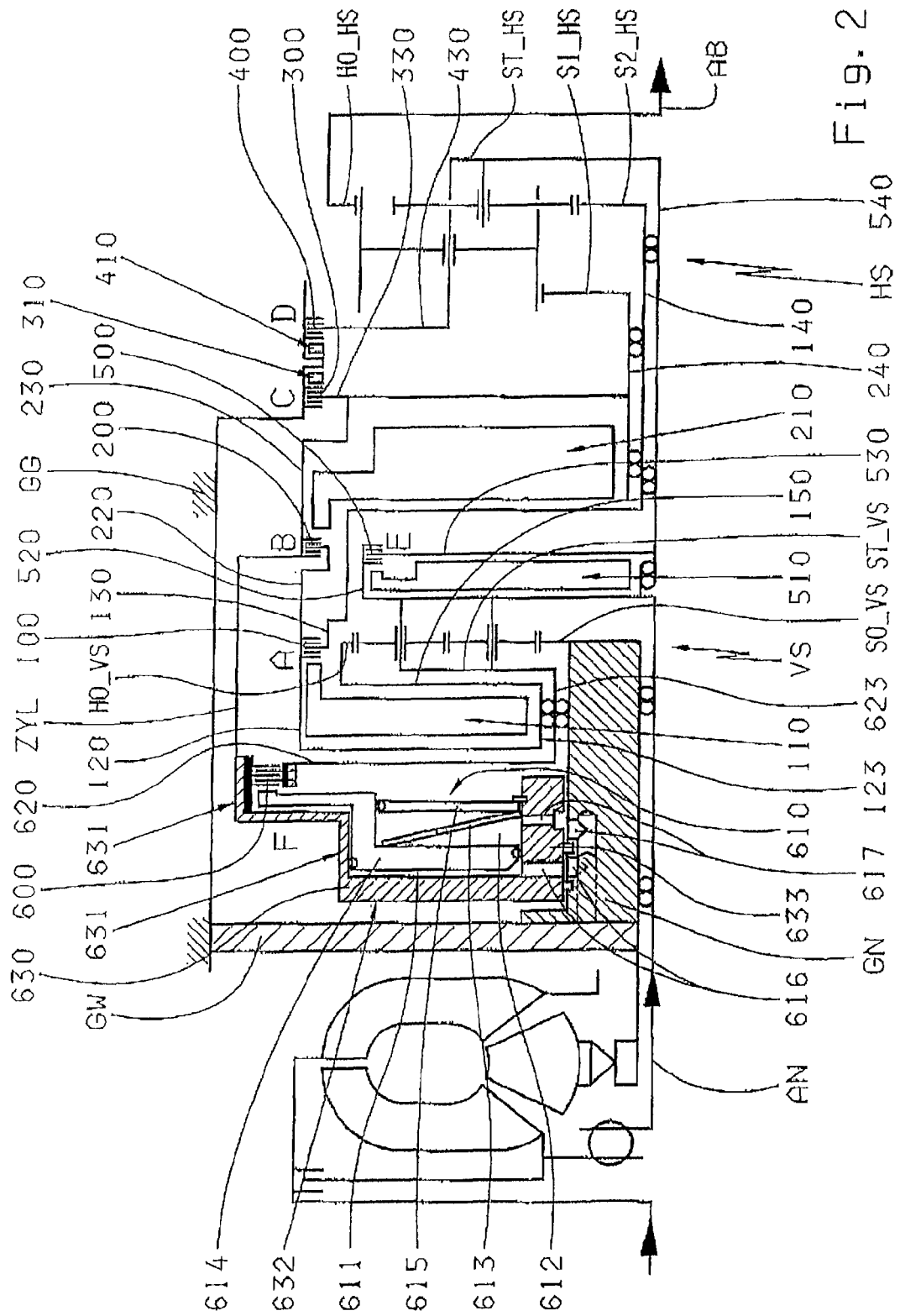
FIG. 2 is a first scheme of an inventive transmission.

It is readily seen in FIG. 2, that even the component arrangement of the gearsets and the shifting elements within the transmission can essentially be inferred from FIG. 1A. The changes in relation to FIG. 1A concern the kinematic connections of clutch cylinder of the sixth shifting element F. This cylinder is located on the main planetary gearset HS side of the transfer planetary gearset VS and is aligned beside the fixed transmission wall GW and located radially beyond the fixed transmission hub GN. Within the sixth shifting element F, is installed the disk set 600 of this clutch as well as the servoapparatus 610 for the activation of the disk set 600. Under circumstances wherein this clutch cylinder in FIG. 1A still forms the input element of clutch F, which is rotationally fixed to the input drive shaft AN, the result being this clutch cylinder in FIG. 2 now forms the input element 630 of clutch F which, corresponding to the conventional coupling of clutch F, becomes rotationally fixed to the first sun gear S1_HS of the main planetary gearset HS—wherein the first sun gear forms the first input element of the main planetary gearset HS. Thus, the servoapparatus 610 of clutch F rotates continually with the speed of rotation of this first sun gear S1_HS.

Similar to the depiction in FIG. 1A, clutch E directly axially borders the transfer planetary gearset VS on the main planetary gearset HS proximal side thereof. The input element 520 of clutch E is bound with a proximal carrier plate of the coupled carrier ST_VS of the transfer planetary gearset VS and is also connected to the input drive shaft AN. Further, in an exemplary manner, the input element 520 also serves as the carrier for the outer disks of the disk set 500 of clutch E. The output element 530 of clutch E is, for example, designed as a substantially disk-shaped carrier for the retention of the inner disks of the disk packet 500 of clutch E. This is further rotationally fixed by way of a carrier shaft 540 with the coupled carrier ST_HS of the main planetary gearset HS—which, in this case, forms the third input element of the main planetary gearset HS—whereby the carrier shaft 540 centrally penetrates the main planetary gearset HS in the axial direction. Geometrically, the disk packet 500 of clutch E, for instance, is installed radially within the ring gear HO_VS of the transfer gear set VS. A servoapparatus 510 (for sake of simplicity, only schematically indicated in FIG. 2) for activation of the assigned disk sets 500 is placed radially within the interior space of the cylinder, which, by way of the input element 520, then forms the outer disk carrier of clutch E. Upon the engagement of clutch E, this servoapparatus 510 activates the disk set 500 assigned thereto in an axial direction toward the main planetary gearset HS. Advantageously, this servoapparatus 510 also possesses a dynamic pressure offset means, since it rotates continually with the speed of rotation of the input drive shaft AN.

As is exhibited in FIG. 1A, a disk set 100 associated with clutch A is placed in an area radially beyond the transfer planetary gearset VS. An input element 120 of clutch A is rotationally fixed to the ring gear HO_VS of the transfer planetary gearset VS and is, for example, designed as a disk carrier for the outer disks of this disk set 100 and receives within its cylinder space (only schematically illustrated) a servoapparatus 110 for the activation of the disk set 100, whereby this servoapparatus 110, spatially observed, is placed substantially on the side of the transfer planetary gearset VS remote from the main planetary gearset HS and the disk set 100, which is assigned thereto, upon the engagement of clutch A, is activated in the direction of the main planetary gearset HS. Advantageously, the servoapparatus 110 possesses also a dynamic pressure offset means, since it continually rotates at the speed of the ring gear HO_VS of the transfer planetary gearset VS. The output element 130 of clutch A is, for example, constructed as a cylindrical internal disk carrier for the inner disks of the disk set 100 of clutch A, the output element also radially includes clutch E and by way of a second sun gear 140 and is rotationally fixed to the second sun gear S2_HS of the main planetary gearset which is remote from the transfer planetary gearset VS—which here, for example, forms the second input element of the main planetary gearset HS. Thereby, this second sun gear shaft 140 penetrates centrally and radially at least the part of the main planetary gearset, proximal to the transfer planetary gearset VS and thereby includes the carrier shaft 540. Advantageously, the second sun gear shaft 140 is also rotatably placed on the carrier shaft 540.

As shown in FIG. 1A, a disk set 200 of clutch B is placed in an area radially located above clutch E. An input element 220 of this clutch B, which is rotationally fixed to the input element 120—this being the outer disk carrier of clutch A—is, for example, designed as an disk carrier for the inner disks of the disk set 200 of clutch B. Seen in a space regarded view, a cylindrical section of the output element 130—this being the inner disk carrier of clutch A—runs radially between the input element 220, which is the internal disk carrier of clutch B and the outside diameter of the input element 520, which is the external disk carrier of the radially, internally situated clutch E. An output element 230 of clutch B correspondingly serves as the disk carrier for the outer disks of the disk set 200 of clutch B. This output element 230 of clutch B is, geometrically speaking, constructed in the form of a pot which is disengaged in the direction of the transfer planetary gearset VS and is, by way of a first sun gear 240, rotationally affixed to the first sun gear S1_HS of the main planetary gearset HS, which is proximal to the transfer planetary gearset VS—this does, in this case, form the first input element of the main planetary gearset HS. This first sun gear 240 radially includes a section of the second sun gear 140 and is, advantageously, also rotatably mounted on this second sun gear shaft 140. As example, it is possible that the hub of the output element 230 and the sun gear shaft 240 can be formed as a single element. Within its cylinder space, the output element 230, i.e., the external disk carrier of clutch B, holds a (in FIG. 2, only shown schematically for simplicity) servoapparatus for the activation of the disk set 200 of clutch B, whereby this servoapparatus 210, seen from a space perspective, is placed on that side of the disk carrier 200 proximal to the main planetary gearset HS and axially borders a plate shaped section of the output element 130, that is to say, the inner disk carrier of clutch A. Upon engagement of clutch B, this servoapparatus 210 activates the disk set 200 assigned thereto in an axial direction toward the transfer planetary gearset VS. Advantageously, the servoapparatus 210 has a dynamic pressure offset means, since it rotates always at the rotational speed of first sun gear S1_HS of the main planetary gearset HS.

As has already been mentioned, the output element 630 of clutch F is designed as the external disk carrier for the outer disks of the disk set 600 of clutch F and when seen from a spatial perspective, directly neighbors the housing wall GW fixed to the transmission wall, which, in this case, for example, forms an outside wall of the transmission housing GG. This outside wall GW, is proximal to the drive motor of the transmission, the drive motor is not shown for example, is by way of a torque converter actively bound to the input drive shaft AN. Insofar as possible, the transmission housing affixed hub GN, which axially extends from the housing wall GW into the transmission interior in the direction of the transfer planetary gearset VS and is fixed on the sun gear SO_VS of the transfer planetary gearset VS and is also located radially beyond clutch F, and can further serve as a directing shaft of this torque converter. Geometrically speaking, the output element 630, that is, the external disk carrier of clutch F is designed as a pot open in the direction of the transfer planetary gearset VS and at the same time open toward the main planetary gearset HS and has a hub 633, a disk shaped pot bottom 632 and an angled cylindrical section 631. The hub 633 of the output element 630, also known as the external disk carrier of clutch F, is rotatably affixed to the transmission fixed hub GN. The disk shaped pot bottom 632 is attached to the hub 633 of the output element 630, i.e., external disk carrier of clutch F, extends parallel to and borders the housing wall GW in a radially outward direction and extends to an outside diameter in the angled, cylindrical section 631 of the output element 630, which is, for example, the external disk carrier of clutch F. This angled, cylindrical section 631 extends axially in the direction of the transfer planetary gearset VS and is here shown approaching the midpoint of the transmission housing affixed hub GN and possesses in the area of its end, proximal to the transfer planetary gearset VS, an engaging profile for the retention of the external disks of the disk set 600 of clutch F.

The servoapparatus 610 of clutch F, which includes a pressure chamber 611, a pressure offset chamber 612, a piston 614, a reset element 613 and a sealing plate 615, is completely placed within a cylindrical space, is created by the output element 630, that is to say, by the external disk carrier of clutch F, which is located essentially radially beyond the hub 633. The piston 614 is slidably fixed on the output element 630, i.e., on the external disk carrier of clutch F. Correspondingly, the servoapparatus 610 rotates continually at the speed of rotation of the first input element (thus in this case, the first sun gear S1_HS) of the main planetary gearset HS. For the offsetting of pressure of the rotating pressure chamber 611 of the servoapparatus, 610, there is provided a dynamic pressure compensator with the pressure offset chamber 612, which is at atmospheric pressure and filled with lubrication fluid. This pressure offset chamber 612 is placed nearerto the transfer planetary gearset VS (as well as to the main planetary gearset HS) than the pressure chamber 611. In this way, the pressure chamber 611 is formed the piston 614 and by way of the shell surface of the output element 630, which is the external disk carrier of clutch F. The pressure offset chamber 612 is created by way of the piston 614 and the sealing plate 615, which is axially fixed on the end of the hub 633 proximal to the transfer planetary gearset and, in relation to the piston 614, is axially slidable and sealed off by lubricant fluid. The piston 614, for example, is axially held in tension as a reset element 613 is constructed as a plate spring, and thereby forced against the hub 633 of the output element 630, that is, against the external disk carrier of clutch F. In the case of the filling of the pressure chamber 611 with pressurizing fluid to engage clutch F, the piston 614 moves axially in the direction of the transfer planetary gearset VS (and the main planetary gearset HS) and activates its assigned disk set 600 counter to the spring force of the reset element 613.

On the basis of the placement of the output element 630, that is to say, on the basis of the external disk carrier of clutch F on the transmission housing affixed hub GN, there arises a constructively relative simple pressure and lubricant feed to clutch F by way of corresponding channels, i.e., borings, which run partially within the housing hub GN and partially within the hub 633 of the output element 630 of clutch F. A pressure medium feed to the pressure chamber 611 of the servoapparatus 610 of clutch F is designated with the reference number 616, a lubrication means feed to the pressure offset chamber 612 of the servoapparatus 610 is found under the number 617.

The speed of rotation and the transmission of this rotation between the output element 630, that is, the external disk carrier of clutch F, and the first sun gear S1_HS of the main planetary gearset HS is achieved via a cylindrical connection element ZYL, the output element 230, which is the external disk carrier of clutch B, and the axial short second sun gear 140. This cylindrical connection element ZYL is, geometrically speaking, constructed as a pot, opening in the direction of housing wall GW, with a disk-shaped pot bottom and with a cylindrical shaped outer casing, which completely overlaps the transfer planetary gearset VS and clutch A in the axial direction. The pot bottom of the connection element ZYL is, in regard to its inside diameter, in the area of the disk set 200 of clutch B, rotationally fixed with the output element 230, that is to say, with the external disk carrier of clutch B. The cylindrically shaped casing of the connection element ZYL, fixed to the outside diameter of the pot bottom, extends axially in the direction of the housing wall GW up to the disk set 600 of clutch F and is, in this area rotationally fixed to the output element 630, which is the external disk carrier of clutch F, for example, by way of a shaped fit.

Corresponding to the design of the output element 630 of clutch F, serving as an external disk carrier, is the input element 620 of clutch F, which is kinematically bound to the input shaft AN, is designed as an inward disk carrier for the inner disks of the disk carrier 600 of clutch F. In the embodiment shown in FIG. 2, the input element 620 of clutch F possesses a hub 623 which, when considered from a spatial point of view, is axially placed between the hub 633 of the output element 630 of clutch F and the sun gear SO_VS of the transfer planetary gearset VS, wherein the placement is rotatably fixed on the transmission housing connected hub GN. This hub 623 of the input element 620 of clutch F is on the side of clutch F which is proximal to the transfer planetary gearset VS and is connected with a carrier plate of the coupled carrier ST_VS of the transfer planetary gearset VS. The plate being remote from the main planetary gearset HS such that the carrier ST_VS again, by way of a carrier plate proximal to the main planetary gearset, is connected with the input drive shaft AN in a rotationally fixed manner. At this position, mention should be made, that a hub 123 of the input element 120 of clutch A is rotatably mounted on the hub 623 of the input element 620 of clutch F, whereby this hub 623 of the input element 120 of clutch A is located on its side closer near to the transfer planetary gearset, and is held by a profiled complementary connection 150 of the carrier ST_VS, which axially borders on that side of remote from the main planetary gearset HS and is rotationally fixed to the ring gear HO_VS of the transfer planetary gearset VS.

As in FIG. 1A, the brake C, for example, is designed as a disk brake with a disk set 300. This disk set 300 is, when spatially considered, placed in an area radially located over the pot bottom of the output element 230, that is, the external disk carrier of clutch B, and at least partially within the same diameter as the disk set 200 of clutch B. An output element 330 of the brake C, which is constructed as an internal disk carrier for the inner disks of the disk carrier 300 also of the brake C, is, as shown in FIG. 1, rotationally fixed with the output element 230, i.e., the outer disk carrier of clutch B in the area of the pot bottom and thus, by way of this output element 230, connected with first sun gear S1_HS of the main planetary gearset HS. Again, in FIG. 1A, the brake D, which likewise serves, for example, as a disk brake with a disk set 400, engages on the brake C in the direction, axially seen, of the main planetary gearset HS, whereby an output element 430 of this brake D, serving a disk carrier for the inner disks of the disk set 400, on that side of the main planetary gearset HS which is proximal to the transfer planetary gearset VS is rotationally fixed to the coupled carrier ST_HS of the main planetary gearset HS—which in this case, for example, forms the third input element of the main planetary gearset HS. In the embodiment shown in FIG. 2, the external disk carrier of the two brakes C and D are integrated in the transmission housing GG and are, obviously, able to operate as separate components, which, under those circumstances, are then rotationally fixed to the transmission housing. In FIG. 2, a servoapparatus 310 is indicated, which belongs to the brake C for the activation of the disk set 300 and also shown is a servoapparatus 410 of the brake D for the activation of the disk set 400, whereby these two servoapparatuses, namely 310, 410, are placed here, for example, between the disk sets 300 and 400. Obviously, it is possible that brake C and/or brake D can also be constructed as band brakes. Should the transmission scheme in accord with FIG. 2 be modified such that the input and output drives were not co-axial, the expert would place the brake D differently than shown in FIG. 2, on that side of the main planetary gearset HS remote from the transfer planetary gearset VS. Especially in a case of such a non-co-axial input and output drive, there is available for the brake C, a spatial position, not seen in FIG. 2, within the transmission housing GG, namely bordering on the housing wall GW and located radially beyond the angled area of the external disk carrier 630 of clutch F, in particular, radially also above the pressure chamber 611 of the servoapparatus 610 of clutch F.

Figure 3:
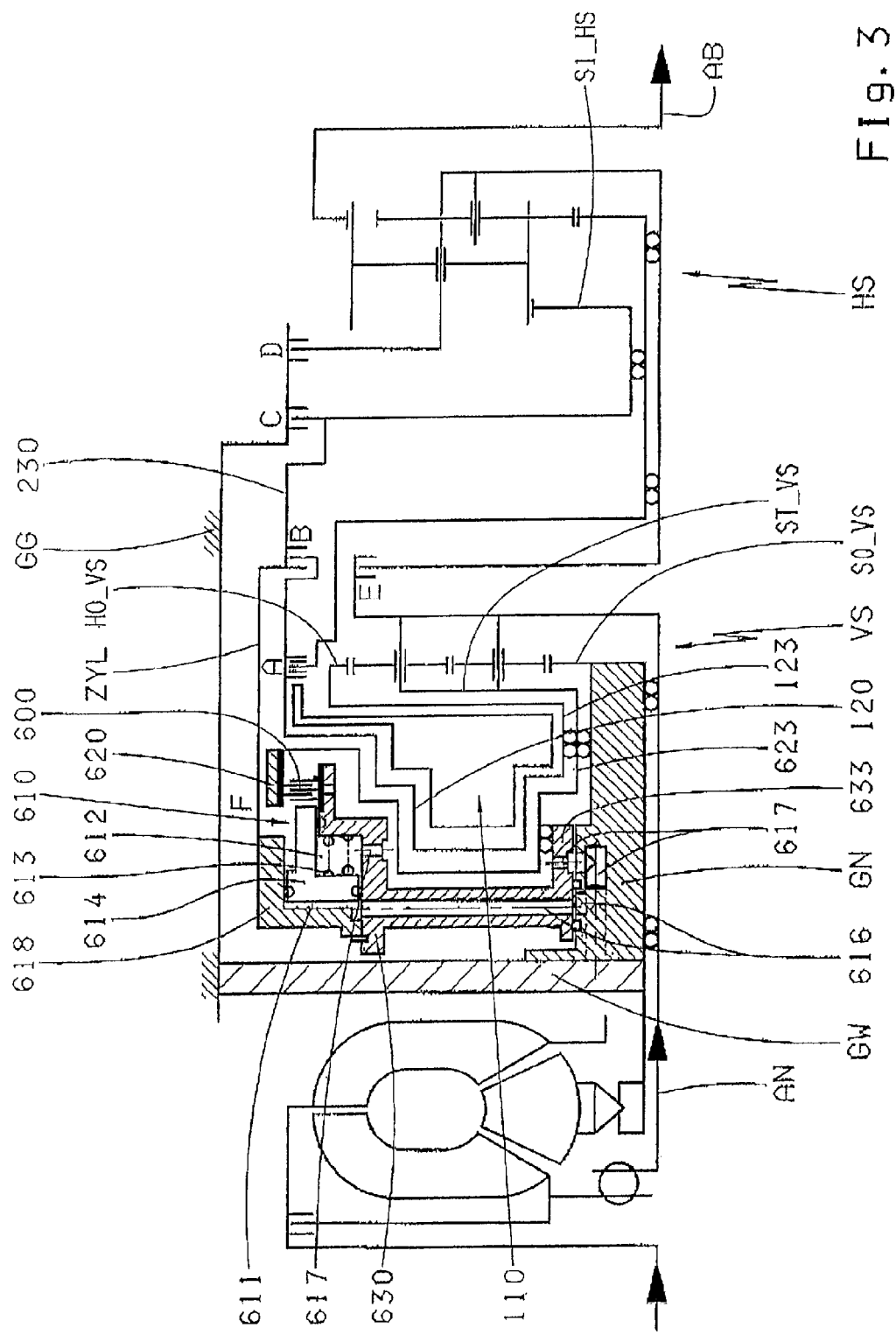
FIG. 3 is a second scheme of an inventive transmission.

Now taking up FIG. 3, the following explanation will cover a second exemplary transmission scheme in accord with the present invention. The difference to the foregoing descriptions, particularly of FIG. 2, wherein an explanation was given in detail of the first inventive transmission scheme, concerning the constructive formation of the output element 630 of clutch F and the design details of the servoapparatus 610 for the activation of the disk set 600 of clutch F. As far as those explanations go, the description of details in FIG. 3 can be limited in that regard.

FIG. 3 makes evident, that by way of the cylindrical shaped connection ZYL and the output element 230 of clutch B, with the output element 630 of clutch F, which is located in the neighborhood of the transfer planetary gearset VS and is connected with the first sun gear S1_HS of the main planetary gearset HS. The output element is now serving as a disk carrier for the retention of inner disks of the disk set 600 of clutch F. As shown in FIG. 2, this output element 630 borders, in this arrangement, on the transmission housing affixed wall GW, which forms an outer wall of the transmission housing GG on that side of the transfer planetary gearset VS opposite the main planetary gearset HS. Further, the output element 630 is rotatably connected with hub 633 on the transmission housing fixed hub GN, extends from the housing wall GW into the transmission interior up to the sun gear SO_VS of the transfer planetary gearset VS and engages the servoapparatus 610 of clutch F. Similar to FIG. 2, the hub 623 of this input element 620 is likewise rotatably mounted on the transmission housing fixed hub GN and, indeed, is in the area between the transfer planetary gearset VS and the radial placement point of the output element 630 on the hub GN. Likewise, as in FIG. 2, the input element 120 of clutch A, which, serving as clutch coupling cylinder takes on the disk set 100 and clutch A, as well as the servoapparatus 110 for activation of this disk set 100, is located essentially axially between clutch F and the transfer planetary gearset VS, whereby the disk set 100 of clutch A is placed in an area located axially above the transfer planetary gearset VS, the hub 123 of the input element 120, however, is placed on that side of the transfer planetary gearset VS proximal to clutch F on the hub 623 of the input element 620 of clutch F.

As can be further inferred from FIG. 3, the output element 630, that is, the interior disk carrier of clutch F, possesses an essentially cylindrical shaped structure, which is rotationally bound with a hub 633, as already mentioned on the transmission housing fixed hub GN with a disk shaped section, which extends from the hub 633 in an axially bordering manner and, for example, substantially parallel to the housing wall GW toward the outside, as well as with a staged cylindrical shaped section, which extends away from the outside diameter of the disk-shaped section of the output element 630, that is to say, of the interior disk carrier of clutch F in an axial direction toward the transfer planetary gearset VS up to the disk set 600 of clutch F. In the area of its end, which is proximal to the transfer planetary gearset, this graduated cylindrical shaped section of the output element 630, that is to say, of the inner disk carrier of clutch F, has on the outside diameter an appropriate shape-closure profile for the retention of the inner disks of the disk set 600. In the area of that end, which is proximal to the housing wall of the output element 630, that is, of the inner disk carrier of clutch F, somewhat radially located over the disk shaped section of the output element 630, that is, of the inner disk carrier of clutch F, is a cylindrical support structure 618 with its inside diameter rotationally fixed on the outside diameter of the graduated cylindrical shaped section of the output element 630, that is of the inner disk carrier of clutch F. A disk shaped section of this support structure 618 extends away from the outside diameter of the output element 630, that is the inner disk carrier of clutch F, for instance, substantially continuing parallel to the housing wall GW and radially outward approximately to the outside diameter of the disk set 600 of clutch F and continues to extend into a cylindrical ring formation section, which extends axially in the direction of the transfer planetary gearset VS up to a unit before the disk set 600 of clutch F.

The servoapparatus 610 of clutch F, including a pressure chamber 611, a pressure offset chamber 612, a piston 614 and a reset element 613, is, seen with respect to space, located radially beyond the graduated cylindrical shaped section of the output element 630, that is, the inner disk carrier of clutch F. The piston 614, sealed with pressurized lubricant and axially slidable, is axially located between disk set 600 of clutch F and the disk shaped section of the support structure 618 and is, in this arrangement, with in a ring space, created between the inside diameter of the cylindrical shaped section of the support structure 618 and the outside diameter of the output element 630, that is, the inner disk carrier of clutch F. For the formation of a pressure chamber 611, the torque transmitting connection between the support structure 618 and the output element 630, that is, and the inner disk carrier of clutch F, is sealed with pressurized medium, so that the pressure chamber 611 becomes formed by way of the piston 614, the inner shell casing of the support structure 618 and by way of a section of the outer casing of the output element 630, that is, the inner disk carrier of clutch F. The rotational-pressure offset chamber 610, which rotates at the rotational speed of the sun gear S1_HS, is placed on that side of the piston 614, remote from the pressure chamber 611. The pressure offset chamber 610 can be filled through an inlet tube 617 by lubricant at atmospheric pressure. This rotational pressure offset chamber is formed by the piston 614 and by a section of the outer casing of the graduated cylindrical part of the output element 630, which is axially slidable and sealed with lubricant and acts counter to the piston 614. The output element 630 is the inner disk carrier of clutch F. If the pressure chamber 611 is filled through a pressurized hydraulic fluid feed inlet 616, to engage clutch F, then the piston 614 displaces against the counter force of the of the reset element 613, which is here constructed as a ring-like set on the diameter of the piston 614, this ring-like set being of apportioned and kinematically, parallel disposed helical springs and placed in tension between the piston 614 and the output element, that is, the inner disk carrier 600 of clutch F, the springs are axially arranged in the direction of the transfer planetary gearset VS and so activate the disk set which was assigned thereto.

The transmission of speed of rotation and of torque signals between the output element 630, i.e., between the inner disk carrier of clutch F and the cylinder ring shaped connection element ZYL is carried out, in the embodiment example depicted in FIG. 3, by way of the support structure 618 of clutch F. On the one hand, the support structure 618, as has already been explained—possesses on its inside diameter a corresponding, torque conducting connection to the graduated cylinder shaped section of the output element 630, that is, the inner disk carrier of clutch F. On the other hand, the support structure 618 is, for this purpose, in the area of the end close to the disks of its cylindrically shaped section by way of an appropriate connection in a rotationally fixed manner with the housing wall sided end of the connection element ZYL, for example, the connection is shape-fit by way of a shape connecting profile. In this connection, the cylindrically shaped connection element ZYL axially overlaps the disk sets 100, 600 of the two clutches A and F. Counter to the presentation in FIG. 3, which preferably promotes a one piece construction of output element 230 of clutch B and connection element ZYL, it is possible, that in accord with a geometric layout of the input element 620, which is the outer disk carrier of clutch F and the output element 230, which is the outer disk carrier of clutch B, that the support structure 618 and the connection element ZYL are made in one-piece construction.

Figure 4:
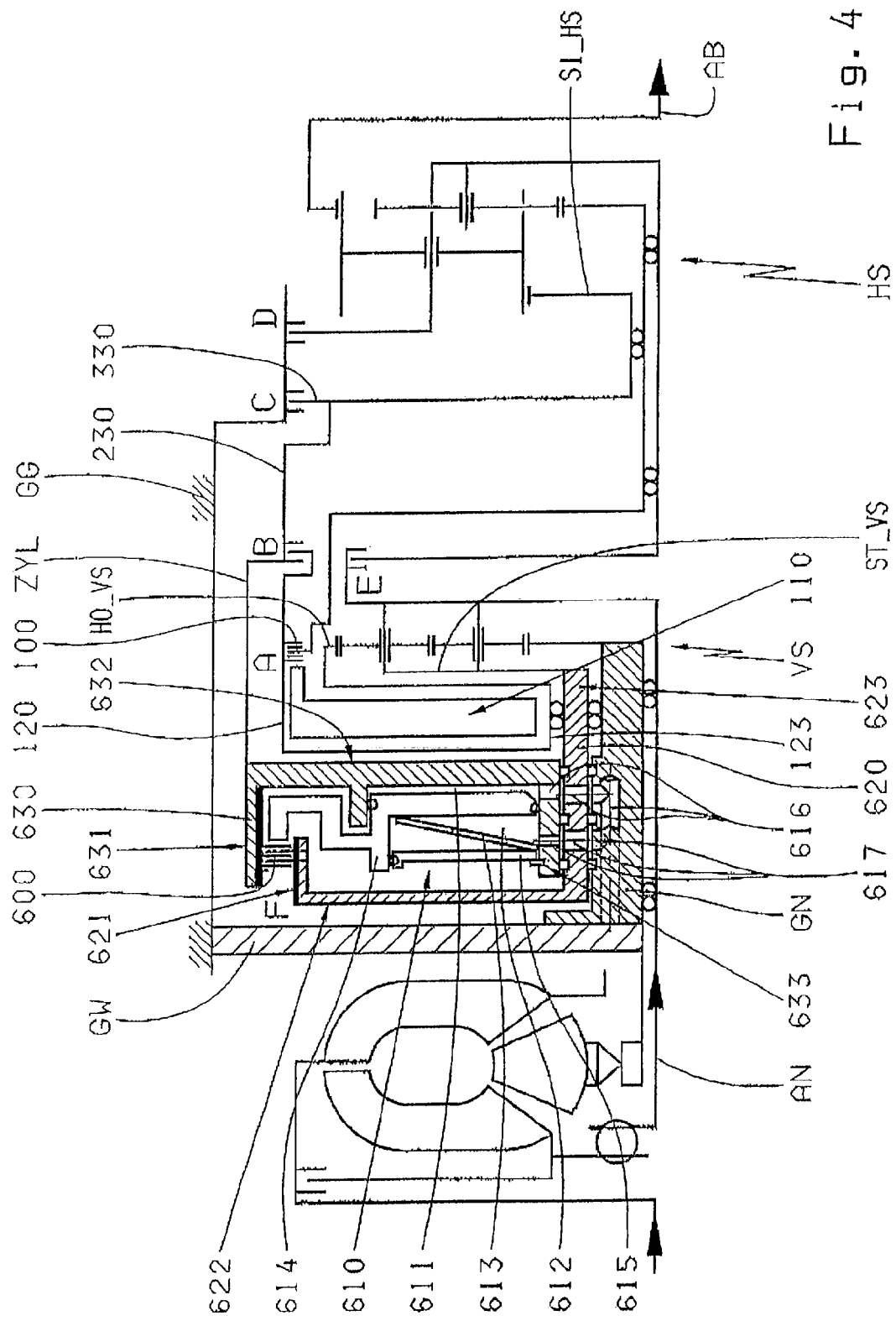
FIG. 4 is a third scheme of an inventive transmission.

Concerning FIG. 4, an inventive transmission scheme is presented, according to the present invention, and explained. This explanation is a revision of the first inventive transmission scheme. In FIG. 4, clutch F, in comparison to FIG. 2, has been reversed and is an approximate mirror image of itself. The input element 620 of clutch F serves a disk carrier for the inner disks of the disk set 600 of clutch F. The input element 620 of clutch F is cylindrically constructed and opens in the direction of the transfer planetary gearset VS possessing a hub 623. The cylinder extends almost completely along the entire axial length of hub GN, thus between the transmission housing affixed housing wall GW and the transfer planetary gearset VS. The cylindrical input element 620 is additionally rotatably secured onto hub GN by way of its disk shaped section 622. This section is attached to that end of the hub 623, proximal to the housing wall GW. The section further radially extends outwardly essentially parallel to the housing wall GW, approximately as far as the inside diameter of the disk set 600 of clutch F, radially reaching the cylinder-shaped section 621. Section 621 connects to the outside diameter of the disk-shaped section 622 and extends axially beyond the input transfer planetary gearset VS up to that end of the disk set 600 of clutch F, which is proximal to the input transfer planetary gearset VS. On its outside diameter, the cylindrical section 621 of the input element 620 of clutch F, is furnished with an appropriate shape-fitting, engagement profile for the retention of the inner disks of this disk set 600. The transfer planetary gearset proximal end of the hub 623 of the input element 620 of clutch F connects, in a rotationally fixed manner, with that carrier plate, remote from the main planetary gearset. The carrier plate is also associated with the coupled carrier ST_VS of the transfer planetary gearset VS and consequently, becomes bound by the carrier ST_VS to the input drive shaft AN.

In the same manner as shown in FIG. 2, the input element 120 of clutch A, which is connected to the ring gear HO_VS of the transfer planetary gearset VS along with the servoapparatus 110 of clutch A, which is located within the input element 120, is essentially placed on that side of the transfer planetary gearset VS, proximal to the external housing wall GW, and is, at the same time, remote from the main planetary gearset HS. With this arrangement, the disk set 100 of clutch A becomes located in an area radially outward from the transfer planetary gearset VS. Accordingly, a hub 123 of this input element 120 of clutch A is rotatably fixed onto the hub 623 of the input element 620 of clutch F and additionally rotationally fixed on its side proximal to the transfer planetary gearset VS with the ring gear HO_VS of the transfer planetary gearset VS.

The output element 630 of clutch F, which performs the duty of an external disk carrier for the outer disks of the disk set 600 of clutch F, in FIG. 4, is designed as a cylinder, which opens first in the direction of the external wall of the housing GW and simultaneously opens in an opposite direction away from the transfer planetary gearset VS. The output element 630 is placed on that side of the input element 120, proximal to the housing outer wall GW and, further, in a direction counter to that of the transfer planetary gearset VS. A hub 633 of this output element 630, i.e., the external disk carrier for clutch F, spatially considered, is located axially between the disk-shaped section 622 of the input element 620, which is the inner disk carrier of clutch F, and the hub 123 of the input element 120 of clutch A. This hub 633 encloses that section of the hub 623 of the input element 620 proximal to the housing wall GM. Further, the section of the hub 623 is also the inner disk carrier of clutch F and is rotatably affixed on the hub 623. A substantially disk shaped section 632 of the output element 630, that is to say, the outer disk carrier of clutch F, terminates on that end of the hub 633 of the output element 630 proximal to the transfer planetary gearset VS. The output element 630 is also the outer disk carrier of clutch F and extends axially, to border on the input element 120 of clutch A, and extends radially outward up to a diameter greater than the diameter of the disk set 600 of clutch F and also greater than the outside diameter of the input element 120, i.e., the outer disk carrier of clutch A. A cylindrical section 631 of the output element 630, i.e., the outer disk carrier of clutch F, ends at the outside diameter of the disk shaped section 632 of the output element 630, i.e., the outer disk carrier of clutch F, and extends radially in the direction of the housing wall GW to just beyond the disk set 600 of clutch F. In the area of this disk set 600, the cylindrical section 631, of the output element 630, i.e., the outer disk carrier of clutch F, possesses on its inside diameter a functional shape-fitting engagement profile for the retention of the outer disks of this disk set 600. On the end of output element 630, proximal to the transfer planetary gearset VS, is found the cylindrical section 631 of the output element 630, this being the outer disk carrier of clutch F, and which, in the area of its outside diameter, is rotationally fixed to a cylindrical connection element ZYL. This connection element ZYL, running in the axial direction and radially located outward of the input element 120 of clutch A, is furnished (as in FIG. 2) to effect a kinematic connection between the output element 630 of clutch F and the output element 230 of clutch B. Correspondingly, the output element 230 of clutch B is, in turn, connected with the output element 330 of the brake C and with the first input element—accordingly, in this case, with the first sun gear S1_HS—of the main planetary gearset HS.

The servoapparatus 610 for the activation of the disk set 600 of clutch F, is placed completely inside a cylindrical space, which is formed by way of the output element 630, i.e., the outer disk carrier of clutch F and located radially, when seen with spatial considerations, beyond the hub 633 of this output element 630. As is customary, this servoapparatus 610 compresses a pressure chamber 611, which can be filled with a pressurized medium, a non-pressurized, lubricant filled, pressure offset chamber 612 for the dynamic offsetting of the rotary pressure of the pressure chamber 611, a functional piston 614, active upon the disk set 600, a reset element 613, i.e., a plate spring, for piston reset, and a sealing plate 615 for the formation of the pressure offset chamber 612. The piston 614 is similar to that shown in FIG. 2 in which the output element 630 of clutch F is installed to be slidable and fixed so as to be sealed against the pressure medium. Correspondingly, the servoapparatus 610 always rotates at the speed of rotation of the input element of the main planetary gearset HS. Different from FIG. 2, the pressure chamber 611 of the servoapparatus 610, is formed by the piston 614 and an inner casing surface of the output element 630 and is located closer to the transfer planetary gearset VS than the pressure compensating chamber 612 of the servoapparatus 610. The servoapparatus 610 is formed between the piston 614 and the oppositely situated, axially sliding, lubricant sealed plate 615. Again, different from FIG. 2, the piston 614 of the servoapparatus 610 moves, when subjected to pressure in the pressure chamber 611, in an axial direction toward the housing wall GW, that is to say, axially in a direction opposite from the input transfer planetary gearset VS and counter to the spring force of the reset element 613 thus activating the disk set 600 of clutch F.

Again, different from FIG. 2, the introduction of pressure media and lubricant to clutch F is accomplished out by borings, i.e., channels, which first, run section-wise within the hub GN affixed to the transmission housing, second are conducted sectionally, within the hub 623 of the input element 620 of clutch F and third, run sectionally within the hub 633 of the output element F 630 of clutch F. FIG. 4 shows a corresponding pressure medium inlet designated 616, along with the lubricant inlet means, namely borings 617.

The remaining transmission component elements, in regard to their constructive design and in accord with their arrangement inside the transmission, are similar to those shown in FIG. 2. On this account, further description thereof is unnecessary.

Figure 5:
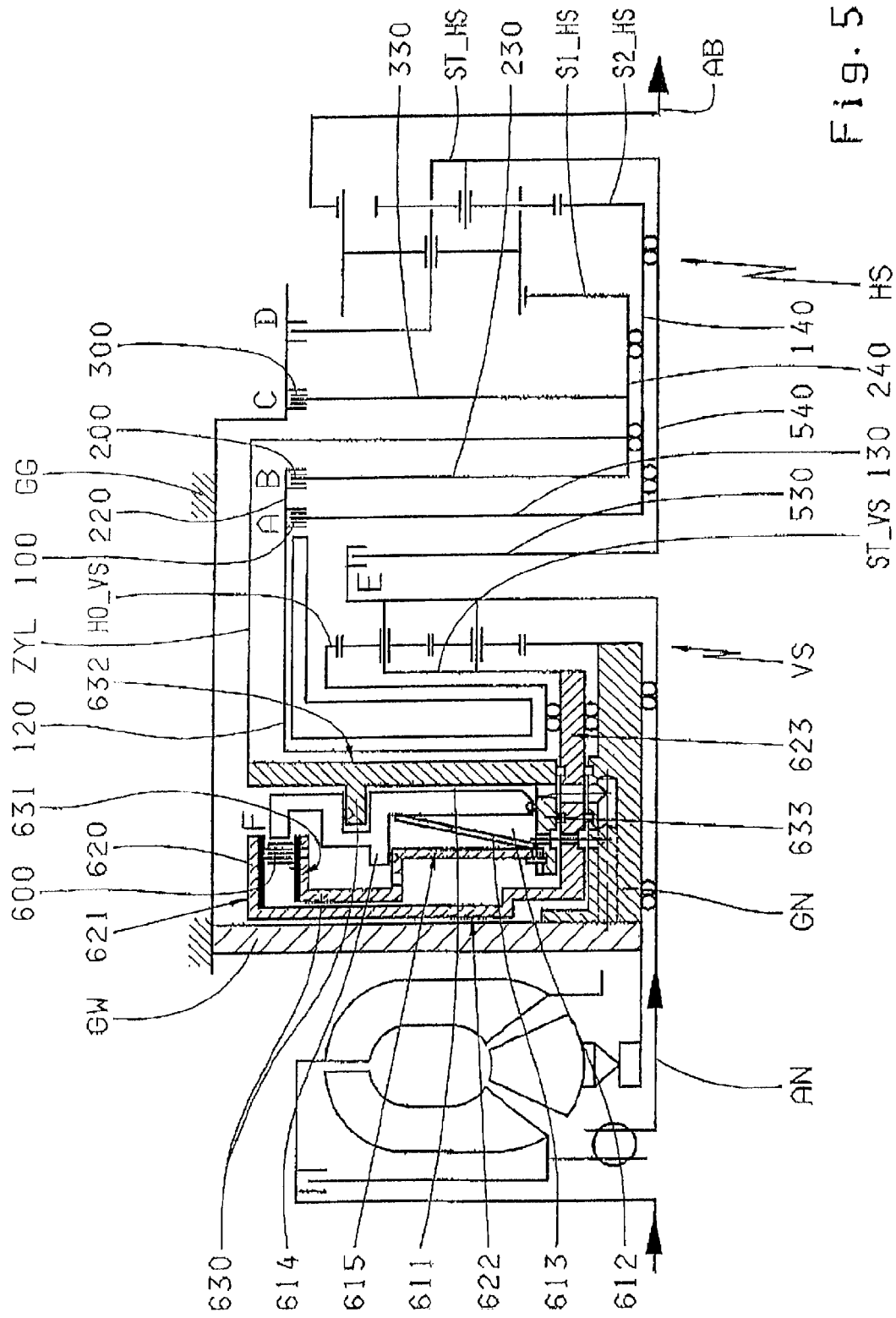
FIG. 5 is a fourth scheme of an inventive transmission.

Considering now FIG. 5, a fourth exemplary transmission scheme is presented, in accord with the present invention. This scheme is based on the previously described FIG. 4 which depicted a third inventive transmission scheme. The difference between the schematics of FIG. 5 and those of FIG. 4 are essentially found in the constructive formation of the input element 620 and the output element 630 of clutch F and, in the mechanical connective means of the output elements 630, 230 and 330 of the shifting elements F, B and C of the main planetary gearset HS.

In a similar manner to FIG. 4, the input element 620 of clutch F is constructed as a cylinder opening in the direction of the transfer planetary gearset VS. Different from FIG. 4, however, the input element 620 now serves as a disk carrier for the outer disks of the disk set 600 of clutch F. A hub 623 of the input element 620 includes the transmission housing affixed hub GN, which axially extends between the transmission fixed housing wall GW and the transfer planetary gearset VS, running radial throughout their entire axial length and which elements are rotatably fixed on the hub GN. A disk-shaped section 622 of this input element 620 terminates on the transmission housing sided end of the hub 623 and extends axially, directly, in a parallel manner, to the housing wall GW, extending radially running to outward up to a diameter, which is greater than the outside diameter of the disk set 600 of clutch F. A cylindrical section 621 of the input element 620 terminates at the outside diameter of the disk-shaped section 622, extends axially in the direction of the transfer planetary gearset VS up to just beyond the disk set 600 of clutch F and possesses on its inside diameter a characteristic engagement profile for the retention of the outer disks of this disk set 600. The hub 623 of the input element 620 of clutch F is rotationally fixed, on its end proximal to the transfer planetary gearset VS, again as in FIG. 4, with the main planetary gearset HS remote carrier plate of the coupled carrier ST_VS of the transfer planetary gearset VS and is bound to the input drive shaft AN.

The output element 630 of clutch F is now designed as a disk carrier for the inner disks of the disk set 600 of clutch F and, geometrically speaking, is in the shape of a cylinder, which opens in the direction of the housing wall GW, that is to say, in a direction opposite to that of the transfer planetary gearset VS. The output element 630 of clutch F is located on the side of the input element 120 of clutch A, proximal to the housing wall GW, i.e., is remote from the transfer planetary gearset VS. A hub 633 of this output element 630 of clutch F is, from a spatial standpoint, placed axially between the disk-shaped section 622 of the input element 620 of clutch F and the hub 123 of the input element 120 of clutch A. This disk-shaped section 622, proximal to the housing wall GW, radially encloses the hub 623 of the input element 620 of clutch F and is rotationally fixed on this hub 623. A partially platelike section 632 of the output element 630 of clutch F terminates on the end of the hub 633, proximal to the transfer planetary gearset VS and, the section 632 extends axially, directly, bordering the input element 120 of the coupling A and extends radially outward to a diameter, which is greater than the outside diameter of the input element 120 of clutch A. A cylindrical section 633 of the output element 630 of clutch F, on its outside diameter possesses an appropriate shape-fit engagement profile for a connection with the inner disks 622 of the disk set 620 of clutch F, and when considered from a spatial standpoint, is placed radially beneath the disk set 620 of clutch F. The cylindrical section 631, at its end, proximal to the housing wall GW, is bound to the sealing plate 615, which, in a functional manner, is also assigned to the servoapparatus 610 of clutch F. This sealing plate 615, in turn, by way of an engagement profile, is rotationally fixed to the housing wall GW proximal end of the hub 633 of the output element 630 of clutch F. Further, by way of a securement ring is axially fixed to the this hub 633. In the embodiment exhibited in FIG. 5, the cylindrical section 631 of the output element 630 and the sealing plate 615 are made in one piece.

The servoapparatus 610 for the activation of the disk set 600 of clutch F is, as is the case in FIG. 4, located on that side of the platelike section 632 of the output element 630 of clutch F, proximal to the housing wall GW, i.e., remote from the transfer planetary gearset VS and, spatially considered, essentially above the hub 633 of the output element 630 of clutch F. As is conventional, this servoapparatus 610 comprises; first, a pressure chamber 611 which can be filled with pressurized medium; second, a non-pressurized, fluid filled pressure offset chamber 612 for the dynamic offset of the rotational pressure of the pressure chamber 611; third, a piston 614 to act upon disk set 600; fourth, a reset device 613, generally this being a plate spring, for the piston 614; and fifth, the already mentioned sealing plate 615 for a tight enclosure of the pressure offset chamber 612. The piston 614 similar to FIG. 4, is axially slidable on the output element 630 of clutch F and for this reason, has a pressure resistant seal against the pressurized hydraulic fluid. Correspondingly, the servoapparatus 610 rotates continually at the speed of rotation of the first input element of the main planetary gearset HS. As in FIG. 4, the pressure chamber 611 of the servoapparatus, which is bounded by the piston 614, and an inner casing surface of the output element 630, is placed nearer to the transfer planetary gearset VS than the pressure offset chamber 612 of the servoapparatus 610, which is bounded by the piston 614 and the sealing plate 615 oppositely situated from the piston 614, is axially slidable and sealed with a lubricant material. As in FIG. 4, the piston 614 of the servoapparatus 610 displaces axially, upon pressurizing the pressure chamber 611, in the direction of the housing wall GW, that is to say, displaces axially in a counter direction to the transfer planetary gearset VS, thereby acting against the force of the spring of the reset element 613 and in this way can activate the disk set 600 of clutch F which has been assigned to it.

As FIG. 5 further shows, for the transmission of the speed of rotation and the transfer of torque signals, between the output element 630 of clutch F and the here exemplary first input element of the main planetary gearset HS, which is formed, for example, by the first sun gear S1_HS proximal to the transfer planetary gearset VS. There is provided a cylindrical connection element ZYL, which is geometrically in the form of a pot, opening toward clutch F. In this arrangement, a platelike pot bottom of this cylindrical connection element ZYL extends radially between clutch B and the brake C and, in its hub region, is rotationally fixed to the first sun gear 240. On the outer rim of this pot bottom, the outside diameter of which is greater than that of clutch B, is attached a cylindrical section of the connection element ZYL, which extends axially in the direction of clutch F to the platelike section 632 of the output element 630 of this same clutch F, and in this extension also completely encloses clutches B, A and E as well as the transfer planetary gearset VS. On its end, proximal to the housing wall GW, the cylindrical section of the connection element ZYL is rotationally fixed to the platelike section 632 of the output element 630 of clutch F, for example, the connection being made by an appropriate shape-fit profile.

As is further to be inferred from FIG. 5, the disk set 100 of clutch A, in a different manner than in FIG. 4, is now axially aligned and located in an area between the planetary gearset VS and the main planetary gearset HS or, more exactly, axially aligned between first, clutch E, which borders that side of the transfer planetary gearset VS proximal to the main planetary gearset and second, the disk set 200 of clutch B. In this matter, the—in FIG. 5, for the sake of simplicity, only schematically shown—servoapparatus 110 of clutch A for the activation of this disk set 100, as in FIG. 4, is substantially placed at the main planetary gearset HS side of the transfer planetary gearset VS, whereby only a pressure ring of the servoapparatus 110, which is operationally bound with a piston of the servoapparatus 110 can encircle in an axial direction the transfer planetary gearset VS (and in this case, also clutch E, which is axially disposed on the main planetary gearset side of the transfer planetary gearset VS). Alternatively, it is possible that the pressure ring can be advantageously substituted for by a plurality of activation projections which are circumferentially apportioned thereabout. In the embodiment shown in FIG. 5, the disk sets 100, 200 of the two clutches are placed immediately next to one another at the same diameter, whereby the input elements 120 and 220 of both clutches A and B are constructed as external disk carriers. Accordingly, the input element 220 of clutch B is connected to the ring gear HO_VS—which gear forms the output element of the transfer planetary gearset VS—without change by way of the input element 120 of clutch A. The output element 230 of clutch B is here depicted as a separate, substantially disk shaped inner disk carrier, which is placed radially inside of the of the disk set 200 of clutch B and in its hub area is rotationally affixed to the first sun gear 240. A servoapparatus of clutch B, which is not shown in FIG. 5, for the sake of simplicity, intended for the activation of the disk set 200, can, optionally, be placed on one of the two sides of this disk set 200. A pressure chamber of this servoapparatus of clutch B can, for example, also be located in an area axially disposed between the platelike section 632 of the output element 630 of clutch F and the input element 120 of clutch A, radially placed by way of an axially aligned section of the hub 623 of the input element 620 of clutch F, whereby a pressure plate, that is to say, advantageously, a plurality of circumferentially disposed activation projections of this servoapparatus of clutch B, engage the input element 120 of clutch A and the input element 220 of clutch B and inclusive of the disk set of that clutch and activate the disk set 200 by way of it being moved to the main planetary gearset side by engaging clutch B.

Also, the output element 330 of the brake C is designed as a separate, substantially platelike inner disk carrier, which is placed radially beneath the disk set 300 of the brake C and in its hub area is rotationally fixed to the first sun gear shaft 240. As has already been mentioned, the first sun gear shaft 240 is independently rotationally fixed to the transfer planetary gearset proximal first sun gear S1_HS (as a first input element) of the main planetary gearset HS. Sun gear S1_HS and sun gear shaft 240 can, for example, also be made as one piece. The first sun gear shaft 240 co-axially encircles an axially aligned section of a second sun shaft 140, by way of which, the output element 130 of clutch A is here, for example, radially rotationally fixed to the transfer planetary gearset remote second sun gear S2_HS (this being the second input element) of the main planetary gearset HS. Also the second sun gear S2_HS and the second sun gear shaft 140 can, for instance, be constructed as one piece. The second sun gear shaft 140 likewise co-axially includes an axial section of a carrier shaft 540, by way of which the output element 530 of clutch E, in this case, for example, is radially rotationally fixed to the transfer planetary gearset VS remote side of the main planetary gearset HS with the coupled carrier ST_HS (this being the third input element) of the main planetary gearset HS.

Figure 6:
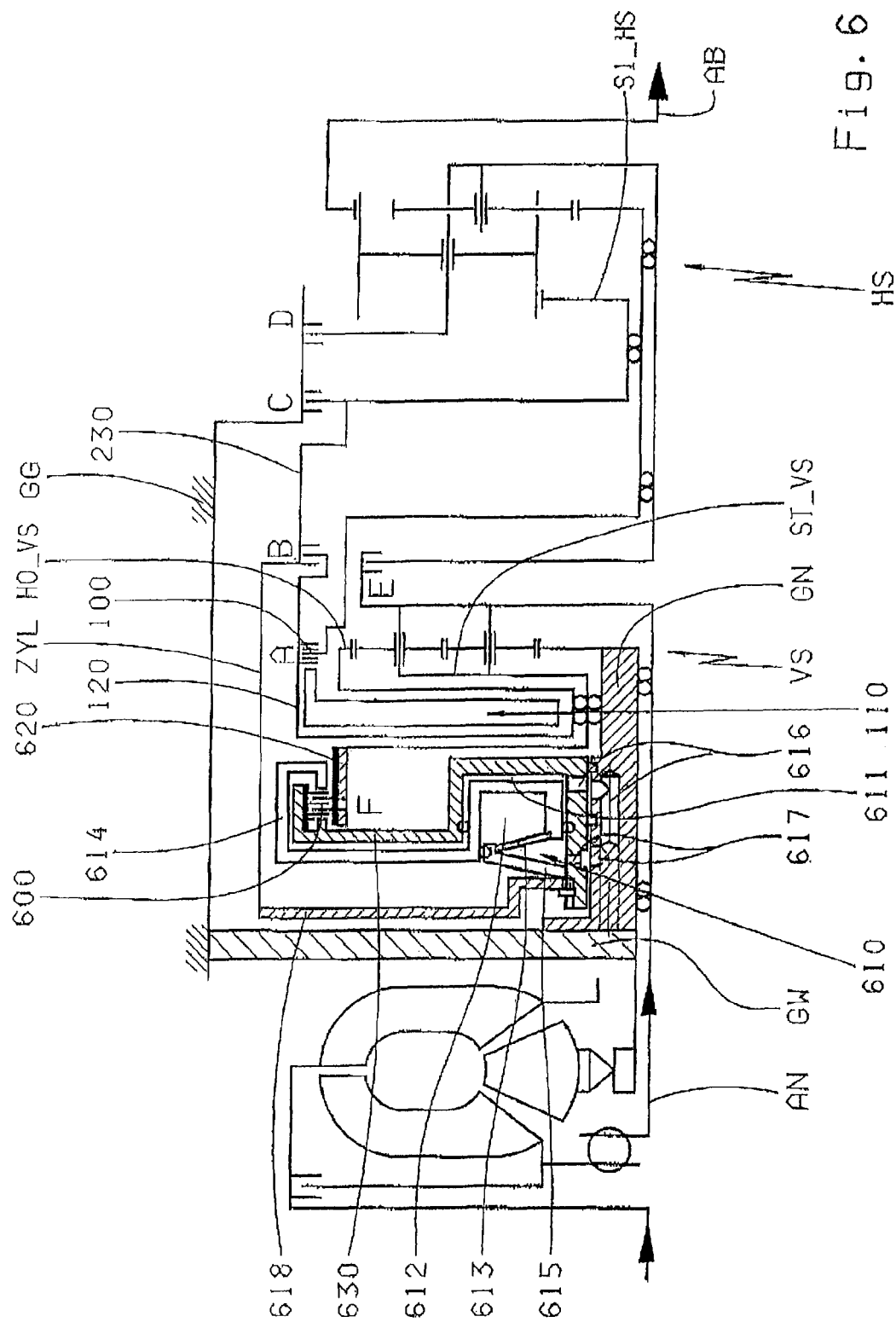
FIG. 6 is a fifth scheme of an inventive transmission.
Figure 7:
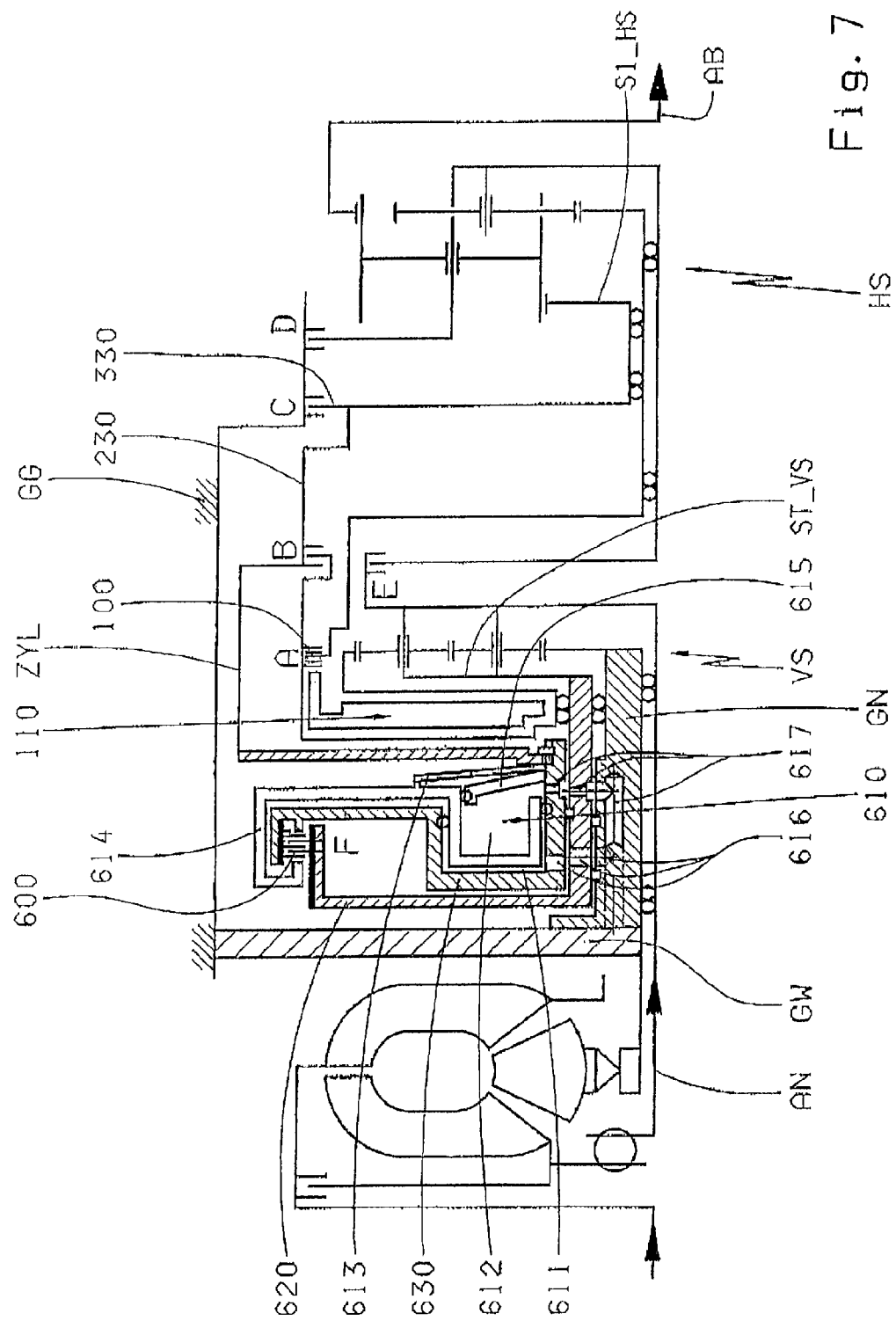
FIG. 7 is a sixth scheme of an inventive transmission.
Figure 8:
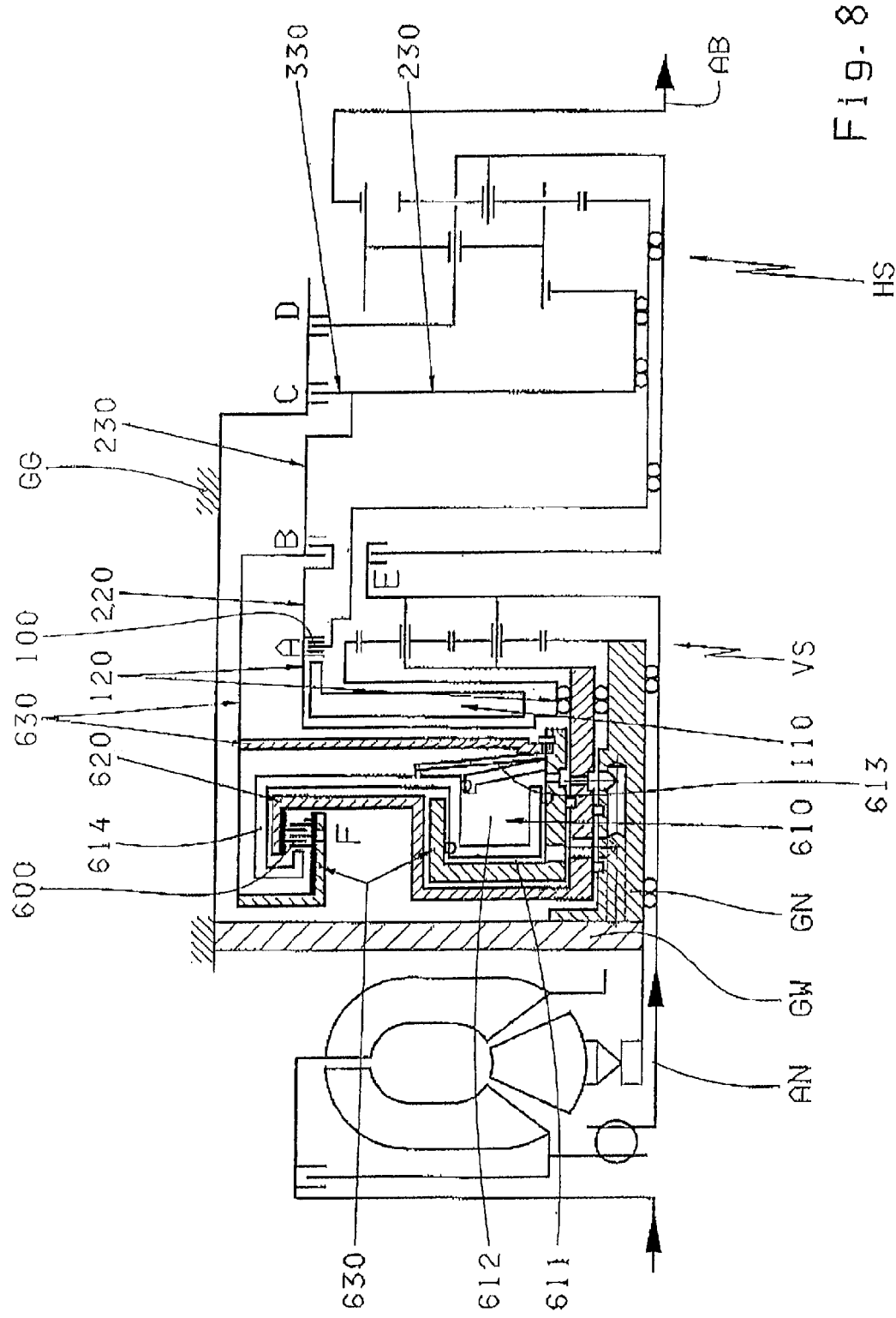
FIG. 8 is a seventh scheme of an inventive transmission.

In all of the preceding embodiment examples of clutch F, upon engagement thereof, its disk set 600 of clutch F has been always activated from a pressurized state, due to the spatial positioning of the pressure chamber 611 of the servoapparatus 610 of clutch F. The three embodiment examples presented, for the sake of completeness, in FIGS. 6, 7 and 8 should make clear, that the activation direction of the disk set 600 of clutch F, upon its engagement, and in consideration of the spatial positioning of the pressure chamber 611, which is dedicated to clutch F, however, is modified without difficulty. This enables the disk set, relative to its assigned pressure chamber 611, to be activated by a tension instead of compression. Accordingly, the fifth inventive transmission scheme, illustrated in FIG. 6, is based on first inventive transmission scheme as shown in FIG. 2, the sixth inventive transmission scheme, presented in FIG. 7, is based on the inventive transmission scheme, presented in FIG. 4, and the seventh inventive transmission scheme, pictured in FIG. 8, is based on the fourth inventive transmission scheme, as shown in FIG. 5. Correspondingly, in FIGS. 6, 7 and 8, the essential reference number of the respective basic transmission is entered, whereby, it becomes possible to eliminate repetitive description thereof.

Figure 9:
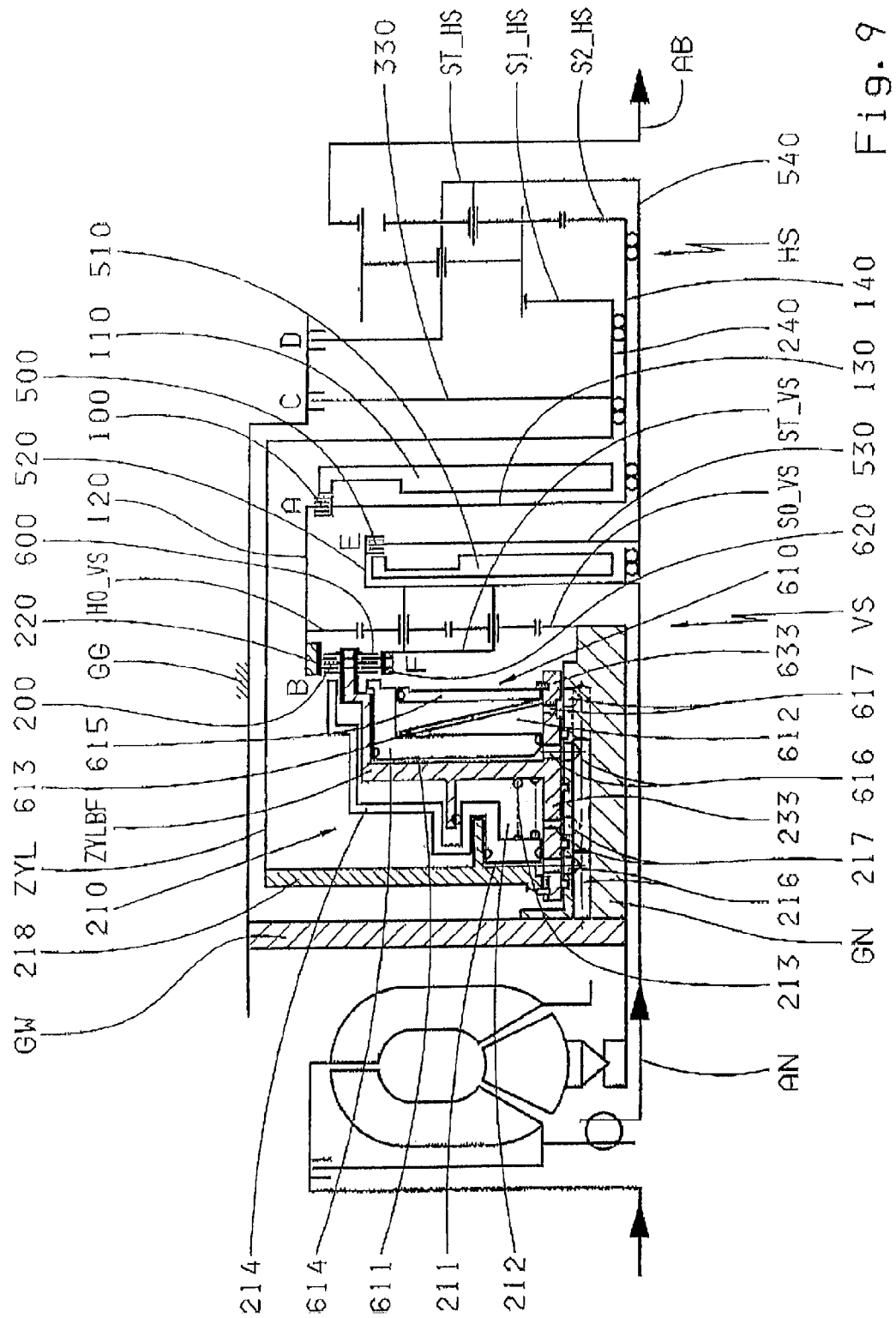
FIG. 9 is an eighth scheme of an inventive transmission.

Now considering FIG. 9, an eighth exemplary transmission scheme in accord with the present invention is brought forward for description and explanation. The changes in comparison to the conventional state of the technology, as shown in FIG. 1A, concern essentially, the spatial arrangement and functions of clutches B, E and A. In addition, the construction of the transmission corresponds with the following: first, the assembly of the transmission with the input drive shaft AN and the co-axial output drive shaft AB; second, the transfer planetary gearset VS which is proximal to the input drive shaft AN; third, the main planetary gearset HS which runs co-axially beside the just named components; fourth, clutch E, which directly borders on the transfer planetary gearset VS, on that side thereof, proximal to the main planetary gearset HS; and fifth the two brakes, namely C and D, which are proximal to the main planetary gearset HS, in essentially, the transmission arrangement shown in FIG. 1A.

The two clutches B and F now form an easily constructed, factory made component set, which can be placed axially between the transfer planetary gearset VS and a transmission housing affixed housing wall GW, which is not further described, but is proximal to the drive motor of the transmission which motor is operationally in connection with the input drive shaft AN. The stated pair of clutches B, F are further on that side of the transfer planetary gearset VS remote from the main planetary gearset HS and directly border the transfer planetary gearset VS and the housing wall GW. Obviously, the housing wall GW and the transmission housing GG can be manufactured in one piece. If this be done, the group of components would encompass a common disk carrier ZYLBF for the pair of clutches B, F, the disk sets 200, 600 of the two clutches, as well as the servoapparatuses 210, 610 for the activation of these disk sets 200, 600. This disk carrier ZYLBF forms the output element for both clutches B, F and is, correspondingly the preselected kinematic coupling, which is rotationally fixed to the first input element (here the first sun gear S1_HS) of the main planetary gearset HS. This structure will be explained in detail later. For clutch F, the disk carrier ZYLBF is designed as an outer disk carrier for the retention of, advantageously, the outer disks of the disk set 600, of this clutch F. Correspondingly, for clutch B, the disk carrier ZYLBF serves for the retention of, advantageously, the inner disks of the disk set 200 of this clutch B. Seen with consideration of spatial location, the disk set 200 of clutch B is placed in a position radially outward from the disk set 600 of clutch F. Correspondingly, the input element 620 of clutch F is designed to be the inner disk carrier for the retention of the inner disks of disk set 600 of clutch F, which disks, advantageously, are inward-toothed coated disks and the input element is rotationally fixed to a carrier plate, which is remote from the main planetary gearset HS and is further rotationally fixed to the coupled carrier ST_VS of the transfer planetary gearset VS, whereby this coupled carrier ST_VS—as in FIG. 1A—is bound on its main planetary gearset HS side to the input drive shaft AN. Obviously, it is possible that the carrier plate and the inner disk carrier 620 can be made in one piece. The input element 220 of clutch B is designed as an outer disk carrier for the retention of outer disks, which are advantageously made as outward-toothed steel disks of the disk set 200 of clutch B and the input element 220 is further rotationally fixed to the ring gear HO_VS of the transfer planetary gearset VS. Again, it is obvious that the ring gear HO_VS and the outer disk carrier 220 can be made as one piece. Obviously too, the possibility exists, that instead of the double sided steel disks (without friction coating), the coated disks can also be used with one-sided, friction coated steel disks, whereby, in that case, respectively a outward-toothed coated steel disk and an inward-toothed coated disk must be combined together to make one disk set. Obviously, instead of the mentioned proposed steel disks, it is also possible to use disks of carbon, carbon fibers or other appropriate combination materials.

Geometrically speaking, the common disk carrier ZYLBF, which serves clutches B, F, possesses a structure which is essentially in the shape of a cylinder, is rotatably bound and located on a transmission fixed hub GN, which extends axially in the interior of the transmission, in the direction of the transfer planetary gearset VS over a distance between the housing wall GW to the transfer planetary gearset VS. On this hub GN, the sun gear SO_VS of the transfer planetary gearset VS is fixed by way of an appropriate binding. Obviously, it is also possible that the hub GN and the housing wall GW can also be made as one piece. For example, the hub GN can also possess a stator shaft of a torque converter which is located in the path of power flow through the input drive shaft AN and the drive motor of the transmission. On the outside diameter of the disk carrier ZYLBF a cylindrical section is provided, on the inside diameter of which, the outside disks of the disk set 600 of clutch F are to be found, and on the outside diameter of which are fixed the inner disks of the disk set 200, whereby both disk sets 600, 200 axially border the transfer planetary gearset VS. Starting at that end, remote from the transfer planetary gearset VS, of the cylindrical section of the disk carrier ZYLBF, thus on that side of the disk set 600, remote from the transfer planetary gearset VS, an at least substantially plate shaped section of the disk carrier ZYLBF radially extends inward to the hub of the disk carrier ZYLBF. Accordingly, this hub is subdivided into two hub-sections 633 and 233. Starting from the inside diameter of the platelike section of the disk carrier ZYLBF, the hub-section 633 extends axially in a direction toward the transfer planetary gearset VS and is assigned to—as is evident from the selected nomenclature—the output element of clutch F. The other hub-section 233 is assigned to the output element of clutch B and extends, starting from the inside diameter of the platelike section of the disk carrier ZYLBF, axially in the direction of the housing wall GW.

The servoapparatus 610 of clutch F, which includes a pressure chamber 611, a pressure offset chamber 612, a piston 614, a reset element 613 and a sealing plate 615, is completely located within a cylindrical space, formed by the disk carrier ZYLBF, which is, essentially, located radially above the hub-section 633. The piston 614 is fixed to the disk carrier ZYLBF in an axially slidable manner. Correspondingly, the servoapparatus rotates continually at the speed of rotation of the first input element (thus, in this case, the first sun gear S1_HS) of the main planetary gearset HS. For offsetting the rotational pressure of the rotating pressure chamber 611 of the servoapparatus 610, a dynamic pressure offset is furnished by the pressure offset chamber 612, which is filled with lubrication fluid at atmospheric pressure. In this construction, the pressure offset chamber 612 is located closer to the transfer planetary gearset VS (or to the main planetary gearset HS) than the pressure chamber 611. Thereby, the pressure chamber 611 is created by way of an outer shell of the disk carrier ZYLBF (and a part of its hub-section 633) and the piston 614. The pressure offset chamber 612 is formed by the piston 614 and the sealing plate 615 which is axially fixed on the hub-section 633 of the disk carrier ZYLBF and lies opposite to the piston 614, which is axially slidable and sealed by lubricant. The piston 614 is axially forced against the hub-section 633 by way of the reset element 613, which is a plate spring. In the case of a subjection of the pressure chamber 611 to pressurized fluid, clutch F moves to the engaged position as the piston 614 is displaced axially in the direction of the transfer planetary gearset VS (or in the direction of the main planetary gearset HS) and activates the disk set 600, which is assigned to piston 614, which activation takes place counter to the force exerted by the spring of the reset element 613.

Seen in consideration of the spatial conditions, the servoapparatus 610 of clutch F is to be found nearer the principal and the transfer planetary gearsets, namely HS, VS, than the servoapparatus 210 of clutch B. Thereby, this servoapparatus 210, seen spatially, is at least principally in an area located radially above the second hub-section 233 of the disk carrier ZYLBF and is axially slidably connected with the disk carrier ZYLBF. Correspondingly, the servoapparatus 210 rotates continually at the rotational speed of the first input element, namely the first sun gear S1_HS of the main planetary gearset HS. The servoapparatus 210 of clutch B includes a pressure chamber 211, a pressure offset chamber 212, a sectionally windingly constructed piston 214, a reset element 213 and a sectional cylindrical support structure 218. For the offset of the rotational pressure of the rotating pressure chamber 211 of the servoapparatus 210, there is provided a dynamic pressure compensating means with the pressure offset chamber 212. The construction of the pressure chamber 611 is effected by way of a shell of the disk carrier ZYLBF (and a portion of the section 633 neighboring thereto) and the piston 614. The pressure offset chamber 612 is engaged by the piston 614 and the sealing plate 615. The sealing plate 615 is fixed axially on the hub-section 633 of the disk carrier ZYLBF and plate is also sealed off in a slidable manner with an appropriate lubricant. The piston 614 receives pressure by means of the reset element 613, which consists of a plate spring, working axially against the hub-section 633 of the disk carrier ZYLBF. Upon subjecting the pressure chamber 611 to pressurized fluid to engage clutch F, then the piston 614 is displaced axially in the direction of the transfer planetary gearset VS (or the main planetary gearset HS) and activates the disk set 600, which packet has been assigned thereto, thus working against the force of the above mentioned reset element 613. The irregularly shaped piston 214 in this area, is sealed with lubricant material against the this second cylindrical section of the disk carrier ZYLBF and is slidably attached thereto. Correspondingly, the pressure offset chamber 212 is formed by way of the piston 214, the second cylindrical section of the disk carrier ZYLBF and the platelike section of the disk carrier ZYLBF, which platelike section is to be found beneath, radially speaking, this second cylindrical section of the disk carrier ZYLBF. In a further geometric extension, the piston 214 extends at least substantially along the outer contour of the radially upper area of the disk carrier ZYLBF, reaching radially outward and axially extending in the direction of the transfer planetary gearset VS up to that side of the transfer planetary gearset VS remote from the disk set 200 of clutch B, to which packet it has been assigned. The piston 214 is axially loaded by way of the reset element 213, which element is here represented by a helical gearset, axially set between the platelike section of the disk carrier ZYLBF and the piston 214. In the case of filling the pressure chamber 211 with pressure medium to engage clutch B, the piston 214 is displaced axially in the direction of the transfer planetary gearset VS (as well as in the direction of the main planetary gearset HS) and activates the disk set 200 against the spring force of the reset element 213. The piston 214 also engages, generally completely, the disk carrier ZYLBF, which serves for both clutches B, F.

The pressure offset chamber 212 of the servoapparatus 210 of clutch B is, however, closer to the transfer planetary gearset VS (i.e., the main planetary gearset HS) than the pressure chamber 211 of this servoapparatus 210, whereby the pressure offset chamber 212 of clutch B and the pressure chamber 611 of the servoapparatus 610 of clutch F are directly contingent to one another and are only mutually separated by way of a shell of the disk carrier ZYLBF which serves in common for both clutches B, F.

Because of the positioning of the disk carrier ZYLBF on the hub GN, which hub is fastened to the transmission housing, there is achieved a constructively relatively simple pressure medium and lubricant material feed to both clutches B, F. This is accomplished through appropriate channels, i.e., borings, which, sectionally run within the housing hub GN and are sectionally located inside the hub of the disk carrier ZYLBF. A pressure medium feed arrangement to the pressure chamber 211 of the servoapparatus 210 of clutch B is denoted by the reference number 216, a lubricant feed to the pressure offset chamber 212 of the servoapparatus 210 of clutch B is shown as 217, a pressure medium feed to the pressure chamber 611 of the servoapparatus 610 of clutch F is designated with 616 and a lubricant feed to the pressure offset chamber 612 is designated as 612 of the servoapparatus 610 of clutch F is shown as 617.

As may be further inferred from FIG. 9, clutch E borders axially, directly against the transfer planetary gearset VS on that side thereof proximal to the main planetary gearset HS. The input element 520 of clutch E is connected with the carrier plate, proximal to the main planetary gearset HS, the plate being connected to the coupled carrier ST_VS of the transfer planetary gearset VS as well as to the input drive shaft AN and, for example, serves as outer disk carrier for the retention of, for instance, outside disks, which are outward-toothed and of steel, of the disk set 500 of clutch E. The output element 530 of clutch E is, for example, substantially plate-like in shape and an inner disk carrier for the retention of inner disks, which are inward-toothed, coated disks, of the disk set 500 of clutch E and connected with the third input element of the main planetary gearset HS by way of a carrier shaft 540—in this case, also connected with the coupled carrier ST_HS of the main planetary gearset HS—, whereby the carrier shaft 540 centrally penetrates the main planetary gearset HS in the axial direction. Geometrically speaking, the disk set 500 of clutch E, for example, is placed in the diametrical location of the ring gear HO_VS of the transfer planetary gearset VS. Advantageously, a servoapparatus 510 is placed within the input element 520 of clutch E for the purpose of activating the disk set 500. Advantageously, again, the servoapparatus 510, here described briefly only for the sake of simplicity, possesses also a dynamic pressure offset means, which continually runs at the rotational speed of the input drive shaft AN.

Axially, in the direction of the gearset HS, clutch A axially borders on clutch E. Accordingly, the input element 120 of clutch A is connected to the ring gear HO_VS of the transfer planetary gearset VS, includes clutch E entirely and serves as the outer disk carrier for the retention of external disks, which are advantageously outward-toothed, coated disks, of the disk set 100 of clutch A. Correspondingly, the output element 130 of clutch A serves as substantially a platelike inner disk carrier for the retention of, advantageously, the inward-toothed steel disks of the inner disks of the disk set 100 and this is, by way of a second sun gear shaft 140, connected with the second input element—thus in this case with the second sun gear S2_HS—of the main planetary gearset HS. In this way, this second sun gear shaft 140 sectionally engages the carrier shaft 540 and centrally penetrates, in its axial length, proximal to the transfer planetary gearset VS, first sun gear S1_HS of the main planetary gearset HS. Obviously, it is possible that the second sun gear S2_HS and the second sun gear shaft 140 can be made as one piece. The expert can see that the output element (inner disk carrier) 130 of clutch A and the second sun gear shaft 140 can also be made in one piece, whereby the second sun gear 140, in such a case, can form a hub of the output element (inner disk carrier) 130 on the carrier shaft 540. In the embodiment illustrated, the disk sets 100, 200 of the clutches A, B are placed at diameters which are essentially equal. Correspondingly, then, it is possible for both clutches A, B to be provided with a common disk carrier to serve as their input element. For activating the disk set 100 of clutch A, a servoapparatus 110 is provided, which in this case is placed on that side of the disk set 100, proximal to the main planetary gearset HS. The disk set 100, upon the engagement of clutch A is activated axially in the direction of the transfer planetary gearset VS. Advantageously, the servoapparatus 110, which is shown here only schematically for the sake of simplicity, possesses also a dynamic pressure offset means, since the servoapparatus 110 always rotates at the same rotational speed as that of the second sun gear S2_HS of the main planetary gearset HS. In another embodiment variant, it is possible that the servoapparatus 110 of clutch A can be placed on that side of disk set 100, proximal to the transfer planetary gearset VS, whereby then this disk set 100, upon engagement of clutch A is activated axially in the direction of the main planetary gearset HS.

Obviously, it is possible for clutches E and A to be used with frictional coating covered steel disks, instead of the double sided arranged steel disks (without coating), as are shown in the embodiment example. In this case, respectively an outward-toothed, coated steel disk and an inward-toothed coated steel disk must be alternately combined in a disk set. Obviously it is possible, that instead of the proposed steel disks, also disk of carbon or carbon-fiber or another appropriate combinatorial material can be used.

As already mentioned, the common disk carrier ZYLBF, which serves both clutches B, F, forms the output element for the two clutches B, F, and is bound with the first input element of the main planetary gearset HS. The transmission of both the speed of rotation and the torque between this disk carrier ZYLBF and the first sun gear S1_HS of the main planetary gearset HS is carried out, in this arrangement, by way of the support structure 218, a cylindrical connection element ZYL and a first sun gear shaft 240. The support structure 218 is proximal to the transmission housing wall GW and is rotationally fixed to the hub of the disk carrier ZYLBF. Further the support structure 218 axially extends, in a bordering manner, along this transmission housing wall GW toward the outside and is connected in the area of its outside diameter with the cylindrical connection element ZYL, for example by way of a shape-fit engaging profile. This cylindrical connection element ZYL again, is, geometrically speaking, constructed as a pot open in the direction of the transmission housing wall GW and has a cylindrical outer casing, with which the component group of the two clutches B, F, the transfer planetary gearset VS and the two clutches E and A are completely encompass in the axial direction, as well as having a platelike pot bottom, which extends radially inward on its side proximal to the main planetary gearset HS beside clutch A up to just above the second sun gear shaft 140. In its hub area, the cylindrical connection element ZYL is rotationally fixed to the first sun gear shaft 240, which, in turn, is bound to both the output element 330 of the brake C and to the first, proximal to the transfer planetary gearset, sun gear S1_HS of the main planetary gearset HS, and axially partially encloses, the second sun gear shaft 140.

Figure 10:
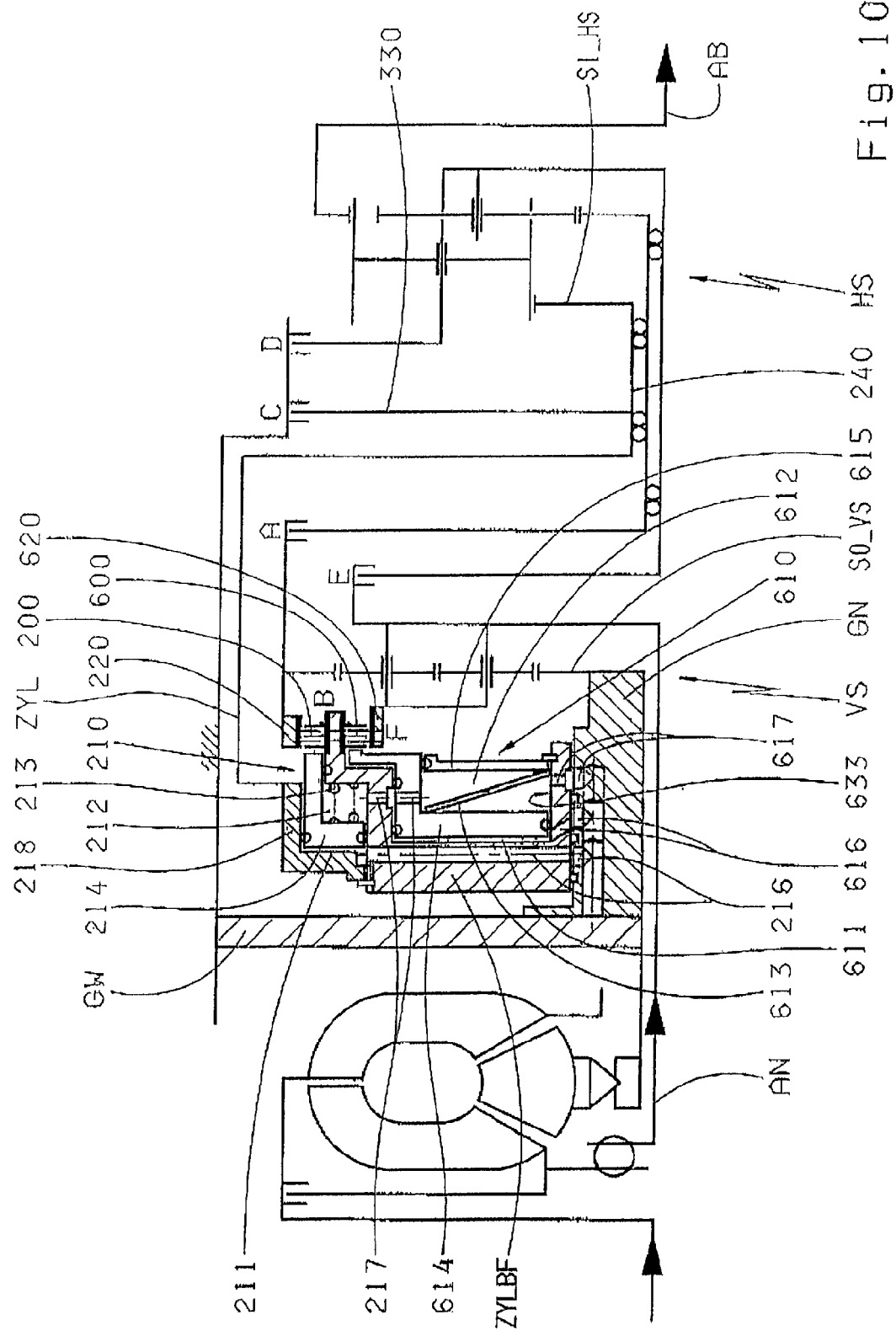
FIG. 10 is a ninth scheme of an inventive transmission.

Now considering FIG. 10, a ninth exemplary transmission scheme is presented in accord with the present invention, this being based on the previously explained eighth inventive transmission scheme as presented in FIG. 9. The changes, compared to FIG. 9, essentially concern the constructive formation of the disk carrier ZYLBF, which is a mutual disk carrier for both clutches, namely B, F and concern also the spatial considerations of the locations of the servoapparatuses 210, 610 of clutches B, F. To this extent, further discussion thereon can be eliminated.

As can be seen from FIG. 10, the pictured assembly group incorporating the two clutches B and F, in the same manner as for FIG. 9, includes the disk carrier ZYLBF, which is common for both clutches B, F, the also common disk sets 200, 600 for both clutches B, F, as well as the servoapparatuses 210 and 610 for the activation of these disk sets 200 and 600. This assembly group is axially and rotatably placed between the transfer planetary gearset VS and the transmission housing fixed housing wall GW which is proximal to the drive motor and is rotatably attached to the transmission fixed hub GN. As is the case in FIG. 9, the disk carrier ZYLBF forms the output element for both clutches B, F, whereby it is designed as an inner disk carrier for clutch B and is designed as an outer disk carrier for clutch F, and is further, corresponding to the kinematic coupling, rotationally fixed to the first input element (in this case, this being the first sun gear S1_HS) of the main planetary gearset HS. The input element 220 of clutch B, which is designed as an outer disk carrier therefor, is likewise taken over by the input element 620 which is designed as an input element 620 of clutch F, which design has been taken from FIG. 9. As a difference to FIG. 9, clutch B, seen with respect to spatial conditions, is now completely radially located above clutch F, whereby the disk set 200 of clutch B is placed radially over the disk set 600 of clutch F, and whereby the servoapparatus 210 of clutch B is placed radially over the servoapparatus 610 of clutch F.

As may be further seen from FIG. 10, the common disk carrier ZYLBF of the two clutches B, F, is, geometrically speaking, in the form of a pot, open in the direction of the transfer gear set VS (that is, the main planetary gearset HS). At the outside diameter of this disk carrier ZYLBF is provided a graduated section of a cylinder, on that end of the inside diameter thereof, namely that end thereof proximal to the transfer planetary gearset VS, are placed the outer disks of the disk set 600 of the (radially inner) clutch F and on the outside diameter the inner disks of the disk set 200 of the (radial outer) clutch B are located. Both disk sets 600 and 200 also axially border on the transfer planetary gearset VS. Starting from that end of the graduated cylindrical section of the disk carrier ZYLBF, remote from the transfer planetary gearset VS, a platelike section of the disk carrier ZYLBF extends parallel to the housing wall GW, reaching radially inward as far as a hub 633 of the disk carrier ZYLBF. This hub 633 then extends from the inside diameter of the platelike section of the disk carrier ZYLBF, proceeding axially in the direction of the transfer planetary gearset VS and is rotatably connected to the transmission housing fixed hub GN, onto which the sun gear SO_VS of the transfer planetary gearset VS is also rotatably attached.

The servoapparatus 610 of clutch F is completely placed inside of a cylindrical space, which space is formed by way of the graduated cylindrical section and the platelike section of the disk carrier ZYLBF and rotates continually at the speed of rotation of the first input element (thus the first sun gear S1_HS) of the main planetary gearset HS. As this is done, the servoapparatus 610 includes a pressure chamber 611, a pressure offset chamber 612, a piston 614, a reset element 613 and a sealing plate 615. The piston 614 is placed in the disk carrier ZYLBF so it is sealed with pressure fluid and is axially slidable and by way of the reset element 613, which here, for example, is shown as a plate spring, exerts spring force against the hub-section 633 of the disk carrier ZYLBF. The pressure chamber 611 is formed by the piston 614 and a portion of the inner casing surface of the disk carrier ZYLBF. For the offset of the pressure of rotation of the pressure chamber 611, a dynamic pressure offset is provided by a pressure offset chamber 612, whereby this pressure offset chamber 612 is formed by the piston 614 and the sealing plate 615 and is placed nearer to the transfer planetary gearset VS (also the main planetary gearset HS) than the pressure chamber 611.

The pressure fluid and the lubricant supplies for the servoapparatus 610 of clutch F are carried out in a constructively, relatively simple manner by way of the transmission affixed hub GN, whereby the corresponding channels, that is to say, the corresponding borings for this purpose, run inside of the housing hub GN and sectionally within the hub 633 of the disk carrier ZYLBF. One pressurized fluid feed to the pressure chamber 611 of the servoapparatus 610 of clutch F is designated with the reference number 616, a lubricant conduit to the pressure offset chamber 612 of the servoapparatus 610 of clutch F is denoted by 617. If the pressure chamber 611, for the purpose of engaging clutch F with pressurized fluid, be so subjected thereto, then the piston 614 displaces axially in the direction of the transfer planetary gearset VS (i.e., in the direction of the main planetary gearset HS) and activates the disk set 600, which is assigned to the piston 614, acting counter to the spring force of the reset element 613.

As has already been mentioned, the servoapparatus 210, the (radially outward) clutch B, spatially considered, is placed in an area radially located above the servoapparatus 610 of the (radially inward) clutch F. This servoapparatus 210 includes a pressure chamber 211, a pressure offset chamber 212, a piston 214, a reset element 213 and a support structure 218. Thereby, the pressure chamber 211 of the servoapparatus 210 of the (radially outward) clutch B is placed at least somewhat radially above the pressure chamber 611 of the servoapparatus 610 of the (radially inner) clutch F and the pressure offset chamber 212 of the servoapparatus 210 of the (radially outer) clutch B is placed at least somewhat radially above the pressure offset chamber 612 of the servoapparatus 610 of the (radially inner) clutch F. The pressure chamber 211 is formed by way of the piston 214, the support structure 218 and a portion of the outer casing surface of the disk carrier ZYLBF. In this matter, the support structure 218 is geometrically designed in the form of an open pot, which is open in the direction of the disk set 200 (that is to say, in the direction of the transfer planetary gearset VS), which is enclosed in the outer casing of the piston 214, and the pot bottom of which is attached, on its inside diameter, onto the outside diameter of the platelike section of the disk carrier ZYLBF. In the illustrated embodiment is shown, for fastening of the support structure 218 on the disk carrier ZYLBF, a torque carrying, pressure medium sealed, shape fit profile and for the axial affixing a security ring, is provided. Thus the piston 214 is sealed with pressure medium, made to be axially slidable, and is placed under filling between the inside diameter of the cylindrical section of the support structure 218 and the outside diameter of the graduated section of the disk carrier ZYLBF. The reset element 213 is, in this case, constructed as a spring package of helical arranged spring coils.

A feed line 216 for pressure fluid to the pressure chamber 211 of the servoapparatus 210 of clutch B runs partially within the transmission housing affixed hub GN and partially within the disk carrier ZYLBF. The pressure offset chamber 212 of the servoapparatus 210 of the (radially outer) clutch B, which is located, in a space saving manner directly above the pressure offset chamber 612 of the servoapparatus 610 of the (radially inner) clutch F and is filled with lubricant at atmospheric pressure. In this arrangement, at least one radial boring is provided through the diameter of the piston 614 of the servoapparatus 610, which, first, opens in the pressure offset chamber 612 of the servoapparatus 610 and second, opens outward into a lubricant sealed ring channel on the inside diameter of the graduated cylindrical section of the disk carrier ZYLBF. Further, in the graduated cylindrical section of the disk carrier ZYLBF at least one radial boring is provided, with first, opens into the ring channel on the inside diameter of the graduated cylindrical section of the disk carrier ZYLBF and second, opens in the pressure offset chamber 212 of the servoapparatus 210. The corresponding borings, that is, the channels, between the two pressure offset chambers 612, 212 are designated in FIG. 10 with reference number 217. If the pressure chamber 211 of the servoapparatus 210 is filled, for the purpose of engaging clutch B, with pressurized fluid, then the piston 214 moves in the arial direction toward the transfer planetary gearset VS (i.e., the main planetary gearset HS) and activates the disk set 200, which is thereto assigned, activation taking place counter to the spring force of the reset element 213.

For the transmission of speed of rotation and torque between first, the disk carrier ZYLBF, which respectively forms the output element of the two clutches B, F, and second the first sun gear S1_HS of the main planetary gearset HS, there is provided—as in FIG. 9—a cylindrical connection element ZYL, which is geometrically designed as an pot, opening in the direction of the housing wall GW, having a casing, which the component group of the two clutches B, F partially and the transfer planetary gearset VS as well as the two clutches E and A fully encompass in an axial direction and on its end proximal to the housing wall GW, is bound with the support structure 218 by way of an appropriate shape-fit profiling, as well as with a platelike pot bottom, which extends beside clutch A and its side, proximal to the main planetary gearset HS, extends inward and in its hub area is rotationally fixed to the first sun gear 240. This first sun gear 240 again, is connected with the output element 330 of the brake C and with the first sun gear S1_HS, proximal to the transfer planetary gearset VS and is part of the main planetary gearset HS.

Figure 11:
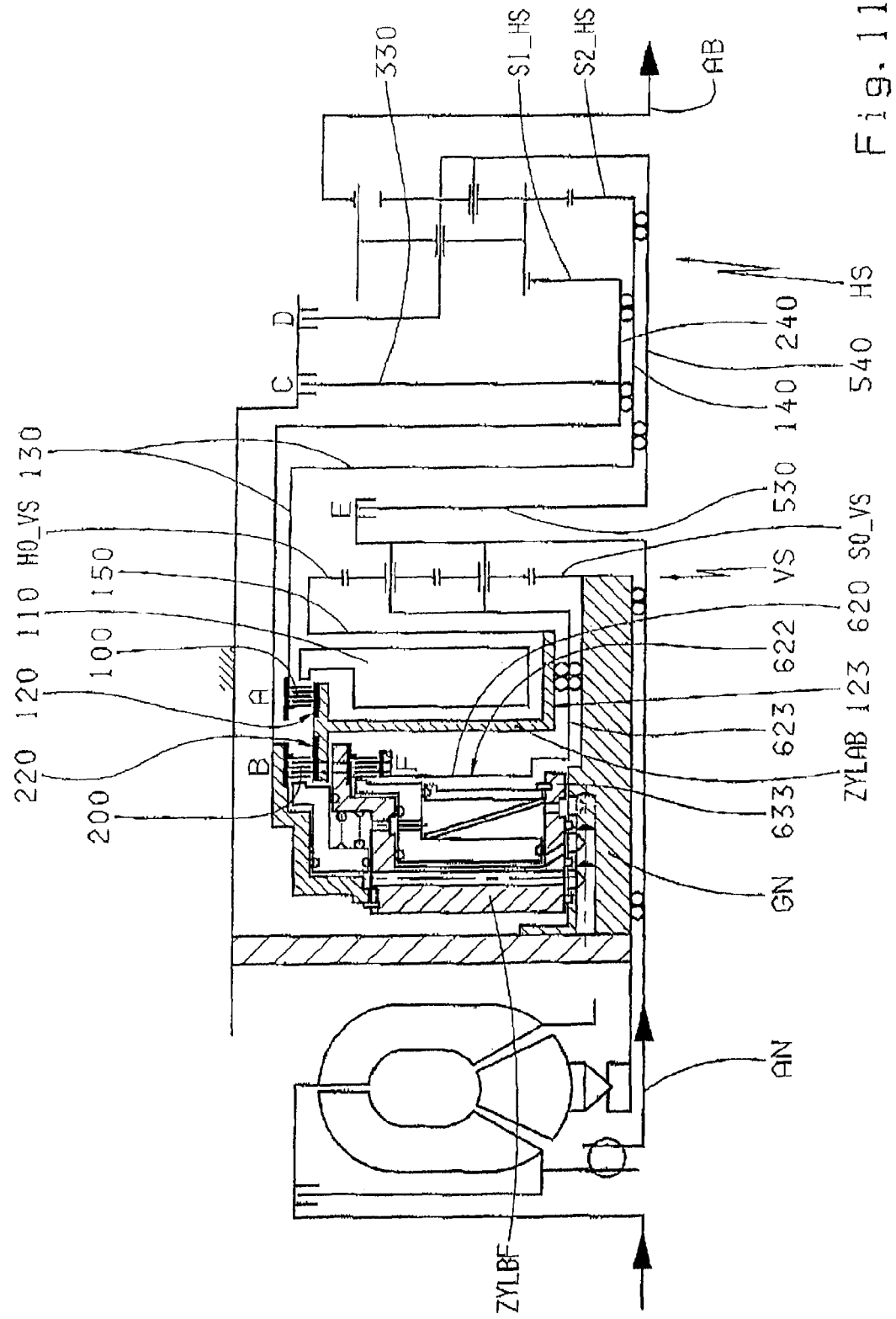
FIG. 11 is a tenth scheme of an inventive transmission.

Considering now FIG. 11, a tenth exemplary transmission scheme, in accord with the present invention, based on the previously examined FIG. 10, wherein the ninth inventive transmission scheme was described. The essential difference to FIG. 10 concerns the spatial placement of clutch A. At least, the disk set 100 of clutch A is now on that side of the transfer planetary gearset VS remote from the main planetary gearset HS, and is axially placed between this transfer planetary gearset VS and the component group, which is composed of the two clutches B and F. From this arrangement, there arises the possibility of an outside placement of the input element 620 of clutch F in connection with a favorable placement of the input elements 120, 220 of clutches A and B.

In the embodiment shown in FIG. 11, the input element 620 of clutch F, is designed as an inner disk carrier, possesses a disk-shaped section 622, which extends from the disk set 600 of clutch F radially inward, as far as just above the transmission housing affixed hub GN, as well as to the hub 623, which hub attaches to the disk-shaped section 622 in the area of the inside diameter thereof and extends in the direction of the transfer planetary gearset VS up to immediately before the sun gear SO_VS thereof and in this area is rotationally fixed to that carrier plate of the coupled carrier ST_VS of the transfer planetary gearset VS. Accordingly, this hub 623 of the input element 620 is rotatably connected on the transmission housing fixed hub GN with a relatively wide base of fixation.

For the two clutches A, B, a common disk carrier ZYLAB is provided and this provides, for the two clutches A, B, their input element, namely 120, 220. Geometrically speaking, this disk carrier ZYLAB is essentially constructed in the form of a cylinder. A hub 123 of the disk carrier ZYLAB is rotatably fixed on the hub 623 if the input element 620 of clutch F. A platelike section of this disk carrier ZYLAB closes on the hub 123 and extends radially outward up to a diameter which is greater than the that of the ring gear HO_VS of the transfer planetary gearset VS and somewhat inside the diameter of the disk sets 100, 200 of the two clutches A and B. An the outside diameter of the platelike section of the disk carrier ZYLAB there is attached a first cylindrical section, which is assigned to the input element 120 of clutch A and which extends axially in the direction of the transfer planetary gearset VS. On its outside diameter, the disk carrier ZYLAB holds the (in this case fabricated as inward-toothed steel disks) inner disks of the disk set 100 of clutch A. As a second function, there is attached to the outside diameter of the platelike section of the disk carrier ZYLAB a second cylindrically shaped section, which is assigned to the input element 220 of clutch B, and which extends in a direction opposite to that of the transfer planetary gearset VS and on its outside diameter retains the (which here, for example, are designed as inward-toothed, coated disks) inner disks of the disk set 200 of clutch B. For a kinematic connection of the disk carrier ZYLAB, which, respectively, forms the input element for both clutches A, B, onto the output element of the transfer planetary gearset VS—as well as on the transfer planetary gearset HO_VS—a shape fit complementary profiled connection 150 is provided, which extends directly bordering the transfer planetary gearset VS and running parallel to that side of the transfer planetary gearset VS remote from the main planetary gearset HS, and, by way of appropriate connection means is bound to the ring gear HO_VS of the transfer planetary gearset VS and the hub 123 of the disk carrier ZYLAB.

The output element 130 of clutch A is designed as an outer disk carrier, and geometrically speaking is in the form of an open pot, opening in the opposite direction from the main planetary gearset HS and further, which radially embraces in the axial direction, a servoapparatus 110 of clutch A, the transfer planetary gearset VS and clutch E. An end, remote from the main planetary gearset HS, of the cylindrical section, captures from this outer disk carrier 130 the (in this case, for example, the disks being made as outward-toothed, coated disks) outer disks of the disk set 100 of clutch A. On that end of the cylindrical section of the outer disk carrier 130, which is proximal to the main planetary gearset HS, there is attached a platelike section, this being the pot bottom, and extends radially inward and is, in its hub area, rotationally fixed to the second sun gear 140. This second sun gear 140, in turn, includes the carrier shaft 540, which is bound to the output element 530 of clutch F and extends radially inward to the first sun gear 240 which is bound to the first sun gear S1_HS of the main planetary gearset HS, continuing axially in the direction of the main planetary gearset the second sun gear S2_HS of the main planetary gearset HS.

The servoapparatus 110, intended for the activation of the disk set 100 of clutch A is, in this case, placed radially above hub 123 of the disk carrier ZYLAB and continually rotates at the same rotational speed of the output element, namely the that speed of the ring gear HO_VS of the transfer planetary gearset VS and activates the disk set 100, which is assigned to it, whereby, upon the engagement of clutch A, extends in an opposite axial direction from that of in the transfer planetary gearset VS and simultaneously likewise away from the main planetary gearset HS. Obviously, it is possible that the (here simplified in presentation for the sake of simplicity) servoapparatus 110 is made to possess a dynamic pressure offset means. A pressure and lubricant feed system to the servoapparatus 110 (not shown in greater detail) runs advantageously through appropriate channels, i.e., borings, which run sectionally within the following: the transmission housing affixed hub GN, the hub 623 of the inner disk carrier 620 of clutch F and the hub 123 of the common disk carrier ZYLAB, which serves clutches A, B in common.

In another embodiment variant of the positional placement of the servoapparatus 110 of clutch A, it is possible that, for example, provision can be made, that a piston of this servoapparatus 110 can be axially slidably attached in the output element 130 of clutch A and a pressure chamber, that is to say, also a pressure offset chamber, of this servoapparatus 110 can be placed in an area axially located beside the output element 530 of clutch E. In this case, it is of advantage, that the outer disks of the disk set 100 of clutch A are designed as outward-toothed steel disks and the inner disks of the disk set 100 are fabricated as inward-toothed coated disks.

The spatial arrangements of the remaining transmission constructive elements of the tenth inventive transmission scheme as shown in FIG. 11, correspond to the same as exhibited in FIG. 10. On this account it is unnecessary to repetitively describe and explain their placement and function in this place.

Figure 12:
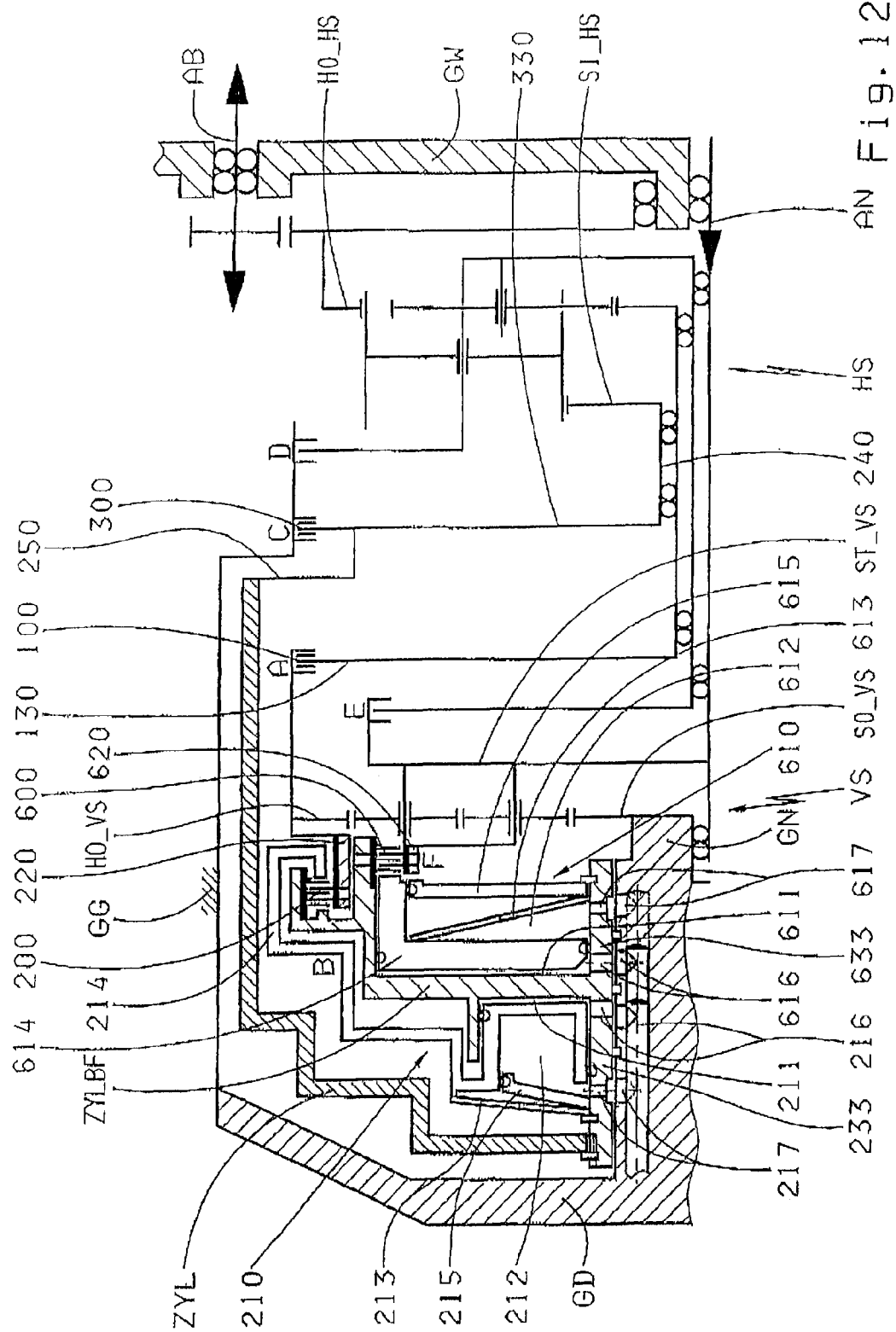
FIG. 12 is an eleventh scheme of an inventive transmission.

Considering now FIG. 12, an eleventh exemplary transmission scheme, in accord with the present invention, is presented and explained, the fundamental factors being based on the already described features put forth in the description given with the schematics of FIG. 9, showing the eighth arrangement of an inventive transmission. The essential difference to that shown in FIG. 9 concerns the constructive fabrication of the common disk carrier ZYLBF for the two clutches B and F and the activation direction of the servoapparatus 210 of clutch B upon its engagement, as well as concerning the spatial placement of the first, the input drive, and second the output drive of the transmission and their relation to one another. In the embodiment example shown in FIG. 12, the input drive shaft AN and the output drive AB are no longer, as previously, co-axially arranged. Rather these shafts now run axially parallel to one another. The output drive shaft of the transmission is now proximally located to the drive motor (not shown in detail), which in turn is bound to the input drive shaft AN. A first spur gear of the output element, in this case, bound to the ring gear HO_HS of the main planetary gearset HS, and a second sun gear meshing with the first sun gear of the transmission output are rotatably connected to a transmission housing fixed, housing wall GW, which in turn is proximal to the drive motor. The second sun gear, in a simplified presentation, is bound with the output drive shaft AB. Obviously, the possibility exists, that relative to this second sun gear and the output drive shaft AB also a differential can be kinematically inserted therebetween. The input drive shaft AN centrally penetrates the housing wall GW. From FIG. 12 one can easily detect, that, although this transmission scheme, because of the special constructive arrangement of its component group with the two clutches B, F, is particularly favorable for its installation in a motor vehicle with a so-called "front-end cross drive", the expert would modify this arrangement of input and output drive shafts, i.e., AN and AB, upon need, and do so without any particular expense of time and material, for a input drive shaft train with a co-axial positioning of the input and output drive shafts AN, AB.

As may be further learned from FIG. 12, the main planetary gearset HS is now placed near the motor and is completely penetrated in the axial direction by the input drive shaft AN through its center, wherein the input drive shaft AN is connected with the coupled carrier ST_VS of the transfer planetary gearset VS. Correspondingly, the transfer planetary gearset VS is now placed on the drive-motor side of the main planetary gearset HS. The spatial positioning of the shifting elements E, A, C, D—especially the frictional elements of these shifting elements E, A, C and D—in the area which is axially disposed between the transfer planetary gearset VS and the main planetary gearset HS is simply taken from the arrangement of FIG. 9. Similarly to FIG. 9, clutches B and F form a factory assembled, ready to mount, construction group, which is to be placed on that side of the transfer planetary gearset VS which is remote from the main planetary gearset HS and is to be found directly bordering on the transfer planetary gearset VS and now axially located between the transfer planetary gearset VS and a transmission housing affixed housing cover GD. This housing cover GD forms the outer wall of the transmission housing GG, which wall lies opposite to the drive motor. Obviously, it is possible that the housing cover GD and the transmission housing GG can also be made in one piece. Accordingly, the housing cover GD possesses a transmission fixed hub GN, which extends in the direction of the transfer planetary gearset VS, and which is rotatably placed and upon which the common disk carrier ZYLBF, for the two clutches B, F, is rotatably connected. The sun gear SO_VS of the gearset VS is fastened to the hub GN on the transmission housing GG.

The disk carrier ZYLBF forms, for both clutches B, F, an output element which is bound to the first input element (sun gear S1_HS) of the main planetary gearset HS, denotes a difference to FIG. 9. However, for both clutches B, F, the disk carrier now serves as an outer disk carrier ZYLBF for the retention of the outer disks of the respective disk set, 200 and/or 600. Correspondingly, the input elements 220, 620 of both clutches B, F are now serving as inner disk carriers for the retention of the inner disks of the respective disk sets 200, 600. Accordingly, the disk set 200 of clutch B is placed at a greater diameter than the disk set 600 of clutch F, spatially considered, in an area somewhat radially outward of this disk set 600.

Geometrically seen, the common disk carrier for clutch B, F, namely ZYLBF possesses an essentially cylindrical structure. A hub of the disk carrier ZYLBF is on the transmission housing fixed hub GN of the housing wall GW and rotatably connected thereto. Starting from this hub of the disk carrier ZYLBF, a first platelike section of the disk carrier ZYLBF extends, somewhat centrally in the hub radially outward somewhat to the outside diameter of the disk set 600 of clutch F (here, for example, somewhat as far as the diameter of the ring gear HO_VS of the transfer planetary gearset VS) and separates thereby, this hub of the disk carrier ZYLBF geometrically into two hub-sections 633 and 233. The hub-section 633 extends axially in the direction of the transfer planetary gearset VS as far as to the sun gear SO_VS thereof—as is evident from the given nomenclature—and is assigned to the output element of clutch F. The other hub-section 233 is assigned to the output element of clutch B and extends axially in the direction of the housing cover GD. On the outside diameter of the first platelike section of the disk carrier ZYLBF, a first cylindrical section of the disk carrier ZYLBF attaches thereto and extends axially in the direction of the transfer planetary gearset VS as far as a point over the disk set 600 of clutch F, which bordering on the transfer planetary gearset VS and possesses on its inside diameter, an appropriate shape fit profile connection for the retention of the outer disks of the disk set 600. On the outside diameter of this first cylindrical section of the disk carrier ZYLBF—here, for example, spatially considered, somewhat in the center of the section—a second platelike section of the disk carrier ZYLBF attaches and extends radially outward to approximately the distance of the outside diameter of the (radial outward) disk set 200 of clutch B. At the outside diameter of this section of the disk carrier ZYLBF is attached a second cylindrical section of the disk carrier ZYLBF, which extends axially in the direction of the transfer planetary gearset VS as far as the disk set 200 of clutch B. The disk set 200 being proximal to the transfer planetary gearset VS and possesses on its inside diameter a complementary shape-fit profile for the retention of the outer disks of the disk set 200.

The servoapparatus 610 of clutch F, includes a pressure chamber 611, a pressure offset chamber 612, a piston 614 a reset element 613 and a sealing plate 615, and is placed completely within a cylindrical space, which is formed by the first platelike and the first cylindrical section of the disk carrier ZYLBF, which is essentially radially placed above the hub-section 633. The piston 614 is axially and slidably placed on the disk carrier ZYLBF (specifically on the hub-section 633 and on the first cylindrical section of the disk carrier ZYLBF) and sealed with pressure fluid. Correspondingly, the servoapparatus 610 rotates continually at the speed of rotation of the first input element (in this case, the sun gear S1_HS) of the main planetary gearset HS. For the offsetting of the rotational pressure of the turning pressure chamber 611 of the servoapparatus 610, a dynamic pressure offset means is provided by way of the pressure offset chamber 612 which is filled with lubricant at atmospheric pressure, in which case, this pressure offset chamber 612 is set nearer to the transfer planetary gearset VS (to the main planetary gearset HS) than the pressure chamber 611. In this case, the pressure chamber 611 is formed from a casing surface of the disk carrier ZYLBF (specifically by the first platelike section of the disk carrier ZYLBF, a part of the first cylindrical section of the disk carrier ZYLBF and a part of the hub-section 633) and the piston 614. The pressure offset chamber 612 is built up from the piston 614, and the sealing plate 615, which is axially fixed to the hub-section 633 of the disk carrier ZYLBF and is sealed with lubricant opposite the piston 614 whereby it is axially and slidably installed. The piston 614 is, by way of the reset element 613, which is, in this case, constructed of a plate spring, forced in an axial direction against the hub-section 633 of the disk carrier ZYLBF. In the case of a subjection of the pressure chamber 611 to the presence of pressure medium, for the purpose of engaging clutch F, the piston 614 moves in the direction of the transfer planetary gearset VS (in the direction of the main planetary gearset HS) and activates that disk set 600 which has been assigned to it, thus working counter to the spring force of the reset element 613.

Seen from a spatial viewpoint, the servoapparatus 210 of clutch B is at least generally placed in an area located radially above the second hub-section 233 of the disk carrier ZYLBF and is also slidably fastened in an axial direction to the disk carrier ZYLBF. Correspondingly the servoapparatus 210 rotates continually at the speed of rotation of the first input element (in this case the sun gear S1_HS) of the main planetary gearset HS. The servoapparatus 210 of clutch B includes a pressure chamber 211, a pressure offset chamber 212, a partially irregularly shaped piston 214, a reset element 213 and a sealing plate 215. For offsetting the rotational pressure of the turning pressure chamber 211 of the servoapparatus 210, a dynamic pressure offset is effected with the corresponding dynamic pressure offset chamber 212 which can be filled, at atmospheric pressure, with lubricant. For the formation of the pressure chamber 211 the disk carrier ZYLBF possesses a second cylindrical section, which extends axially from a first platelike section of the disk carrier ZYLBF in the direction of the housing wall GW. The piston 214 is mounted on the disk carrier ZYLBF, more exactly, is mounted on the hub-section 233 and on the third cylindrical section of the disk carrier ZYLBF in a slidable manner, while being sealed with pressure medium. Correspondingly the pressure chamber 211 is formed by a casing surface of the disk carrier ZYLBF (specifically by way of a part of the first platelike section of the disk carrier ZYLBF, a part of the third cylindrical section of the disk carrier ZYLBF and a part of the hub-section 233) and the piston 214. In its geometrical configuration the piston 214 overlaps the third cylindrical section of the disk carrier ZYLBF in the axial and the radial directions in an irregular shape and extends essentially along the outside contour of the disk carrier ZYLBF in a direction radially to the outside as far as the outside diameter thereof, and encloses, subsequently, the disk set 200 of clutch B in the axial and the radial directions, whereby an activation projection bound with this piston, or, alternately, an activation ring, acts from that side of the disk carrier packet 200, which is proximal to the transfer planetary gearset VS, on the disk carrier packet 200. The piston 214 is, for example, accordingly force loaded by the reset element 213, which is designed as a plate spring, to work counter to the hub-section 233 of the disk carrier ZYLBF. In the case of pressure application on the pressure chamber 211, by way of pressurized medium, for the purpose of engaging clutch B, the piston 214 displaces axially in the opposite direction from the transfer planetary gearset VS (as well as the main planetary gearset HS) against the disk set 200, which has been assigned to the piston, and which displacement is counter to the spring force of the reset element 213.

In a difference from FIG. 9, the pressure chamber 211 of the servoapparatus 210 of clutch B is now placed so as to be immediately neighboring the pressure chamber 611 of the servoapparatus 610 of clutch F, and is thereby separated therefrom by way of a casing surface of the common disk carrier ZYLBF for clutches B, F. The activation direction of these two servoapparatuses 210, 610 upon engagement of the respective clutch B and F are, in this case, different. In relation to the spatial positioning of the pressure chamber 211 and the disk set 200, clutch B, upon engagement, is now activated by tension.

As has already been mentioned, the servoapparatus 210 of clutch B possesses also a dynamic means for the offsetting of pressure. Spatially seen, the corresponding pressure offset chamber 212 is placed on that side of the piston 214, remote from the pressure chamber 211 of the servoapparatus 210, and is in an area radially beneath the third cylindrical section of the disk carrier ZYLBF. The pertaining pressure offset chamber 212 is formed from the piston 214 and the sealing plate 215, which is axially slidable and is sealed by lubricant and is axially fixed onto the hub-section 233 of the disk carrier ZYLBF.

Because of the placement of the disk carrier ZYLBF on the transmission casing fixed hub GN of the housing wall GW, there arises a constructive, relatively simple pressure and lubricant feed to both clutches B, F, by way of the corresponding channel, i.e., borings, which run partially inside the housing hub GN, and partially within the hub of the disk carrier ZYLBF. A pressure medium feed to the pressure chamber 211 of the servoapparatus 210 of clutch B is designated as 216. A lubricant feed to the pressure offset chamber 212 of the servoapparatus 210 of clutch B has the reference number 217 and a pressure medium feed to the pressure chamber 611 of the servoapparatus 610 of clutch F is designated with 616, and finally, a lubricant feed to the pressure offset chamber 612 of the servoapparatus 610 of clutch F has the reference number 617.

For transmission of the speed of rotation and the transmission of the torque between the disk carrier ZYLBF, which forms, respectively, the output element for the two clutches B, F and the sun gear S1_HS of the main planetary gearset HS, provision is made for a cylindrical connection element ZYL, which is constructed as a pot, open in the direction of the main planetary gearset HS. A pot bottom of this connection element ZYL extends in a radial direction between the housing cover GD and the piston 214 of the servoapparatus 210 of clutch B and is especially made to complementarily fit the contour of the piston 214, especially in the radially outward area. In the embodiment shown, this leads to the somewhat irregular, but still platelike contour of the pot bottom. In this way, the radial out end of the pot bottom is, for example, in a position somewhat above the first platelike section of the disk carrier ZYLBF. Furthermore, the housing wall GW is expanded to a greater diameter in the direction of the transfer planetary gearset VS, which, in turn, is especially of advantage, in that it allows the installation of the transmission in a motor vehicle with a "cross-front drive", since, the available installation space for the transmission in this area is normally very limited where the vehicle framing is concerned. In its hub area, the pot bottom of the connection element ZYL is rotationally fixed with the end of the hub located toward the side of the housing cover, that is to say, connected to the hub-section 233 of the disk carrier ZYLBF, which is carried out by way of a shape-fit, complementary profiling. An the outside diameter of the pot bottom, on a diameter greater than that of the outside diameter of the piston 214, there is attached a casing surface of the cylindrical connection element ZYL onto this pot bottom and extends axially in the direction of the main planetary gearset HS, and is doing so, encases completely, in a radial direction, the (essentially, radially located, one above the other) disk sets 200 and 600 of clutches B and F, the transfer planetary gearset VS, as well as clutches E and A. On that end of the cylindrical connection ZYL, proximal to the main planetary gearset HS and, spatially considered, in an area located axially between the disk set 100 of clutch A and the disk set 300 of the brake C, the cylindrical connection element ZYL is rotationally affixed to a complementarily profiled element 250. This profiled element 250, in turn, is connected with the output element 330 of the brake C, which is constructed as an inner disk carrier. The output element 330 of the brake C continues to extend axially, bordering on the output element 130 of clutch A, in an inward radial direction and is rotationally fixed in its hub area with a sun gear shaft 240. This sun gear shaft 240 is, once again, bound to the sun gear S1_HS of the main planetary gearset HS, wherein the sun gear lies proximal to the transfer planetary gearset VS.

In another embodiment, it is possible also to provide, that—with an unchanged spatial arrangement of the disk set 300 of the brake C in its area and located axially between clutch A and brake D—the cylindrical connection element ZYL simultaneously forms the inner disk carrier 330 of the brake C. If the disk set 300 of the brake C is placed radially beneath the outside diameter of the connection element ZYL, it becomes necessary that the section of the connection element ZYL, defined with the pot bottom, must be designed as a separately made component element. Obviously, it is possible that the brake C can be placed at a greater diameter than the outside diameter of the connection element ZYL. In still another embodiment, the possibility exists, that the brake C, spatially considered, can be placed also on that side of the transfer planetary gearset VS, remote from the main planetary gearset HS, for instance. This could be done in an area radially above clutch B or in an area between the housing cover GD and the pot bottom of the connection element ZYL, radially above the pressure offset chamber 212 of the servoapparatus 210 of clutch B.

Figure 13:
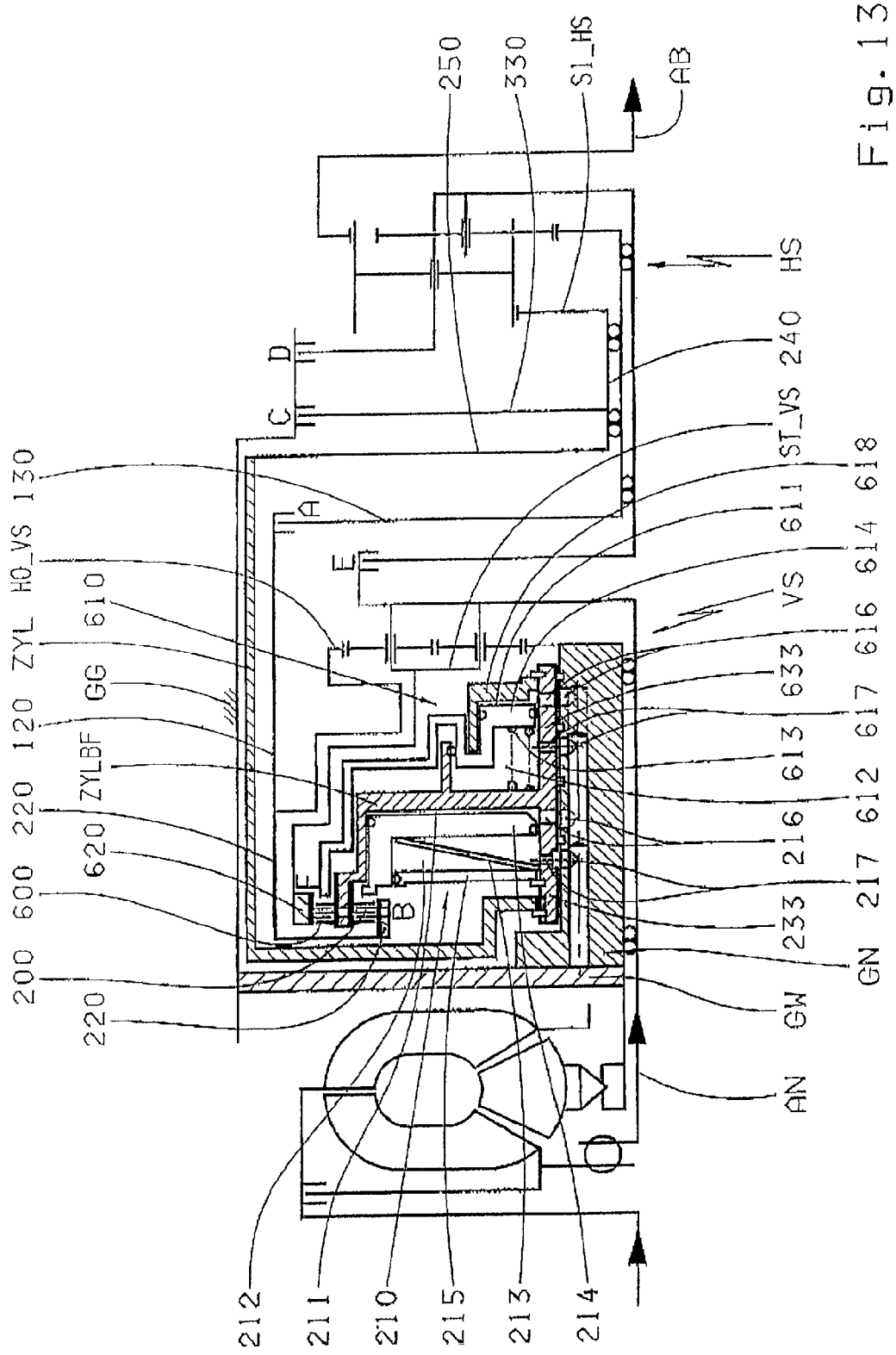
FIG. 13 is a twelfth scheme of an inventive transmission.

Now considering FIG. 13, a twelfth exemplary transmission scheme in accord with the present invention is described and explained, once again based on FIG. 9 which, in the above, described and explained the eighth inventive transmission scheme. The essential difference between this FIG. 13 and the FIG. 9, resides first, in the constructive assembly of the common disk carrier ZYLBF, which is provided for both clutches B and F, and second, in the arrangement of the disk sets 200, 600 of the two clutches B and F, and their relation to one another. In the embodiment shown in FIG. 13, the component group containing clutches B and F, which can be factory made for unit mounting, remains unchanged on that side of the transfer planetary gearset VS which side is remote from the main planetary gearset HS and is found in an area located axially between the transfer planetary gearset VS and a transmission housing fixed housing wall GW. With no changes, this component group includes the two clutches B, F as well as a common disk carrier ZYLBF to serve these two clutches B, F, also contains the servoapparatuses 210, 610 for the activation, respectively, of the disk sets 200, 600. An essential difference to FIG. 9 is, that the disk set 200 of clutch B is now placed on a lesser diameter than that of the disk set 600 of clutch F. Seen with respect to space, this occurs within an area located radially beneath the disk set 600. In this case, the two disk sets, 200 and 600, are located radially above one another, now on that side of the component group, remote from the transfer planetary gearset VS, i.e., proximal to the transmission casing fixed housing wall GW.

The common disk carrier ZYLBF, which serves the two clutches B, F and forms their output element and, respectively, performs for clutch F as the inner disk carrier for the retention of inward-toothed disk of the (radially outer) disk set 600 and performs for clutch B as an outer disk carrier for the outer disks of the (radially inner) disk set 200. Correspondingly, the input element 620 of clutch F is connected to the coupled carrier ST_VS of the transfer planetary gearset VS and in turn, by way of this carrier ST_VS is connected with the input drive shaft AN and the input element 620 is further serving as outer disk carrier for the outer disks of the disk set 600 of this clutch F. The input element 220 of clutch B, which is connected to the ring gear HO_VS of the transfer planetary gearset VS is designed as the inner disk carrier for the retention of the inward-toothed inner disks of the disk set 200 of this clutch B. Correspondingly, considering the spatial positioning of the two disk sets 200, 600, which are located, one above the other on that side of the component group remote from the transfer planetary gearset VS, that is to say, is proximal to the transmission housing affixed housing wall GW, the input element 220 of clutch B includes the input element 620 as well as the (radially outer) disk set 600 of clutch F and also the (radially inner) disk set 200 of clutch B completely in the axial and radial directions.

Geometrically speaking, the common disk carrier ZYLBF for its assigned clutches B, F, possesses an essentially cylindrical structure and is located on a transmission housing fixed hub GN, which extends, starting from the housing wall GW in the interior of the transmission space, axially in the direction of the transfer planetary gearset VS and is rotatably fastened thereto. On this hub GN is fixed, by way of an appropriate connection, the sun gear SO_VS of the transfer planetary gearset VS. Obviously, it is possible that the hub GN and the housing wall GW can also be made as one piece. For example, it is possible that the hub GN can also be an idler gear shaft of a torque converter in the flow of force between the input drive shaft AN and the drive motor of the transmission. On the outside diameter of the disk carrier ZYLBF is provided a first cylindrical section, on the inside diameter of which the outer disks of the disk set 200 of clutch B and on the outside diameter of which the inner disks of the disk set 600 of clutch F are located, whereby both disk sets 600 and 200, as stated, are placed proximal to the transmission housing affixed housing wall GW. Starting from the leasing gearset VS near end of the first cylindrical section of the disk carrier ZYLBF, thus on that side of the disk set 200 proximal to the transfer planetary gearset VS, there extends radially inward, an at least substantially platelike section of the disk carrier ZYLBF as far as the hub of the disk carrier ZYLBF. Accordingly, this hub is subdivided into two hub-sections, namely 633 and 233. Starting from the inside diameter of the platelike section of the disk carrier ZYLBF, the hub-section 633 extends axially in the direction of the transfer planetary gearset VS and is—as is evident from the selected nomenclature—assigned to the output element of clutch F. The other hub-section 233 is assigned to the output element of clutch B and extends, starting from the inside diameter of the platelike section of the disk carrier ZYLBF in an axial direction to the housing wall GW.

The servoapparatus 610 of clutch F for the activation of the radially outer disk set 600 includes a pressure chamber 611, a pressure offset chamber 612, a sectional, irregularly directed piston 614, a reset element 613 and a sectional cylindrical support structure 618 and is, essentially, placed radially above the (proximal to the transfer planetary gearset VS) hub-section 633 of the disk carrier ZYLBF. The piston 614 is fastened to the disk carrier ZYLBF in an axially slidable manner. Correspondingly, the servoapparatus 610 rotates at the speed of rotation of the first input element (in this case the first sun gear S1_HS) of the main planetary gearset HS. For the offset of the pressure of rotation of the turning pressure chamber 611 of the servoapparatus 610, a dynamic pressure offset is attained by way of a pressure offset chamber 612 which is filled, at atmospheric pressure, with lubricant. In this case, the pressure chamber 611 is closer to the transfer planetary gearset VS (i.e., the main planetary gearset HS) than the pressure offset chamber 612. For the formation of the pressure chamber 611, the support structure 618 is made tight by pressure medium fluid on that end of the hub-section 633 of the disk carrier ZYLBF, which end is proximal to the transfer planetary gearset VS and this support structure 618 is fixed and axially secured to the hub-section 633. The cylindrical section of the support structure 618 extends axially in the direction opposite to a direction toward the transfer planetary gearset VS. The piston 614 of the servoapparatus 610 is sealed off, by way of pressurized medium, from this cylindrical section of the support structure 618 and from the hub-section 633 of the click carrier ZYLBF, and possesses in this area an irregular contour. Correspondingly, the pressure chamber 611 of the servoapparatus 610 is constructed by the following components: the piston 614, the cylindrical section of the support structure 618, the platelike section of the support structure which is to be found radially beneath this cylindrical section of the support structure 618, as well as a part of the hub-section 633 of the disk carrier ZYLBF. For the construction of the pressure offset chamber 612 of the servoapparatus 610, the servoapparatus of the disk carrier ZYLBF possesses on a predetermined diameter greater than the diameter of the cylindrical section of the support structure 618, a second cylindrical section, which, extends axially, going from the platelike section of the here exemplary one-piece disk carrier ZYLBF in the direction of the transfer planetary gearset VS. The piston 614, which, in this area is of irregular contour, is sealed off by lubricant from this second cylindrical section of the disk carrier ZYLBF, but is slidably connected thereto. Correspondingly, the pressure offset chamber 612 is formed by way of the piston 614, the second cylindrical section of the disk carrier ZYLBF and the platelike section of the disk carrier ZYLBF, which is located radially beneath this second cylindrical section of the disk carrier ZYLBF. In further continuation, the piston 614 extends at last substantially along the outer contour of the radial upper area of the disk carrier ZYLBF and running radially outward and axially in the direction of the housing wall GW to that side of the disk set 600 of clutch F, proximal to the transfer planetary gearset VS. The piston 614 is axially loaded by way of the reset element 613, which in this case is designed as a helical gear package placed axially between the platelike section of the disk carrier ZYLBF and the piston 614. In the case of a pressurizing 614 of the pressure chamber 611 with pressure medium for the engagement of clutch VF the piston moves axially in the direction of the housing wall GW (that is, axially in the opposite direction to the transfer planetary gearset VS and to the main planetary gearset HS) as activates the disk set 600, which is assigned thereto, against the spring force of the reset element 613. The piston 614 nearly completely embraces also the common disk carrier ZYLBF which serves the two clutches B, F.

Seen with spatial concern, the servoapparatus 610 of clutch F is placed nearer to the output and transfer planetary gearsets HS, VS than the servoapparatus 210 of clutch B. This servoapparatus 210 of clutch B, including a pressure chamber 211, a pressure offset chamber 212, a piston 214, a reset element 213 and a seal plate 215 are all completely within a cylindrical space, which is formed by the first cylindrical section, which is proximal to the housing wall, and the platelike section of the disk carrier ZYLBF, and is essentially above the hub-section 233, which section is remote from the transfer planetary gearset VS. The piston 214 is attached in an axial direction on the disk carrier ZYLBF. Correspondingly, the servoapparatus 210 rotates continually at the speed of rotation of the first input element (in this case that of the first sun gear S1_HS) of the main planetary gearset HS. To offset the rotational pressure of the turning pressure chamber 211, the servoapparatus 210 is provided with a dynamic pressure offset means, namely with the pressure offset chamber 212 which is filled with lubricant at zero pressure, whereby the pressure chamber 211 is placed nearer to the transfer planetary gearset VS (that is to say, to the main planetary gearset HS) than the pressure offset chamber 212. Accordingly, the pressure chamber 211 is enclosed by a casing surface of the disk carrier ZYLBF (more exactly defined as a portion of the cylindrical section of the disk carrier ZYLBF, which portion is proximal to the housing wall GW), the platelike section of the disk carrier ZYLBF and a portion of the hub-section 233 of the disk carrier ZYLBF, which is proximal to the housing wall) and the piston 214. The pressure offset chamber 212 is formed by the piston 214 and the sealing plate 215, which is fixed axially onto the hub-section 233 of the disk carrier ZYLBF and is sealed with lubricant in against to the piston 214, and is axially slidable thereto. The pressure chamber 211 of the servoapparatus 210 of clutch B is also more proximal to the transfer planetary gearset VS (i.e., to the main planetary gearset HS) than the pressure offset chamber 212 of this servoapparatus 210, whereby the pressure chamber 211 of clutch B and the pressure offset chamber 612 of the servoapparatus 610 of clutch F are placed directly neighboring one another and are only separated, one from the other, by a casing surface of the disk carrier ZYLBF, which is common for both clutches, namely B, F. The piston 214 of the servoapparatus 210 is, in this case, loaded in an axial direction against the hub-section 233 of the disk carrier ZYLBF. When the pressure chamber 211 is subject to pressure by the pressure medium, for the purpose of engaging clutch B, the piston 214 moves axially in that direction contrary to the direction of the transfer planetary gearset VS (i.e., the main planetary gearset HS) and activates the disk set 200, which is assigned to it, this activation taking place counter to the direction of the spring force of the reset element 213.

Because of the positioning of the disk carrier ZYLBF on the transmission housing affixed hub GN, a constructively, simple feed system for the pressure medium and the lubricant is obtained to both clutches B, F. This is done by corresponding channels or borings, which are conducted sectionally within the housing hub GN and sectionally within the hub of the click carrier ZYLBF. A pressure medium feed system to the pressure chamber 211 of the servoapparatus 210 of clutch B is designated with the reference number 216, a lubricant conducting line to the pressure offset chamber 212 of the servoapparatus 210 of clutch B is designated as 217, a pressure medium feed to the pressure chamber 611 of the servoapparatus 610 of clutch F is referred to as 616 and a lubricant feed to the pressure offset chamber 612 of the servoapparatus 610 of clutch F has the reference number 617.

The connection of the disk carrier ZYLBF, which, as has been mentioned, forms the output element of both clutches B, F, with the first input element of the main planetary gearset HS—in this case connection with the sun gear S1_HS, which is proximal to the transfer planetary gearset VS and is a component of the Ravigneaux-planetary gearset type main planetary gearset HS—in a similar manner to the illustration in FIG. 12, a cylindrical shaped, connection element ZYL is provided, which, geometrically is constructed as a pot, opening in the direction of the main planetary gearset HS. Axially bordering on the housing wall GW and essentially parallel to this housing wall GW, is an essentially disk shaped pot bottom of this connection element ZYL, which extends in the radial direction, axially between the housing wall GW and a platelike section of the input element (inner disk carrier) 220 of clutch B, which runs on that side remote from the transfer planetary gearset VS, of the disk sets 200, 600 which are radially arranged, one over the other and assigned to clutches B, F, respectively. On its inside diameter, the pot bottom of the connection element ZYL is rotationally fixed to the hub of the disk carrier ZYLBF, in the illustrated example, shape-fit by way of a complementary profiling to the housing wall sided end of the hub-section 233. On the outside diameter of the pot bottom, on a diameter greater than the outside diameter of the disk set 600, and the outer disk carrier 620 of clutch F, is attached an annular casing surface of the cylindrical connection element ZYL to this pot bottom and this extends axially in the direction of the main planetary gearset HS and overlaps completely in the axial direction thereby, the (essentially radially positioned, one over the other) disk sets 200 and 600 of clutches B and F, the transfer planetary gearset VS, as well as clutches E and A. On its end, proximal to the main planetary gearset HS, the cylindrical connection element ZYL is rotationally fixed to a complementary shape fit, profiled plate 250. This profiled plate 250 extends into an area located axially between the output element 130 of clutch A and the output element 330 of the brake C. In the area of its inside diameter this profiled plate 250 is bound to a sun gear shaft 240 in a rotationally fixed manner. This sun gear shaft 240, in turn, is connected to the sun gear S1_HS, of the main planetary gearset HS, and is proximal to the transfer planetary gearset VS. Obviously, it is possible that this constructive solution of the kinematic connection of the disk carrier ZYLBF to the sun gear S1_HS is to be regarded as exemplary. It is possible that alternative and possible connections could have been already made clear in reference to FIG. 12.

The spatial arrangement of the remaining transmission elements of the twelfth inventive transmission scheme, in accord with FIG. 13, correspond to the arrangement disclosed in FIG. 9, on which account a repetitive description and explanation can be eliminated.

Figure 14:
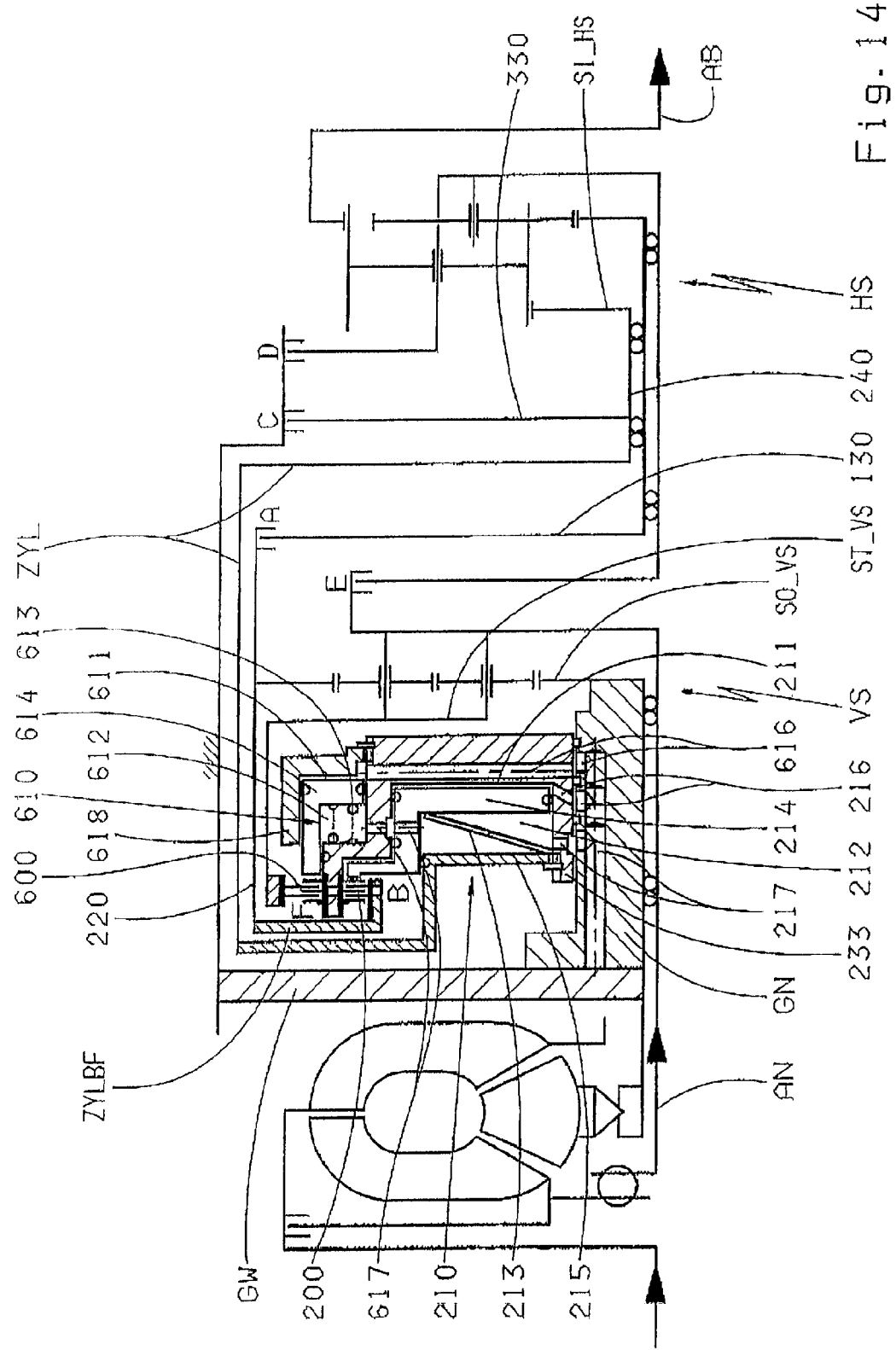
FIG. 14 is a thirteenth scheme of an inventive transmission.

Now considering FIG. 14, a thirteenth exemplary transmission scheme, in accord with the present invention is described and explained, based on the previously available FIG. 13, wherein a twelfth inventive transmission scheme has been described, whereby the changes in respect to FIG. 13 embraces principally the constructive design of the common disk carrier ZYLBF for the two clutches B, F and the spatial positioning of the servoapparatuses 210, 610 of these two clutches B, F. To this extent, it is possible to eliminate the repetitive description of the remaining transmission elements at this point. As may be seen in FIG. 14, the principle set forth in FIG. 10 of the radial superimposition of the servoapparatuses of the component group with the two clutches B, F is now again put to use in the formulation of the common disk carrier ZYLBF, which serves the two clutches B and F, by way of which the disk set 600 of clutch F is placed radially above the disk set 200 of clutch B and both disk sets 200, 600 are placed on that side of the component group, remote from the transfer planetary gearset VS.

Now, the servoapparatus 610 of clutch F, in spatial perspective, is placed radially above the servoapparatus 210 of clutch E. Accordingly, a pressure chamber 611 of the (radially outward) servoapparatus 610, placed somewhat radially above a pressure chamber 211 of the (radially inner) servoapparatus 210 and a pressure offset chamber 612 of a dynamic pressure offset of the (radially outer) servoapparatus 610, is located somewhat radially above a pressure offset chamber 212 for a dynamic pressure offset of the (radially inner) servoapparatus 210. Accordingly, the pressure chambers 211, 611 are placed closer to the transfer planetary gearset VS (the main planetary gearset HS) than the respective pressure offset chambers 212, 612.

As may be inferred further from FIG. 14, the common disk carrier ZYLBF for the two clutches B and F, is geometrically in the shape of a pot, which is open in the direction of the housing wall GW. On the outside diameter of this disk carrier ZYLBF is provided a graduated cylindrical section, on that end thereof, proximal to the housing wall GW, placed on the inside diameter are the outer disks of the disk set 200 of the (radially inner) clutch B and on the outside diameter of which, the inner disks of the disk set 600 (radially outer) of clutch F are placed. Both disk sets 600, 200 are placed to be proximal to the housing wall GW. Starting from that end of the graduated cylindrical section of the disk carrier ZYLBF, proximal to transfer planetary gearset VS, a platelike section of the disk carrier ZYLBF extends bordering along the coupled carrier ST_VS of the transfer planetary gearset VS and proceeds radially inward to a hub 233 of the disk carrier ZYLBF. This hub 233 extends, starting from the inside diameter of the platelike section of the disk carrier ZYLBF, proceeding axially in the direction of the housing wall GW and is rotatably fastened to a transmission housing fixed hub GN, on which also the sun gear SO_VS of the transfer planetary gearset VS is rotatably attached.

The servoapparatus 210 of clutch B is placed completely within a cylindrical space, with is formed by way of the graduated, cylindrical section of, as well as the platelike section of, the disk carrier ZYLBF. Accordingly, this servoapparatus 210 rotates correspondingly at the same speed of rotation of the first input element of the main planetary gearset HS, namely the first sun gear S1_HS. Accordingly, the servoapparatus 210 includes the following: the pressure chamber 211, the pressure offset chamber 212, a piston 214, a reset element 213, and a sealing plate 215. The piston 214 is axially and slidably placed in the disk carrier ZYLBF and sealed with pressure medium, and by way of the reset element 213, which in this case is a plate spring arrangement, is axially in force against the hub-section 233 of the disk carrier ZYLBF. The pressure chamber 211 is constructed from the piston 214 and a part of the inner casing surface of the disk carrier ZYLBF. The pressure offset chamber 212, for the offset of the rotational pressure of the turning pressure chamber 211 is on that side of the pressure chamber 211, remote from the transfer planetary gearset VS and is constructed from the combination of the piston 614 and the sealing plate 215.

The pressure medium and the lubricant supply of the servoapparatus 210 of clutch B is accomplished in a constructively, relatively simple manner by way of the transmission housing fixed hub GN, whereby the corresponding channels, i.e., the borings, run partly within the housing hub GN and partly within the hub 233 of the disk carrier ZYLBF. A pressure medium feed to the pressure chamber 211 of the servoapparatus 210 of clutch B is designated as 216, a lubricant feed to the pressure offset chamber 212 of the servoapparatus 210 of clutch B has the reference number 217. If the pressure chamber 211 is subjected to pressure by the pressurized medium for engaging clutch B, then the piston 214 moves axially in that direction, opposite to the direction to the transfer planetary gearset VS (the main planetary gearset HS) and activates the disk set 200, which is assigned to it, whereby the activation takes place counter to the spring force of the reset element 213.

As has already been mentioned, the servoapparatus 610 of the (radially outer) clutch F, considered from a spatial viewpoint, is placed in an area radially above the servoapparatus 210 of the (radially inner) clutch B. This servoapparatus 610 includes the following: a pressure chamber 611, a pressure offset chamber 612, a piston 614, a reset element 613 and a support structure 618. Accordingly, the pressure chamber 611 of the (radially outer) servoapparatus 610 is placed at least partially radially over the pressure chamber 211 of the (radially inner) servoapparatus 210 and the pressure offset chamber 612 of the (radially outer) servoapparatus 610 is at least partially located above the pressure offset chamber 212 of the (radial inner) servoapparatus 210. The pressure chamber 611 is constructed by the piston 614, the support structure 618 and a portion of the outer casing surface of the disk carrier ZYLBF. In this arrangement, the support structure 618 is geometrically in the shape of an pot, opening in the direction of the disk set 600 (that is to say, in the direction of the housing wall GW), the pot bottom thereof encases, within its inside diameter, the piston 614 outwardly and the pot bottom on its inside diameter is fixed on the outside diameter of the plate-like section of the disk carrier ZYLBF in a sealed manner, wherein the sealant is the pressure medium. In the disclosed example, a pressurized medium sealed, shape-fit profile serves for the fastening of the support structure 618 onto the disk carrier ZYLBF and for axial fixation thereof, a securement ring is provided. In this way, the piston 614 is slidably set and sealed with pressure medium, between the inside diameter of the cylindrical section of the support structure 618 and the outside diameter of the graduated cylindrical section of the disk carrier ZYLBF. Further, by way of the reset element 613 the piston is pressure-activated against the disk carrier ZYLBF. The reset element 613 is, in this case, constructed as a spring package of helical springs.

A pressure feed line 616 to the pressure chamber 611 of the servoapparatus 610 of clutch F runs partly within the transmission housing affixed hub GN and partly within the disk carrier ZYLBF. The pressure offset chamber 612 of the servoapparatus 610 of the (radial outer) clutch B, in a manner to save installation space, is filled directly from the pressure offset chamber 212 of the servoapparatus 210 (radially inner) clutch B with lubricant at atmospheric pressure. Accordingly, on the outside diameter of the piston 214 the (radially inner) servoapparatus 210 is provided with at least one radial boring, which first, opens into the pressure offset chamber 212 of the servoapparatus 610 and second, opens into an outward positioned lubricant sealed ring conduit on the inside diameter of the graduated cylindrical section of the disk carrier ZYLBF. Further, in the graduated cylindrical section of the disk carrier ZYLBF is provided at least one radial boring, which first, opens into the ring conduit on the inside diameter of the graduated section of the disk carrier ZYLBF and second, opens into the pressure offset chamber 612 of the (radially outer) servoapparatus 610. The corresponding borings, that is to say, the channels between the two pressure offset chambers 212, 612 are shown in FIG. 14 with the reference number 617. If the pressure chamber 611 of the servoapparatus 610 is filled with pressure medium for the purpose of engaging clutch F, then the piston 614 moves axially in the direction of the housing wall GW (that is to say, axially in that direction which is opposite to the direction of the transfer planetary gearset VS and the main planetary gearset HS) and activates the disk set 600, which has been assigned thereto, this activation taking place counter to the spring force of the reset element 613.

For the connection of the disk carrier ZYLBF, which forms the output element of the two clutches B, F, with the sun gear S1_HS, which sun gear is proximal to the main planetary gearset HS, a cylindrical shaped connection element ZYL is provided, which, geometrically speaking, is constructed as a pot, opening in the direction of the housing wall GW. A pot bottom of this connection element ZYL extends axially between the output element 130 of clutch A and the output element 330 of the brake C and is rotationally fixed, in the area of its inside diameter with a sun gear shaft 240. This sun gear shaft 240, in turn, is connected both to the output element 330 of the brake C as well as to the to the sun gear S1_HS, of the main planetary gearset HS, which is proximal to the transfer planetary gearset VS. On the outside diameter of the pot bottom of the connection element ZYL, which is a diameter greater than that of the outside diameter of clutch A, is attached an annular casing surface of the connection element ZYL to this pot bottom, which extends axially in the direction of the housing wall GW and completely, in an axial direction, overlaps, thereby, the two clutches A and E, the transfer planetary gearset VS, as well as clutch F (and therewith also clutch B, which is radially placed underneath clutch F). On that end of the connection element ZYL, is proximal to the housing wall, the connection element is bound in a rotationally fixed manner to the sealing plate 215 of the servoapparatus 210 of clutch B. As may be seen in FIG. 14, a radial, outer section of this sealing plate 215 extends in the area of the connection to the connection element ZYL, which is axially located between the housing wall GW and a platelike section of the input element (inner disk carrier) 220 of clutch B, which in turn runs on that side of the radially superimposed disk sets 200, 600 of clutches B, F, which is remote from the transfer planetary gearset VS. On its inside diameter, the sealing plate—as has already been mentioned—is rotationally fixed by a torque conducting shape-fit profiling with the hub 233 of the disk carrier ZYLBF.

Figure 15:
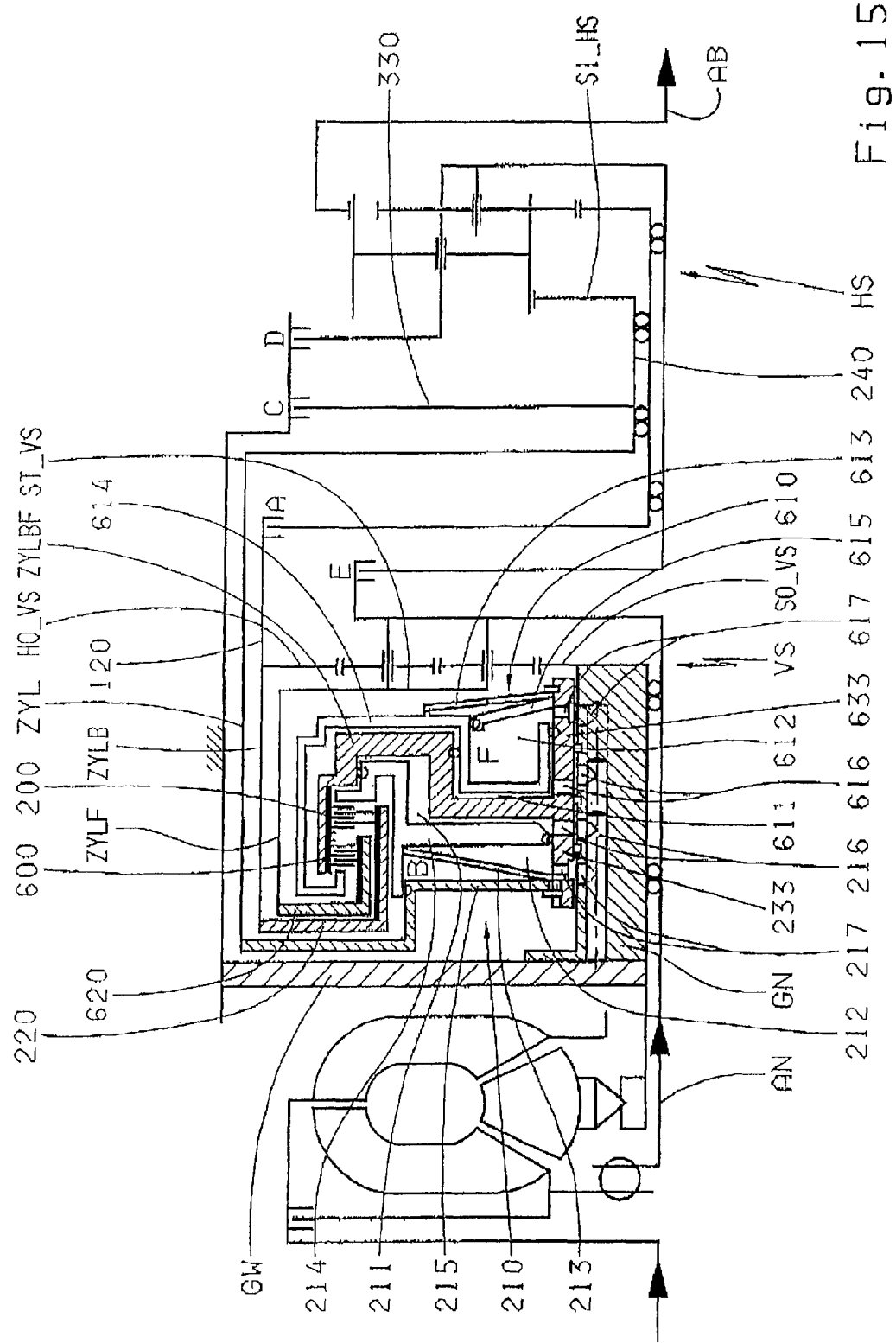
FIG. 15 is a fourteenth scheme of an inventive transmission.

Progressing to FIG. 15, a fourteenth exemplary transmission scheme, in accord with the present invention is described and explained. In a similar manner to the previously described, inventive transmission schemes, i.e., the component arrangements thereof, the two clutches B and F form a ready-made installation group, which is advantageous from the standpoint of manufacturing techniques. This so composed group is to be located on that side of the transfer planetary gearset VS remote from the main planetary gearset HS. Seen from a spatial perspective, this installation group is located axially between the transfer planetary gearset VS and a transmission housing affixed outer wall GW of the transmission. This stated location finds placed radially above a transmission fixed hub GN, which extends between the outer wall GW and the transfer planetary gearset VS. This installation group includes a common disk carrier ZYLBF, which serves both clutches B and F, a disk set 200 of clutch B and a servoapparatus 210 of clutch B which is dedicated to this disk set 200, a disk set 600 of clutch F and a servoapparatus 610 of clutch F, which is assigned to this disk set 600, an inner disk carrier 220 of clutch B and finally an inner disk carrier 620 of clutch F. First, the disk sets 200, 600 of the two clutches B, F are located beside one another, whereby the disk set 200 of clutch B is to be found nearer to the transfer planetary gearset VS (i.e., to the main, planetary gearset HS) than the disk set 600 of clutch F. Second, the servoapparatuses 210, 610 of the two clutches B and F are at least substantially likewise in axial alignment beside one another, whereby, however, the servoapparatus 610 of clutch F (as far as a compressive spring acting directly on the disk set 600 of this servoapparatus 610) is located nearer to the transfer planetary gearset VS (that is to say, nearer to the main planetary gearset HS) than the servoapparatus 210 of clutch B, a positioning which will be explained later. The disk carrier ZYLBF forms a output element for both clutches B, F and is correspondingly the leading kinematic clutch which is rotationally fixed to the first input element (in this case, the first sun gear S1_HS) of the main planetary gearset HS, which connection, again, will be explained below.

Geometrically, the disk carrier ZYLBF, which is employed in common for both clutches B, F, possesses an essentially cylindrical structure and is rotatably fixed to the hub GN, which extends axially from the housing wall GW in the interior of the transmission in the direction of the transfer planetary gearset VS. On this hub GN, the sun gear SO_VS of the transfer planetary gearset VS is affixed by way of an appropriate connection. In a difference from the exemplary presentation in FIG. 15, it is also possible that the hub GN and the housing wall GW can be made as a one-piece component. For instance, it is also possible that the hub GN can further possess an idler gear of a torque converter set in the power path between the input drive shaft AN and the drive motor of the transmission. On the outside diameter of the disk carrier ZYLBF is to be found a cylindrical section, on the inside diameter of which both the outside disks of the disk set 200 of clutch B as well as the outside disks of the disk set 600 of clutch F are to be found. In this case—as already been mentioned—the disk set 200 is located nearer to the transfer planetary gearset VS than the disk set 600. Starting from that end of the cylindrical section of the disk carrier ZYLBF, proximal to the transfer planetary gearset VS, an irregularly shaped section of the disk carrier ZYLBF extends radially inward toward the hub of the disk carrier ZYLBF. In this case, this hub is subdivided into two parts, namely hub-section 633 and 233. Starting from the inside diameter of the irregularly shaped section of the disk carrier ZYLBF the hub-section 633 extends in the direction of the transfer planetary gearset VS and is—as is evident from the given nomenclature—assigned to the output element of clutch F. The other hub-section 233 is assigned to clutch B and extends, starting from the inside diameter of the irregularly formed section of the disk carrier ZYLBF axially in the direction of the housing wall GW.

The servoapparatus 210 of clutch B, which includes a pressure chamber 211, a pressure offset chamber 212, a piston 214, a reset element 213 and a sealing plate 215, is placed completely within a cylindrical enclosure, which is bounded by the disk carrier ZYLBF, which is essentially radially above the hub-section 233. The piston 214 is slidably fixed to the disk carrier ZYLBF and is sealed thereagainst by the pressurized medium. The pressure chamber 211 is placed on that side of the irregularly shaped section of the disk carrier ZYLBF, remote from the transfer planetary gearset VS. The pressure chamber 211 is formed by a casing surface of the disk carrier ZYLBF (more exactly described, by a part of the irregularly shaped section of the disk carrier ZYLBF and a part of the hub-section 233) and the piston 214. For the offset of the rotational pressure of the turning pressure chamber, the servoapparatus 210 is provided with dynamic pressure offset 212 by way of the pressure offset chamber which is subjected to lubricant at atmospheric pressure, the pressure offset chamber 212 being located on that side of the piston 214 remote from the transfer planetary gearset VS. The pressure offset chamber 212 is formed by way of the piston 214 and the sealing plate 215, which is fixed axially onto that end of the hub-section 233 of the disk carrier ZYLBF, proximal to the housing wall GW. The pressure offset chamber 212 is further sealed against the piston 214 by lubricant and is axially slidable in reference to the piston 214. The pressure chamber 211 is also placed nearer the transfer planetary gearset VS (i.e., to the main planetary gearset HS) than the pressure offset chamber 212. The piston 214, by way of the reset element 213, which in this case, for example, is a plate spring, is subjected under the force of spring, in an axial direction against the hub-section 233 of the disk carrier ZYLBF. In the case of pressure application within the pressure chamber 211 with pressurized medium, for the purpose of engaging clutch B, the piston 214 moves axially in that direction opposite to the direction toward the transfer planetary gearset VS (toward the main planetary gearset HS) and in doing so, activates the disk set 200, which is assigned thereto, against the spring force of the reset element 213.

Seen in respect to spatial positioning, the servoapparatus 610 of clutch F is at least substantially closer to the transfer planetary gearset VS (i.e., to the main planetary gearset HS) than the servoapparatus 210 of clutch B, again, spatially observed, at least substantially in an area radially located above the hub-section 633 of the disk carrier ZYLBF, proximal to the transfer planetary gearset VS. The servoapparatus 610 of clutch F includes: a pressure chamber 611, a pressure offset chamber 612, a partly irregularly formed piston 614, a reset element 613 and a platelike sealing plate 615. The piston 614 is, geometrically speaking, of a complementary fit to the outer contour of the disk carrier ZYLBF, which outer contour is substantially proximal to the transfer planetary gearset VS and is mounted in an axially slidable manner on the disk carrier ZYLBF. Accordingly, the hub-section 633 and the irregularly shaped section of the disk carrier ZYLBF are sealed against the piston 614 by pressure medium. The pressure chamber 611 is located on that side of the irregularly shaped section of the disk carrier ZYLBF proximal to the transfer planetary gearset VS and is formed by way of a casing surface of the disk carrier ZYLBF, (in a more exact location, by way of a part of the irregularly shaped section of the disk carrier ZYLBF and a part of the hub-section 633) and the piston 614. In its further geometric extent, the piston 614 extends radially outward to a diameter which is greater than the outside diameter of the disk carrier ZYLBF and thus overlaps the two disk sets 200, 600 which are set next to one another and axially aligned and radially in direction and the piston 614 acts from that side of the disk set 600, which is remote from the transfer planetary gearset VS to that disk set 600 of clutch F to which it is assigned. The section of the piston 614, which embraces the two axially contingently arranged disk sets 200, 600, has been previously designated as "pressure plate of the servoapparatus 610" and is formed, because of ease of mounting, as a separate component, the end of which acts upon the disk set 600, the other end of which is fixed on the outside diameter of the piston of the servoapparatus 610, wherein the fixation can be, for example a shape-fit. Instead of a rotational-symmetrical compression plate spring, it is possible, obviously, to evenly apportion, on the outer circumference at the outside diameter of the piston 614 of the servoapparatus 610, affixed projections. For the offset of the rotational pressure of the turning pressure chamber 611, of the servoapparatus 610, a dynamic pressure offset is created by a pressure offset chamber 612 which can be filled with lubricant under no pressure, whereby the pressure offset chamber 612 is on that side of the piston 614, proximal to the transfer planetary gearset VS. The pressure offset chamber 612 is formed by way of the piston 614 and the sealing plate 615, which is axially fixed on that end of the hub-section 633 of the disk carrier ZYLBF, proximal to the transfer planetary gearset VS and is sealed against the piston 614 by way of lubricant and is further installed to be axially slidable. The pressure offset chamber 612 is also closer to the transfer planetary gearset VS (to the main planetary gearset HS) than the pressure chamber 611. The piston 614 is under force by the reset element 613, which here functions as a plate spring, axially against the hub-section 633 of the disk carrier ZYLBF, whereby this plate spring is place outside of the pressure offset chamber 612, thus being on that side of the sealing plate 615 proximal to the transfer planetary gearset VS. In a case, wherein the pressure chamber 611 is subjected to pressure by pressurized medium for the purpose of engaging clutch F, the piston 614 moves axially in the direction of the transfer planetary gearset VS (that is to say, in the direction of the main planetary gearset HS) and activates the disk set 600, which has been assigned thereto. This activation takes place counter to the spring force of the reset element 613.

The pressure chamber 611 of the servoapparatus 610 of clutch F is separated from the pressure chamber 211 of the servoapparatus 210 of the clutch B only by way of a casing surface of the common disk carrier ZYLBF, which serves both clutches B, F. The directions of activity of the servoapparatuses 210, 610 upon the engagement of the respectively assigned disk sets 200 and 600 are counter to each other to the force of the spring of the reset element.

Because of the placement of the disk carrier ZYLBF on the transmission housing fixed hub GN, a constructive, simple pressure medium and lubricant feed to each the two clutches B and F is made available by way of appropriate channels, i.e., borings, with run partly through the housing hub GN and partly through the hub of the disk carrier ZYLBF. A conduit for the pressurized medium to the pressure chamber 211 of the servoapparatus 210 of clutch B is designated as 216, a lubricant feed to the pressure offset chamber 212 of the servoapparatus 210 is denoted as 217, a pressurized medium flow to the pressure chamber 611 of the servoapparatus 610 of clutch F is given the reference number of 616 and a lubricant feed to the pressure offset chamber 612 of the servoapparatus 610 of clutch F is designated as 617.

The inner disk carrier 620 of clutch F forms the input element of clutch F. Geometrically speaking, this inner disk carrier 620 is designed as a cylinder. A cylindrical section of this inner disk carrier 620 possesses on its outside diameter a complementary, shape-fit profile for the reception of inward-toothed disks of the (proximal to the housing wall GW) disk set 600 of clutch F and axially extends, starting from that end, which is proximal to the transfer planetary gearset VS, of this disk set 600 in the direction of the housing wall GW. A platelike section of this inner disk carrier 620 attaches itself on that end, which is proximal to the housing wall, of the cylindrical section of the inner disk carrier 620 and extends from this cylinder shaped section of the inner disk carrier 620 radially outward as far as a diameter which is greater than the outside diameter of the piston 615, that is to say, of the compression surface of the servoapparatus 610 of clutch F. On its outside diameter, the platelike section of the inner disk carrier 620 is rotationally fixed to a cylindrical connection element ZYLF, for example, shape-fit by way of a complementary profiling. This cylindrical connection element ZYLF once again overlaps completely in the axial direction, the contiguously arranged disk sets 200, 600 of the two clutches B, F, respectively, and the servoapparatus 610 of clutch F (and therewith also overlaps, at least substantially, in an axial direction the common outer disk carrier ZYLBF for both clutches B, F) and is, on its end, which is proximal to the transfer planetary gearset VS, connected with a carrier part, which is proximal to the main planetary gearset HS, of the coupled carrier ST_VS of the transfer planetary gearset VS. For example, the provision can be made, that the inner disk carrier 620 of clutch F and the cylindrical connection element ZYLF be made in a one-piece construction. Since the carrier ST_VS is rotationally fixed to the input drive shaft AN by way of the carrier part, which is proximal to the main planetary gearset HS, the inner disk carrier, i.e., the input element 620 of clutch F, continually rotates at the same rotational speed as does the input drive shaft AN.

The inner disk carrier 220 of clutch B forms the input element of clutch B. Geometrically speaking, this inner disk carrier 220 is designed as a cylinder. A cylindrical section of this inner disk carrier 220 possesses on its outside diameter a complementary profiling for the reception of inward-toothed disks of the disk set 200 (which is proximal to the transfer planetary gearset VS) of clutch B and extends from that end of the this disk set 200, which end is proximal to the transfer planetary gearset VS, axially in the direction of the housing wall, as far as to an area between the radially outward placed section of the sealing plate 215 of the servoapparatus 210 of clutch B and the platelike section of the inner disk carrier 620 of clutch F. A plate shaped section of this inner disk carrier 220 attaches onto that end, which is proximal to the housing wall, of the cylindrical section of the inner disk carrier 220, and extends from this cylindrical section of the inner disk carrier 220 axially between the radially located, outer section of the sealing plate 215 and the platelike section of the inner disk carrier 620 and located radially to the outside at a diameter greater that the outside diameter of the inner disk carrier 620, that is to say, the cylindrical connection element ZYLF. On its outside diameter, the platelike section of the inner disk carrier 220 is rotationally fixed to a cylindrical connection element ZYLB, for example, this binding being made in a shape-fit manner by way of complementary profiling of the connecting surfaces. This cylindrical connection element ZYLBF further fully overlaps the cylindrical connection element ZYLF in the axial direction and is rotationally fixed to the ring gear HO_HS of the transfer planetary gearset VS. Consequently, the inner disk carrier, that is to say, the input element 220 of clutch B, is continually rotating at the same speed of rotation as is the ring gear HO_HS. Since the input element 120 of clutch A is likewise axially rotationally fixed to this ring gear HO_HS, on that side of the transfer planetary gearset VS, which side is proximal to the main planetary gearset HS, the input element 120 (in this case, for example, the outer disk carrier) of clutch A and the cylindrical connection element ZYLB can be manufactured as a one-piece component, even together with the ring gear HO_VS. It is also possible, that the inner disk carrier 220 of clutch B and the cylindrical connection element ZYLB can also be made as a one-piece element.

As a constructive specialty the sealing plate 215 of the servoapparatus 210 of clutch B contributes also to the transmission of speed of rotation as well as of torque between the disk carrier ZYLBF which, respectively, is the output element of both clutches B, F, and the sun gear S1_HS of the main planetary gearset HS, which sun gear is proximal to the transfer planetary gearset VS, which, respectively, is used in an exemplary manner also forms the first input element of the main planetary gearset HS. Accordingly, the sealing plate 215, which is rotationally fixed onto that end of the hub of the disk carrier ZYLBF, proximal to the housing wall, this connection being made by shape-fit, i.e., by a complementary profile. In its geometric continuation, the sealing plate 215 extends to axially border the housing wall GW in a radial upward direction and is in the area of its outside diameter bound with the cylindrical connection element ZYL, for example, by a complementary profiling of the contacting surfaces. This cylindrical connection element ZYL is geometrically designed as a pot opening in the direction of the housing wall GW. An annular casing surface of this connection element ZYL completely overlaps in an axial direction the component group of the two clutches B, F, i.e., the cylindrical connection element ZYLB, the transfer planetary gearset VS as well as the two clutches E, A. A platelike pot bottom of the connection element ZYL attaches on the annular casing surface of the connection element ZYL on its end, proximal to the main planetary gearset HS and extends inward in the axial area beside clutch A on its side, proximal to the main planetary gearset HS. In its hub area, the cylindrical connection element ZYL is bound both with the output element 330 of the brake C as well as (by the sun gear shaft 240) being rotationally bound with (forming the first input element of the main planetary gearset HS) sun gear S1_HS, proximal to the transfer planetary gearset VS, wherein the sun gear is in the grouping of the main planetary gearset HS. According to this, the servoapparatuses 210, 610 of the two clutches B and F rotate continually at the speed of rotation of this sun gear S1_HS.

The spatial arrangement, assembly and kinematic connectivity of the remaining transmission components of construction (shifting elements E, A, C and D, and the main planetary gearset HS) of the fourteenth inventive transmission scheme, according to FIG. 15, correspond to the same as presented in the arrangements of FIG. 9, on which account a repetitive description and explanation thereof, in this place, can be eliminated.

Figure 16:
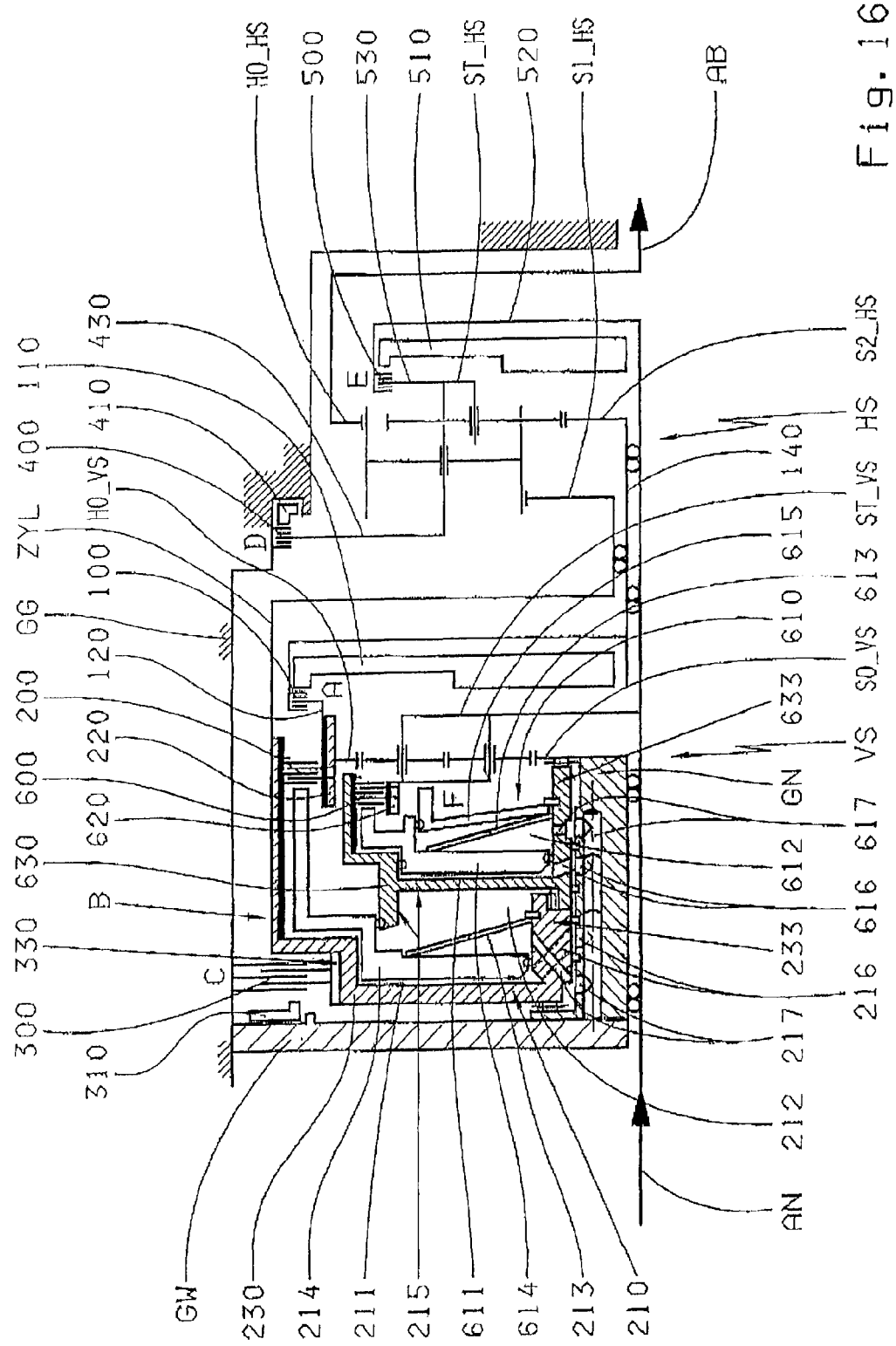
FIG. 16 is a fifteenth scheme of an inventive transmission.

In the case of the fifteenth inventive transmission scheme of a component arrangement, as presented in FIG. 16, provision is made (in connection with the conventional gear train assemblies of FIGS. 1A and 1B) in that a component grouping, including one of the shifting element B, F and C, is at least substantially located on that side of the transfer planetary gearset VS, remote from the main planetary gearset HS, and further is substantially axially located between the transfer planetary gearset VS, when seen in a spatial configuration, and a transmission housing fixed outer wall GW of the transmission and at least substantially located radially above first, a transmission housing fixed on a hub GN, which hub GN extends axially between this outer wall GW and the transfer planetary gearset VS. Accordingly, the disk set 200 of clutch B, continually possesses a greater diameter than that diameter of the disk set 600 of clutch F and is continually within a cylindrical space formed by an output element 230 of clutch B. In these three examples, the main planetary gearset HS is assembled as a Ravigneaux-Planetary-Gearset, located co-axially to the assembly designed as a transfer planetary gearset VS, assembled as a simple planetary gearset in a double planetary mode of construction. As an example, the input drive shaft AN and the output drive shaft AB are co-axially to one another, where the expert is able, even without special reconstruction measures, to provide an parallel-axis or mutually angularly run shaft position of the input and output drive shafts.

The component group with the two clutches B, F is positioned substantially on that side of the transfer planetary gearset VS, remote from the main planetary gearset HS and, seen from a spatial perspective substantially axially located between the transfer planetary gearset VS and the transmission housing fixed housing wall GW, further proximal to the input drive shaft AN (not shown in more detail) operationally connected to the drive motor of the transmission, accordingly directly bordering on the transfer planetary gearset VS and the housing wall GW. Accordingly, this component group includes the following respective pairs, namely the two clutches B and F, for these clutches output elements 230 and 630, each of which is designed as an outer disk carrier, disk sets 200 and 600 as well as servoapparatuses 210 and 610 for the activation of the disk sets 200 and 600. Corresponding to the conventional kinematic coupling, these two outer disk carriers 230, 630 are rotationally fixed to the first input element of the main planetary gearset HS—in this case also with the first sun gear S1_HS thereof—which will be explained later in detail. The disk set 200 of clutch B possesses a larger diameter than does the disk set 600 of clutch F. Essentially, clutch F is placed within a cylindrical space, which is formed by the output element 230, i.e., the outer disk carrier of clutch B. As a difference to the previously described, inventive component arrangement, i.e., the transmission schematics, even the brake C, designed as a disk brake, is placed on that side of the transfer planetary gearset VS, remote from the main planetary gearset HS, and in an area axially is disposed between the transfer planetary gearset VS and the transmission housing fixed housing wall GW, bordering axially on the housing wall GW. Obviously, it is possible that the housing wall GW and the transmission housing GG may also be manufactured as a one-piece component. Clutch A and the brake D are placed axially between the transfer planetary gearset VS and the main planetary gearset HS. The clutch E is, differing from the previously described, inventive component arrangement, i.e., transmission schematics, placed on that side of the main planetary gearset HS, remote from the transfer planetary gearset VS.

Clutch E which, according to the gear train arrangement of the conventional state of the technology as shown in FIG. 1A, is kinematically placed between the input drive shaft AN and the third input element of the main planetary gearset HS and axially borders directly on the main planetary gearset HS on that side thereof, remote from the transfer planetary gearset VS. Correspondingly, an input element 520 of clutch E is bound with the input drive shaft AN and an output element 530 of clutch E is connected with the coupled carrier ST_HS of the main planetary gearset HS. In this arrangement, the input element 520, serves the function of a disk carrier for the outer disks of the disk set 500 of clutch E. Correspondingly, the output element 530 of clutch E is designed as an carrier for the inner disks of the disk set 500 of clutch E. In the presented illustration, the disk set 500 is arranged on a diameter, which somewhat corresponds to the diameter of the ring gear HO_HS of the main planetary gearset HS. This diameter of disk placement requires a relatively large number of disks for the disk set 500, enables the creation of an unusually and advantageously slim housing configuration for a so-called standard transmission in the area of the transmission output. In connection with a non-co-axial assembly of the drive shafts for input and output, namely AN, AB, the expert would place the disks of clutch E, when the need arises, also on a greater diameter. Geometrically, the cylindrical outer disk carrier 520 of clutch E is designed as a pot, with its opening in the direction of the main planetary gearset HS within which, the disk set 500 and a servoapparatus 510 for the activation of the disk set 500 are placed. The input drive shaft AN, connected with a hub of the outer disk carrier 520, completely penetrates the transmission up to the output-side outer wall of the transmission housing GG. A section of the output drive shaft AB, bound to the ring gear HO_HS, radially and completely encloses clutch E in the axial direction. The schematic servoapparatus 510, presented here in simplified form, is placed on the side of the disk set 500, remote from the main planetary gearset HS and activates this upon the engagement of clutch E axially in the direction of the main planetary gearset HS. Advantageously, the servoapparatus 510 also possesses a dynamic pressure offset means, since a pressure chamber (not further described here), of the servoapparatus 510 rotates continually as the rotational speed of the input drive shaft AN.

The brake D is designed as a disk brake. This brake D, corresponding to the gear train of the generic state of the technology as shown in FIG. 1A, is placed kinematically between the coupled carrier ST_HS of the main planetary gearset HS and the transmission housing GG. Seen from a spatial consideration, brake D is placed proximal to the main planetary gearset HS in the area of the inside diameter of the transmission housing GG, where an output element 430, which serves as a carrier for the inner disks of the disk set 400 of the brake D is rotationally fixed to the carrier part of the coupled carrier ST_HS of the main planetary gearset HS, proximal to the transfer planetary gearset VS. An outer disk carrier for the outer disks of the disk set 400 of the brake D is, in this case, a directly integrated part of the transmission housing GG, although it can, obviously, be assembled as a separate and distinct component element, which is rotationally fixed to the transmission housing GG. Designated by the reference number 410, a servoapparatus of the brake D for the activation of the disk set 400 is illustrated in simplified manner and is, in this case, intended for the activation of the disk set 400 which is, likewise, an integral part of the transmission housing GG. However, for instance, this can be integrated into a separate outer disk carrier of the brake D. Upon the engagement of brake D, the servoapparatus 410 activates the disk set 400, which has been assigned thereto in the direction of the transfer planetary gearset VS.

In the direction of the main planetary gearset HS, clutch A axially borders the transfer planetary gearset VS. Correspondingly adhering to the gear train schematics of the generic arrangement, as set forth in the state of the technology as shown in FIG. 1A, clutch A is placed kinematically between the output element of the transfer planetary gearset VS and the second input element of the main planetary gearset HS. Correspondingly, an input element 120 of clutch A is bound to the ring gear HO_VS of the transfer planetary gearset VS, and an output element 130 of clutch A is connected with the second sun gear S2_HS (which is remote from the transfer planetary gearset VS) of the main planetary gearset HS. Accordingly, the input element 120, in this case, is designed as a carrier for the inner disks of the disk set 100 of clutch A. Obviously, it is possible that the ring gear HO_VS and the input element, namely, the inner disk carrier 120, can be joined together as a one-piece component. In the illustrated example, the disk set 100 is placed at a greater diameter than the ring gear HO_VS. The output element 130 of clutch A is serves as a carrier for the outer disks of the disk set 100, and by the sun gear shaft 140, is bound to the second sun gear S2_HS, which sun gear is remote from the main planetary gearset HS. Accordingly, this sun gear shaft 140 partly surrounds the input drive shaft AN and centrally penetrates, in its axial extension, the sun gear S1_HS, proximal to the transfer planetary gearset, of the main planetary gearset HS. Obviously, it is possible that the sun gear shaft 140 and the sun gear S2_HS can also be made as a one-piece component. Geometrically seen, the cylindrical outer disk carrier 130 of clutch A is designed as a pot opening in the direction of the transfer planetary gearset VS within which is found the disk set 100 and a servoapparatus 110 for the activation of the disk set 100. The servoapparatus 110 which (for simplification not shown in detail), is placed on that side of the disk set 100, proximal to the main planetary gearset, and servoapparatus 110 axially activates the disk set 100 in the direction of the transfer planetary gearset VS upon the axial engagement of clutch A. Advantageously, the servoapparatus 110 also possesses a dynamic means for the pressure offset, since a pressure chamber (not described in further detail), continually rotates at the speed of rotation of the second sun gear S2_HS of the main planetary gearset HS.

Clutch B is, in regard to space, substantially radially located above the transmission housing fixed hub GN, on which also is fixed the sun gear SO_VS of the transfer planetary gearset VS of the transmission housing GG. The disk set 200 of clutch B is, in this arrangement, placed at least partially in an area, disposed above the ring gear HO_VS of the transfer planetary gearset VS, onto a comparatively large diameter.

Correspondingly, the input element 220 of clutch B, serving as a carrier for the inner disks of the disk set 200, is placed partially in an area radially above the ring gear HO_VS of the transfer planetary gearset VS and is rotationally fixed to this ring gear HO_VS. Obviously, it is possible that the inner disk carrier 220 and the ring gear HO_VS can be factory made as one piece. Likewise, the spatial requirements of the disk set 200 of clutch B are not fixed in the presentation shown in FIG. 16 and the disk set can be displaced axially to either side.

Geometrically speaking, the output element 230 of clutch B, serving as an outer disk carrier, is constructed as a pot, opening in the direction of the loading gearset VS as well as in the direction of the main planetary gearset HS, having an extensive, cylindrical casing cover, a plate-shaped pot bottom and employing the hub-section 233. The plate-shaped pot bottom of the outer disk carrier 230 borders directly and axially on housing wall GW and extends substantially parallel to the wall in a radial direction. The hub 233 of the outer disk carrier 230 attaches to the inside diameter of the pot bottom and radially extends over the transmission fixed hub GN, in axial direction, is located at the midpoint of the hub GN and is simultaneously rotatably connected to the hub GN. The casing cover of the outer disk carrier 230 connects to the outside diameter of the pot bottom and extends (in the illustrated embodiment and is radially graduated) axial in the direction of the transfer planetary gearset VS as well as in the direction of the main planetary gearset HS reaching as far as a point above the disk set 200. The disk set 200 is further placed radially over the ring gear HO_VS of the transfer planetary gearset VS. Accordingly, the section of the outer disk carrier 230, proximal to the housing wall, is simultaneously designed to serve as an output element 330 for the brake C and possesses on its outside diameter a complementary profiling fit for the inner disks of the disk set 300 of the brake C. On the inside diameter of the section of the casing of the outer disk carrier 230, proximal to the transfer planetary gearset VS, an appropriate complementary profiling connection for the outer disks of the disk set 200 of clutch B is to be found. The servoapparatus 210 of clutch B, which includes a pressure chamber 211, a pressure offset chamber 212, a piston 214 and a reset element 213, is placed fully within a cylindrical space, formed by the outer disk carrier 230 of clutch B and is essentially radially above the hub 233 of the outer disk carrier 230. The piston 214 is axially, slidably fixed on the outer disk carrier 230 and is sealed against the fixation by the pressurized medium. The pressure chamber 211 is formed by an inner casing surface of the outer disk carrier 230 and the piston 214. Correspondingly, the pressure chamber 211 rotates continually at the speed of rotation of the outer disk carrier 230. For the offset of the rotational pressure of the rotating pressure chamber 211 a dynamic pressure offset with a pressure offset chamber 212 is provided, filled with lubricant at zero pressure, where the pressure offset chamber 212 is located nearer to the transfer planetary gearset VS (as well as nearer to the main planetary gearset HS) than the pressure chamber 211. The pressure offset chamber 212 is on the side of the piston 214 proximal to the transfer planetary gearset VS and is formed by the piston 214 and a casing surface 215 of the output element, i.e., the outer disk carrier 630 of clutch F, where the casing surface is proximal to the pressure chamber 211. Further, this outer disk carrier 630 of clutch F is axially slidable and opposed to the piston 214 and is slidingly sealed thereagainst by lubricant. From the selected nomenclature for the relevant casing surface 215 of the outer disk carrier 630 employed for the formation of the pressure offset chamber 212, it becomes evident that the outer disk carrier 630 of clutch F simultaneously takes over the function of a sealing plate for the servoapparatus 210 of clutch B. The piston 214, by way of the reset element 213, which here is powered by a plate spring, exerts axially against the hub 233 of the outer disk carrier 230. In a case of subjection of the pressure chamber 211 to pressure from the pressurized medium, for the purpose of engaging clutch B, then the piston 214 moves axially in the direction of the transfer planetary gearset VS, i.e., also in the direction of the main planetary gearset HS and activates the disk set 200 which is assigned, wherein the activation takes place counter to the spring force of the reset element 213. Because of the positioning of the outer disk carrier 230 of clutch B on the transmission housing fixed hub GN, a constructively relatively simple pressure medium and lubricant feed system to clutch B is achieved by appropriate channels and borings, which partly are run inside the housing hub GN and partly inside the hub 233 of the outer disk carrier 230. A pressure feed line to the pressure chamber 211 of the servoapparatus 210 of clutch B is designated with the reference number 216. A lubricant feed to the pressure offset chamber 212 of the servoapparatus 210 of clutch B is designated as 217.

Clutches B and F are nested, one within the other, where clutch F, in principle, is placed within clutch B. Corresponding to the position of the disk set 200 of clutch B, which is in an area radially above the transfer planetary gearset VS, clutch F (spatially observed) is completely within a cylindrical space, which is formed by the piston 214 of the servoapparatus 210 of clutch B. In this way, the disk set 600 of clutch F directly borders the transfer planetary gearset VS and is, in the presented embodiment, placed somewhat at the same diameter as that of the interior gear HO_VS of the transfer planetary gearset VS.

The input element 620 of clutch F is designed as a carrier for the inner disks of the disk set 600 of clutch F and are bound with a carrier plate of the coupled carrier ST_VS of the transfer planetary gearset VS in a rotationally fixed manner. Obviously, it is possible that the carrier plate and the inner disk carrier 620 can also be made as a one-piece component. On its side, remote from the main planetary gearset HS, the coupled carrier ST_VS of the transfer planetary gearset VS is rotatably fixed to the input drive shaft AN.

The outer disk carrier 630 of clutch F, which carries the disks for the disk set 600 and the servoapparatus 610, is geometrically designed in the form of a cylindrical pot, opening in the direction of the transfer planetary gearset VS and in the direction of the main planetary gearset HS, with an extensively cylindrical casing, a platelike pot bottom and a hub 633. The cylindrical casing of the outer disk carrier 630, in the illustrated presentation, is radially graduated and extends from the end of the disk set 600, proximal to the transfer planetary gearset VS, axially in the direction of the housing wall GW up to the piston 214 of the servoapparatus 210 of clutch B. On the inside diameter of its end, proximal to the transfer planetary gearset VS, the casing of the outer disk carrier 630 possesses a complementary profiling connection for the outer disks of the disk set 600 of clutch F. For the formation of the pressure offset chamber 212 of the servoapparatus 210 of clutch B, the casing of the outer disk carrier 630 is axially slidable and sealed with lubricant on its end, proximal to the housing wall. The plate shaped pot bottom of the outer disk carrier 630 attaches approximately to the midpoint of the cylindrical-shaped casing of the outer disk carrier 630 and extends radially inward, just above the transmission housing fixed hub GN. On the inside diameter of this pot bottom, the hub 633 of the outer disk carrier 630 attaches and continues on in the direction of the transfer planetary gearset VS up to a point just before the sun gear SO_VS and is also rotatably attached to the transmission housing hub GN.

The servoapparatus 610 of clutch F, while encompassing a pressure chamber 611, a pressure offset chamber 612, a piston 614, a reset element 613 and a sealing plate 615, is completely encapsulated within a cylindrical space, formed by the outer disk carrier 630 of clutch F, and is placed radially above the hub 633. The piston 614 is slidingly fixed to the outer disk carrier 630 and sealed with pressure medium thereagainst. The pressure chamber 611 is, first, formed by a casing surface of the outside disk carrier 630, proximal to the transfer planetary gearset VS and, second, by the piston 614. Correspondingly, the pressure chamber 611 continually rotates at the rotational speed of the outside disk carrier 630. To compensate for the rotational pressure of the turning pressure chamber 611, a dynamic pressure offset is achieved by a pressure offset chamber, which is filled with lubricant and is under no pressure. This pressure offset chamber 612 is located nearer to the transfer planetary gearset VS (and to the main planetary gearset HS) than the pressure chamber 611. The pressure chamber 611 is constructed from the piston 614 and the sealing plate 615, fixed on that end of the hub 633 of the disk carrier 630, proximal to the transfer planetary gearset VS and located opposite to the piston 614, where the reset element 613 exerts force thereagainst, and the reset element 613 is, in this case, made from a plate spring. In a case of subjecting the pressure chamber 611 to pressurized medium for the purpose of engaging clutch F, the piston 614 moves axially in the direction of the transfer planetary gearset VS (and in the direction of the main planetary gearset HS), and activates the disk set 600, assigned to it, where the activation takes place counter to the spring force of the reset element 613. Because of the positioning of the outer disk carrier 630 of clutch F on the transmission housing fixed hub GN, a constructively relatively simple pressure medium and lubricant feed to clutch F is made available by appropriate channels or borings which run partly within the housing hub GN and partly within the hub 633 of the outer disk carrier 630. A pressure medium feed, from the pressure chamber 611 of the servoapparatus 610 of clutch F, is designated with the reference number 616. A lubricant feed line to the to the pressure offset chamber 612 of the servoapparatus 610 is given the number 617.

Given spatial consideration, the servoapparatus 610 of clutch F is placed nearer to the main and transfer gear systems, namely HS, VS, than the servoapparatus 210 of clutch B, where the pressure chamber 611 of the servoapparatus 610 and the pressure offset chamber 211 of the servoapparatus 211 are separated from one another only by one casing surface of the output element, i.e., the outer disk carrier 630 of clutch F.

Corresponding to the generic gear train scheme of the state of the technology, as set forth in FIG. 1A, the first sun gear S1_HS of the main planetary gearset HS is the first input element of the main planetary gearset HS, proximal to the entry/main planetary gearsets VS, HS. To achieve a kinematic connection to the sun gear S1_HS by the outside disk carriers 230, 630 of clutches B, F, provision has been made first, that the hubs 633, 233 of the two outer disk carriers 630, 230 are rotationally fixed to one another by shape-fit profiling. Second, provision is made that the outside disk carrier 230 of clutch B, in the area of that end, proximal to the main planetary gearset HS, is rotationally fixed, again by a shape-fit profiled connection with a cylindrical connection element ZYL. This connection element ZYL is geometrically designed as a pot, opening in the direction of the housing wall GW, having a cylindrical casing, which engages clutch along the border of the side of the output element of the outer disk carrier 130 of clutch A, where that side is proximal to the main planetary gearset HS. This direction also extends radially inward as far as to a diameter with small clearance above the sun gear 140. In its hub area, the pot bottom is bound with the sun gear S1_HS of the main planetary gearset HS, proximal to the transfer planetary gearset VS. The outer disk carrier 630 of clutch F is also rotationally fixed to the sun gear S1_HS by the outer disk carrier 230 of clutch B. Correspondingly, the servoapparatuses 210, 610 of the two clutches B, F rotate continually at the speed of rotation of the first input element—this being, in this case, the first sun gear S1_HS—of the main planetary gearset HS.

One carrier for the outer disks of the disk set 300 of the brake C is, in this case for instance, directly integrated into the transmission housing GG. It is further possible that this can be installed as a separate component, rotationally fixed to the transmission housing GG. The reference number 310 now refers to a servoapparatus of the brake C, shown in a simplified manner, and serves for the activation of the disk set 300 which, in this case, is integrated into the housing wall GW. In this respect, however, the disk set 300 can possibly be integrated into a separate outer disk carrier of the brake C. Upon the engagement of the brake C, the servoapparatus 310 activates the disk set 300, assigned thereto, axially in the direction of the transfer planetary gearset VS and in the direction of the main planetary gearset HS.

Figure 17:
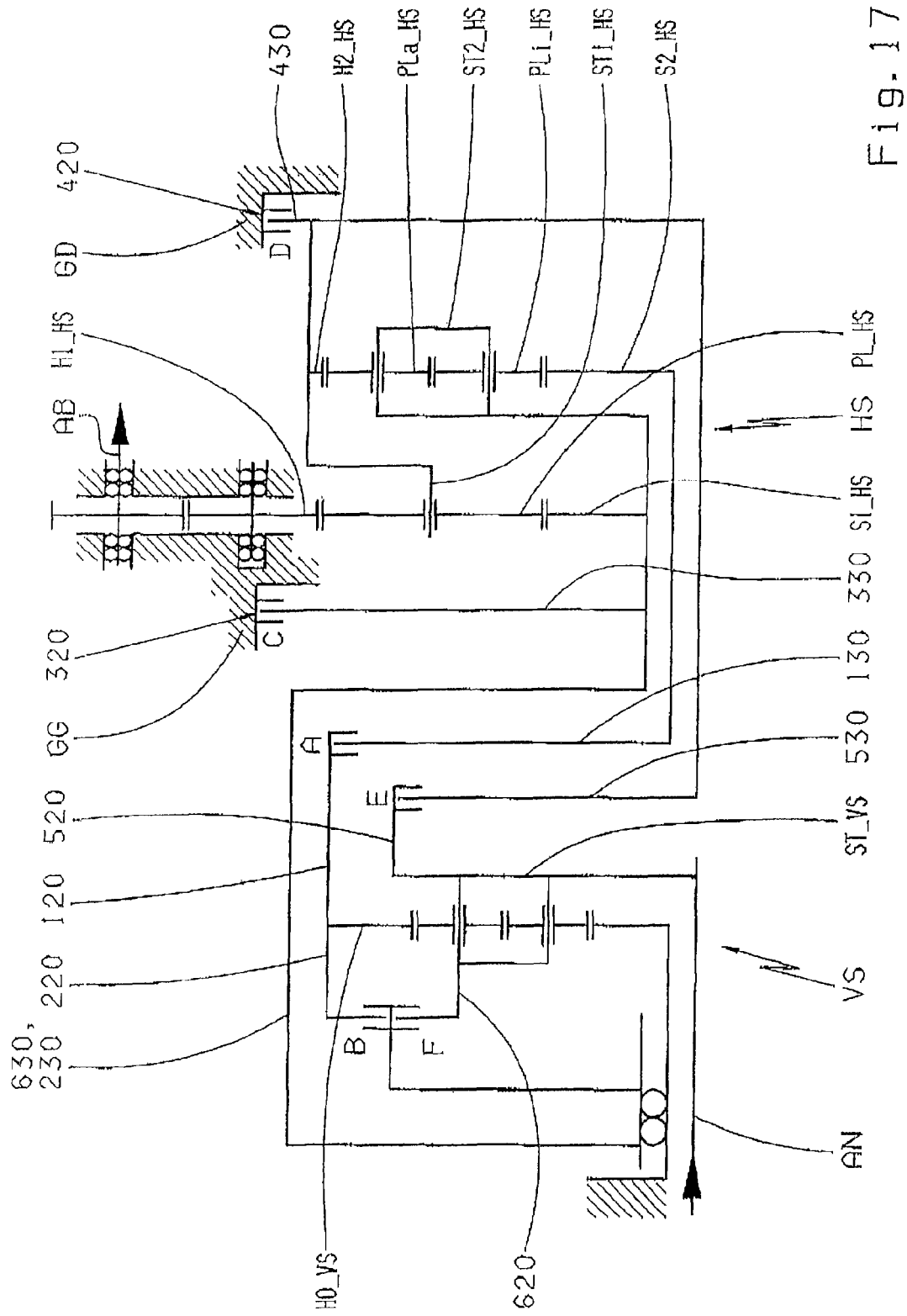
FIG. 17 is a sixteenth scheme of an inventive transmission based on the transmission outline of FIG. 9, with a first alternative main planetary gearset.

Considering FIG. 17, an exemplary sixteenth inventive transmission scheme is explained and described, which is based on the transmission scheme, i.e., the component arrangement, according to FIG. 9. However in this case, there will be an alternative design of the main planetary gearset HS, shown as a two carrier four-shaft, planetary transmission with three input elements and one output element and possesses two simple planetary gearsets coupled to one another. Of these two planetary gearsets, the first is assembled in a single planetary gear construction and the second in a double planetary gearset manner. The first, simple planetary gearset of the main planetary gearset HS is proximal to the transfer planetary gearset VS and includes a sun gear S1_HS, a ring gear H1_HS as well as a carrier ST1_HS with the carried, rotatably fixed planetary gears PL_HS. Accordingly, the planetary gears PL_HS mesh with the sun gear S1_HS and the ring gear H1_HS. The second above mentioned double planetary gearset of the main planetary gearset HS is placed on that side of the first single planetary gearset of the main planetary gearset HS, remote from the transfer planetary gearset VS, and includes a sun gear S2_HS, a ring gear H2_HS as well as a coupled carrier ST2_HS, including the fixed inner and outer planetary gears PLi_HS and PLa_HS. The inner planetary gears PLi_HS mesh with the sun gear S2_HS and the outer planetary gears PLa_HS mesh with the inner planetary gears PLi_HS and with the ring gear H2_HS.

Sun gear S1_HS and the coupled carrier ST2_HS are bound together and form the first input element of the main planetary gearset HS which, in turn, is connected to the output elements 230, 630 of the two clutches B, F and is also connected to the output element 330 of the brake C. As shown in FIG. 9, the output element 230 of clutch B and the output element 630 of clutch F are designed as a common component, which is bound to the input element 220 of clutch B, the ring gear HO_VS of the transfer planetary gearset VS, while the input element 620 of clutch F is connected by the coupled carrier ST_VS of the transfer planetary gearset VS with the input drive shaft AN. Further, the input element 320 of the brake C is connected to the transmission housing GG. The sun gear S2_HS, which is remote from the transfer planetary gearset VS, forms the second input element of the main planetary gearset HS which, in turn, is connected with the output element 130 of clutch A. As is shown in FIG. 9, the input element 120 of clutch A is connected to the ring gear HO_VS of the transfer planetary gearset VS. The carrier ST1_HS and the ring gear H2_HS are mutually bound and form the third input element of the main planetary gearset HS which, in turn, is connected with the output element 530 of clutch E and the output element 430 of brake D. Again following FIG. 9, the input element 520 of clutch E is connected to the input drive shaft AN and the input element 420 of brake D (in this case, by a transmission housing fixed housing cover GD) is bound with the transmission housing GG. The ring gear H1_HS, proximal to the transfer planetary gearset VS, forms the output element of the main planetary gearset HS which, in turn, is bound to the output drive shaft AB. The shifting logic of this sixteenth inventive transmission scheme, according to FIG. 17, corresponds to the shifting logic expressed on FIG. 1B of the generic transmission.

In consideration of the spatial placements of the individual transmission components, the illustrated assembly example, shown in FIG. 17, essentially reflect the arrangements of FIG. 9 where, contrary thereto, the output drive shaft AB is, for example, axis-parallel to the input drive shaft AN and brake D is found on that side of the main planetary gearset HS, remote from the transfer planetary gearset VS. As has already frequently been indicated, in the case of all previously described transmission schemes, i.e., component arrangements, the possibility exists that, without extraordinary measures, the co-axial alignment of the drive shafts for input and output (namely AN and AB) can be modified to the extent that the input and output drive shafts, respectively AN and AB, can run co-axially or at an angle to one another. FIG. 17 shows a corresponding embodiment, having a kinematic spur pinion drive situated between ring gear H1_HS of the main planetary gearset HS and the output drive shaft AB where, in conventional construction, between output side of the spur pinion drive and the output drive shaft AB, a differential is placed in this location (not shown in simplistic detail).

Figure 18:
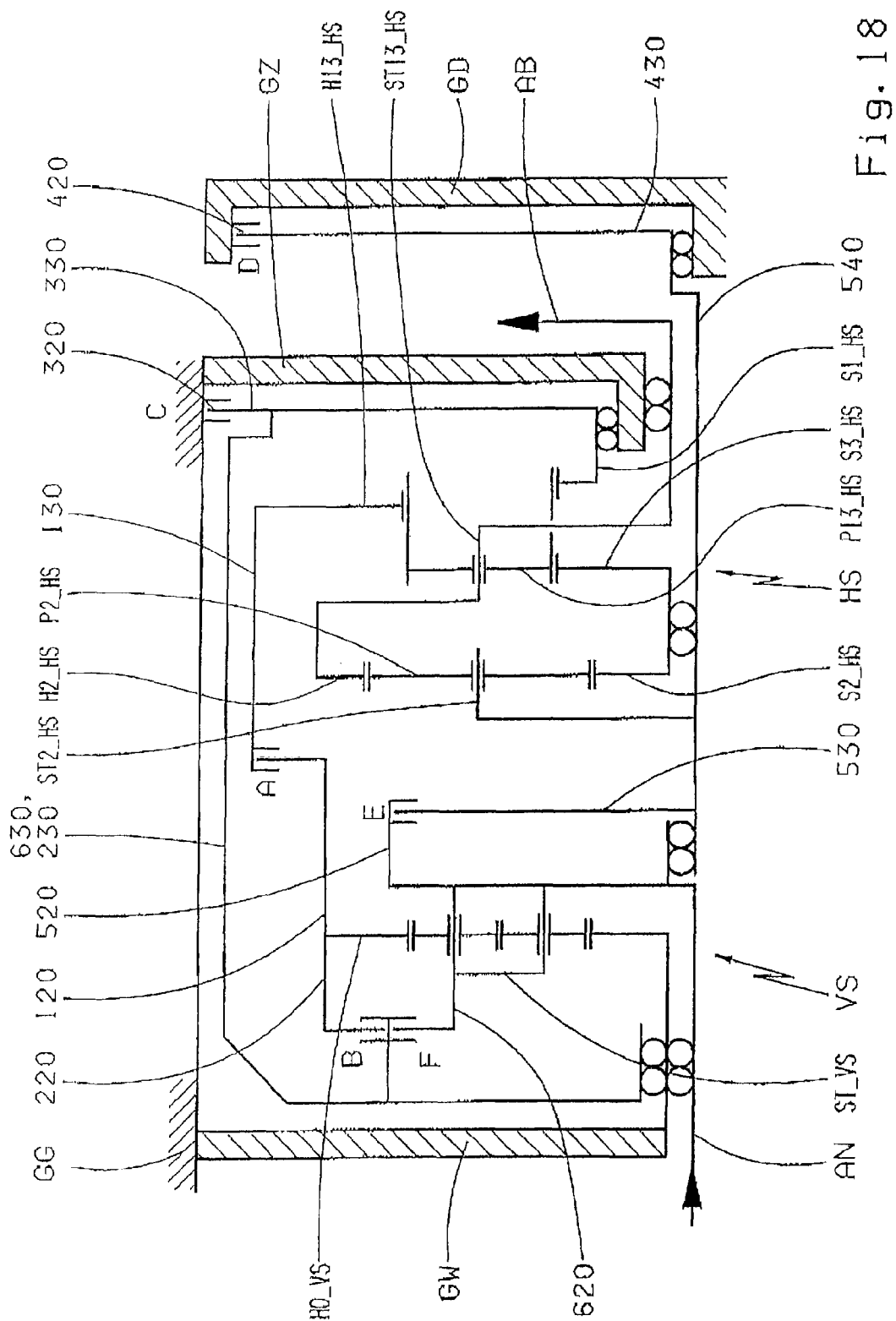
FIG. 18 is a seventeenth scheme of an inventive transmission based on the transmission outline of FIG. 9, with a second alternative main planetary gearset.

In consideration of FIG. 18, a seventeenth exemplary transmission scheme, according to the present invention, is described and explained once again, based on the transmission schematics, i.e., the component arrangement according with FIG. 9. However in this case, a second main planetary gearset HS is presented as an alternative. The revised main planetary gearset HS is, in this version, assembled as a two-carrier, a reduced triple-carrier, a five shaft, planetary gear transmission with three single planetary gearsets of which two are combined in a one-carrier unit. These single-carrier units of the main planetary gearset HS, assembled with a combination of two single planetary gearsets, embrace two separated sun gears S1_HS, S3_HS, only one ring gear H13_HS as well as one coupled carrier ST13_HS with extended planetary gears P13_HS, which are rotatably fixed thereto, and can also be referred to as a "planetary gearset with separate sun gears". The remaining other single planetary gearset of the main planetary gearset HS, includes a sun gear S2_HS, a ring gear H2_HS, as well as a carrier ST2_HS with thereon, rotatably fixed, short planetary gears P2_HS and is placed proximal to the transfer planetary gearset VS. As exhibited in FIG. 9, this presented version of the main planetary gearset HS shows three input elements, not mutually connected and one output element. The shifting logic of this seventeenth inventive transmission schematic, according to FIG. 18, corresponds to the shifting logic of FIG. 1B, as presented in the generically designed transmission.

The sun gear S3_HS is located axially between the sun gear S2_HS, which latter is proximal to the transfer planetary gearset VS, and the sun gear S1_HS, which sun gear is located on that side of the main planetary gearset HS which side lies opposite to the transfer planetary gearset VS and, first, is fixed tight with the sun gear S2_HS and, second, is operationally bound by the long planetary gears P13_HS to the sun gear S1_HS. The two sun gears S1_HS, S2_HS can, however, also be made as a one-piece component. The sun gear S1_HS, remote from the transfer planetary gearset VS, forms the first input element of the main planetary gearset HS which, in turn, is bound to the output elements 230, 630 of the two clutches B, F as well as to the output element 330 of brake C. Again, as shown in FIG. 9, the output element 230 of clutch B and the output element 630 of clutch F can be constructed as a one-piece element. Further, the input element 220 of clutch B is connected to the ring gear HO_VS of the transfer planetary gearset VS, the input element 620 of clutch F is connected with the input drive shaft AN and by the coupled carrier ST_VS of the transfer planetary gearset VS. The input element 320 of brake C (in this case, by way of a transmission housing fixed housing intervening wall GZ) is connected with the transmission housing GG. The ring gear H13_HS, remote from the transfer planetary gearset, forms the second input element of the main planetary gearset HS which, in turn, is bound to the output element 130 of clutch A. As is shown in FIG. 9, the input element 120 of clutch A is connected to the ring gear HO_VS of the transfer planetary gearset VS. The carrier ST2_HS, proximal to the transfer planetary gearset VS, forms the third output element 530 for the main planetary gearset HS which, in turn, is connected with the output element 530 of input element 520 of clutch E is connected with the input drive shaft AN and the input element 420 of brake D (in this case by a transmission housing fixed housing cover GD) with the transmission housing GG. The ring gear H2_HS, proximal to the transfer planetary gearset VS, and the carrier ST13_HS, remote from the transfer planetary gearset VS, are mutually and rigidly bound together and form the output element of the main planetary gearset HS which, in turn, is connected with the output drive shaft AB.

The spatial disposition of the transfer planetary gearset VS and the four clutches A, B, E and F, in relation to the main planetary gearset HS, as well as relative to one another, in principle, correspond to the arrangement shown in FIG. 9 or FIG. 17. The special formulation of the main planetary gearset HS with the so-called separated sun gear, now enables the placement of both brakes C and D on that side of the main planetary gearset HS which is remote from the transfer planetary gearset VS. Accordingly, the brake C is placed nearer to the main planetary gearset HS than brake D, where brake D becomes located in the area of an outer wall of the transmission—in this case in the area of the housing cover GD. The brake C is contiguous to the main planetary gearset HS and borders axially upon that side of the housing intervening wall GZ, which side is remote from the main planetary gearset HS, which intervening wall, in turn, is placed between the main planetary gearset HS and the housing cover GD. There, the sun gear S1_HS of the main planetary gearset HS becomes rotatably fixed onto the intervening housing wall GZ. To achieve a kinematic binding of the carrier ST13_HS of the main planetary gearset HS, coupled to the ring gear H2_HS onto the output drive shaft AB, a part of the carrier ST_13_HS engages in radial direction, between the two sun gears S3_HS, S1_HS. In this way, a hub of the carrier plate-part, connected with the output shaft AB, i.e., a hub-section of the output drive shaft AB, penetrates the sun gear S1_HS of the main planetary gearset HS, remote from the transfer planetary gearset VS as well as centrally penetrating the housing intervening wall in an axial direction and is further rotatably fixed on the intervening wall GZ. For the kinematic connection of the output element 430 of brake D onto the output element 530 of clutch E and a carrier plate of the carrier ST2_HS of the main planetary gearset HS, a carrier shaft 540 has been provided, which completely penetrates the main planetary gearset HS. The output drive shaft AB, in this case, a spur pinion drive (not described in further detail), with it kinematic action, is located between the output element of the output gearset HS and the output drive shaft; seen with spatial considerations in a radial direction is located axially between the intervening housing wall GZ and the output element 430 of brake D.

Figure 19:
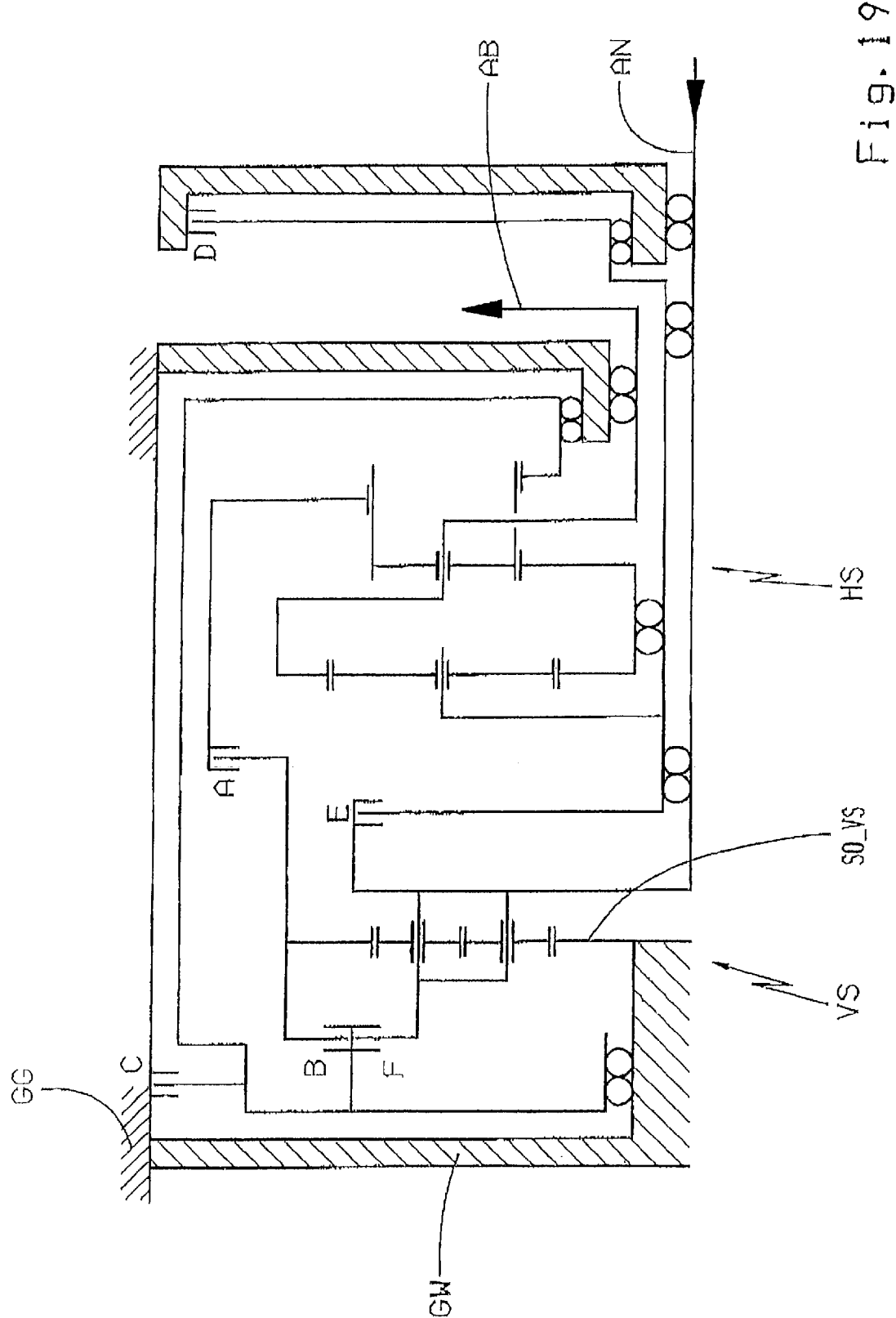
FIG. 19 is an eighteenth scheme of an inventive transmission based on the transmission scheme of FIG. 18.

The expert will quickly see, as far as FIG. 18 is concerned, that only a small modification of the transmission structure would be required for altering the position of the drive motor of the transmission, operationally connected to the input drive shaft AN in relation to planetary gearsets VS, HS. This will be made clear in FIG. 19, in which an eighteenth exemplary transmission schematic, according to the present invention, is illustrated. As a difference to FIG. 18, the drive motor, operationally connected to the input drive shaft AN, is now in the changed modification, placed on that side of the output gearset HS, which side lies opposite to the transfer planetary gearset VS. Correspondingly, now first, brake D and, second, the output drive of the transmission, elsewhere designated as the "pinion drive", more exactly referred to as the output drive shaft AB, are located proximally to the motor.

A further difference in detail, from the arrangement of FIG. 18, concerns the spatial arrangement of brake C. As may be seen in FIG. 19, brake C is now, as an example, placed on that side of the transfer planetary gearset VS, remote from the output gearset HS and in proximity to clutch B in the area of the transmission fixed housing wall GW; more exactly, in the area of the transmission housing fixed housing cover on which also the sun gear SO_VS of the transfer planetary gearset VS is located. Obviously, such a spatial situation of brake C could also be combined with the component arrangement as shown in FIG. 18.

As has already been noted within the framework of the description given for FIG. 18, the subdivision of a central gear (this being, for example, a sun or ring gear) of a single planetary gearset, where the subdivision renders the gear into two partitioned, central gears, enables a degree of freedom, not only as to a coupling of components onto this originally non-divided central gear, but also an additional degree of freedom with regard to the shift-spring from gear to gear of the transmission. This is to be further described in a nineteenth embodiment of a transmission example for a transmission schematic within the limits of the present invention. This explanation and description is to be found with regard to FIG. 20. In this immediate matter, the nineteenth embodiment example is based on the previously described transmission scheme of FIG. 18, however, with an alternative, advantageous arrangement of the output gearset HS.

Figure 20:
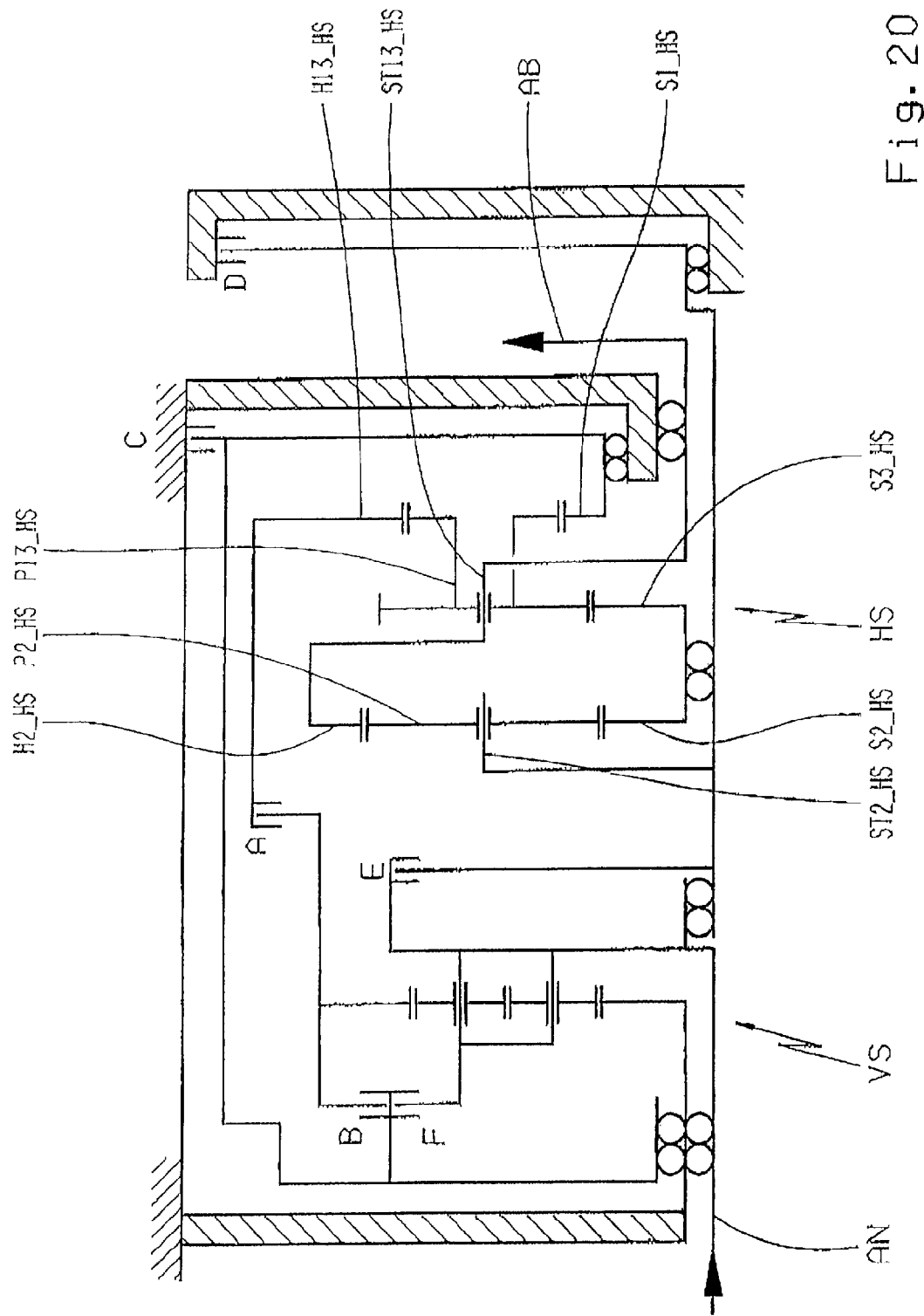
FIG. 20 is a nineteenth scheme of an inventive transmission based on the transmission scheme of FIG. 18, with a third alternative main planetary gearset.

As may be seen in FIG. 20, in this nineteenth embodiment example, both the spatial component positioning, as well as the kinematic coupling of the planetary gearsets VS and HS, the six shifting elements A to F, the six shifting element A to F, as well as the respective input/output drive shafts AN, AB, have been fully taken by the previously, closely described seventeenth embodiment example as given in FIG. 18. The now revised output gearset HS is, in similarity to that of FIG. 18, now appears as a "double-carrier-unit, a reduced three carrier, a five shaft planetary gear drive" and constructed with three single planetary gearsets, two are combined by being fixed to a one-carrier unit, the divided sun gears, respectively, namely S1_HS, S3_HS, possess a coupled carrier ST 13_HS and only one ring gear H13_HS. Again, as a difference from FIG. 18, the coupled carrier ST13_HS is rotatably connected to the long planetary gear P13_HS of the output gearset HS and is now designed as a staged planet with varied toothing for the two sun gears S1_HS and S3_HS of the output gearset HS. Correspondingly, the first and the third sun gears S1_HS, S3_HS of the output gearset HS now possess a different toothing count. For example, the coupled ring gear H13_HS of the output gearset HS meshes with the complementary toothing of the long planet gears P13_HS of the output gearset HS with which the first sun gear S1_HS of the output gearset HS also meshes. Obviously, it is possible that another arrangement could be provided, in that the coupled ring gear H13_HS of the output gearset HS would mesh with the same tooth counting of the long planet gears P13_HS of the output gearset HS, with which the third sun gear S3_HS of the output gearset HS also meshes. As is the case in FIG. 18, the revised output gearset HS (now as shown in FIG. 20) possesses three input elements and one output element, which are not bound together in common.

The separation of a central gear (this being, as above, a sun gear or a ring gear) of a single planetary gearset into two partitioned central gears offers not only a degree of freedom for this component coupling of this originally undivided central gear, but also an additional degree of freedom with regard to the speed of rotation chart of the transmission. This advantage will be more closely described and explained in a twentieth embodiment example of the present invention, shown in FIG. 21A. Accordingly, this twentieth embodiment example, once again, is based on the previous transmission scheme as put forth in FIG. 18, however, with an additional alternative, constructive formulation of the output gearset HS. As a general principle, however, it is possible, without difficulties, to divide into two parts all central gears (i.e., sun gears, ring gears) of the multiple part main planetary gearset HS similar to what is illustrated in the FIGS. 18, 19 and 20. In this way, the central gears are, as installed, divided into two or more components while, at the same time, retaining the number of the carriers of the main planetary gearset HS at two. In this way, these divided central gears are then kinematically, operationally bound together by the planet gears, which are assigned to them. Obviously, the planet gears, which correspond to these divided central gears, are accordingly graduated or non-graduated in construction. In the presented exemplary, twentieth transmission scheme presented in FIG. 21A, which includes a dividing of the central gears, previously bound with the output elements 230, 330, 630 of the three shifting elements B, C and F. In this matter, two of the three curves in the speed of rotation chart of the transmission were previously mutually congruent curves of the three shifting elements, but which are now separated from each other, which will be more fully described and explained later with the aid of the speed of rotation chart as it appears in FIG. 21B of this twentieth transmission scheme.

Figure 21A:
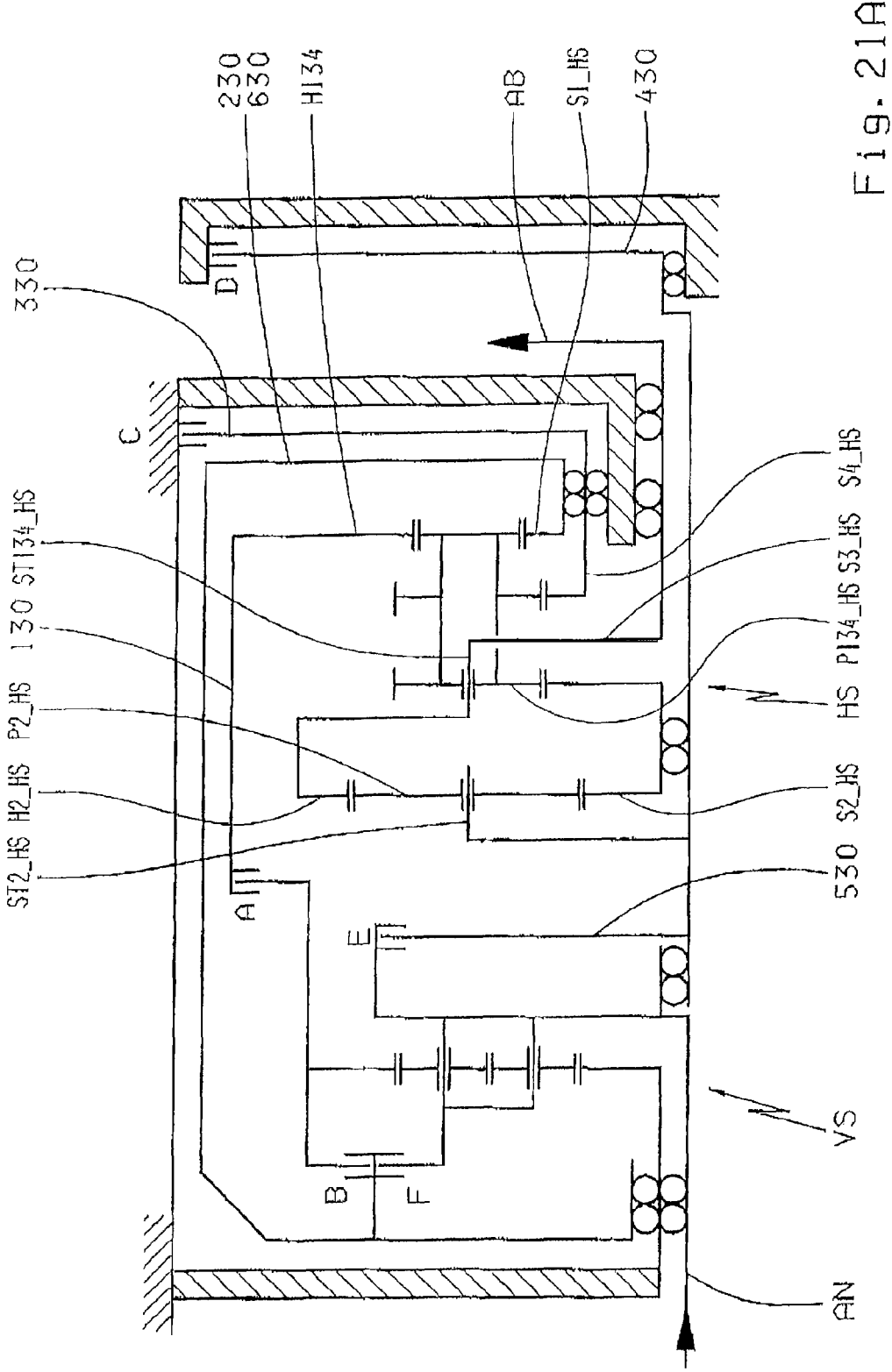
FIG. 21A is a twentieth scheme of an inventive transmission based on the transmission scheme of FIG. 18.
Figure 21B:
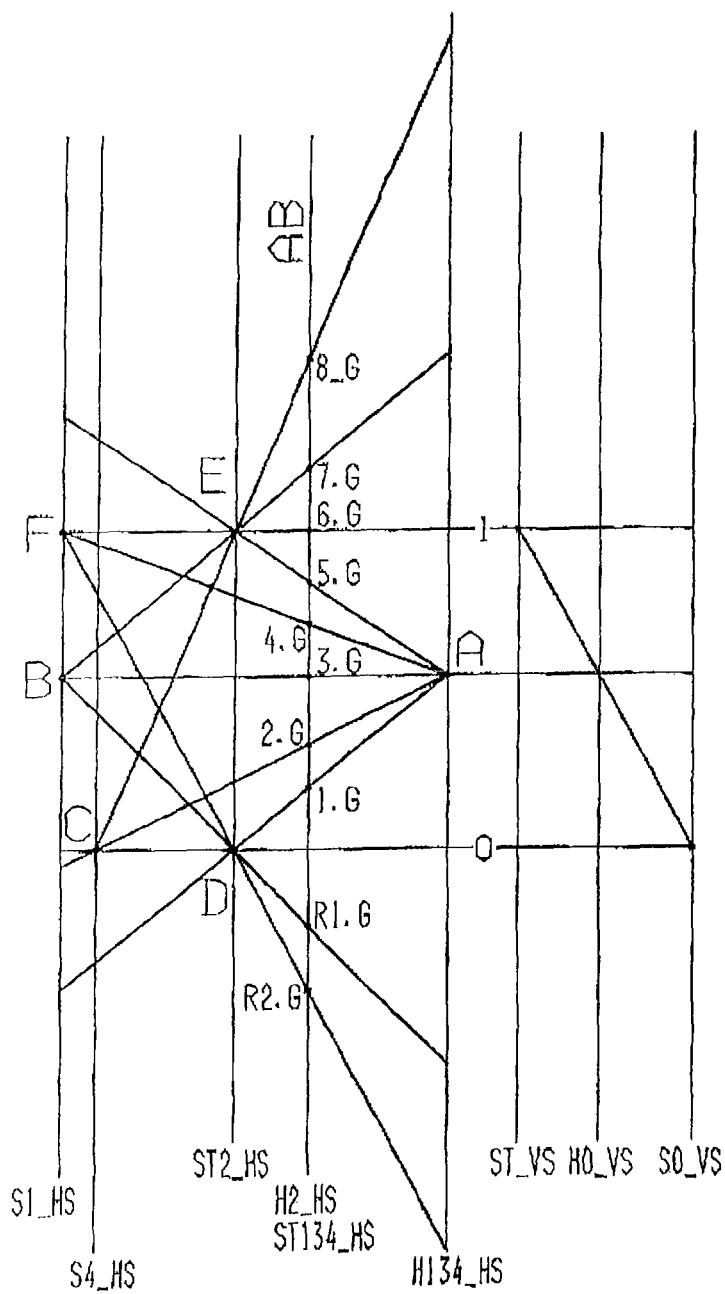
FIG. 21B is a speed of rotation chart of the transmission according to FIG. 21A.

As may be seen from FIG. 21A, the main planetary gearset HS is no longer designed as a "two-carrier-unit, reduced four carrier planetary transmission", embracing four coupled single planetary gearsets with a total of four uncoupled input elements and one output element. Accordingly, the main planetary gearset HS possesses four sun gears S1_HS, S2_HS, S3_HS, S4_HS; one simple ring gear H2_HS, one coupled ring gears H134_HS, one simple carrier ST2_HS with rotatably fixed, short planetary gears P2_HS, as well as one coupled carrier ST134_HS with a rotatably fixed, long planetary gear P134HS. The two sun gears, S3_HS, S4_HS are, when considered spatially, placed axially next to one another between the two remaining sun gears, namely S2_HS, S1_HS, where the sun gear S3_HS borders on the sun gear S2_HS, which latter sun gear is proximal to the transfer planetary gearset VS and the sun gear S4_HS, borders on the sun gear S1_HS remote from the transfer planetary gearset VS. The two sun gears S2_HS and S3_HS are mutually coupled. In FIG. 21A, the long planet gears P134_HS are, for example, designed as graduated planet gears and mesh with the three sun gears S1_HS, S3_HS and S4_HS. The coupled ring gear H134_HS meshes with the planetary toothing with which the sun gear S1_HS also meshes. The short planetary gears P2_HS mesh with the simple ring gear H2_HS and with the sun gear S2_HS. An output shaft AB bound carrier plate of the coupled carrier ST134_HS axially engages radially inward between the sun gears S3_HS and S4_HS.

The first sun gear S1_HS of the main planetary gearset HS forms the first input element of the main planetary gearset HS and is continually rotationally fixed with the common output element 230, 630 of the two gears B and F. The coupled ring gear H134_HS of the main planetary gearset forms the second input element of the main planetary gearset HS and is continually rotationally fixed to the output element 130 of clutch A. The simple carrier ST2_HS of the main planetary gearset HS forms the third input element of the main planetary gearset HS and is continually rotationally fixed with the output element 530 of clutch E and with the output element 430 of brake D. The sun gear S4_HS forms the additional (as compared to FIG. 18) fourth input element of the main planetary gearset HS, and is continually rotationally fixed with the output element 330 of brake C. The simple ring gear H2_HS and the coupled carrier ST134_HS of the main planetary gearset HS are mutually coupled and form the output element of the main planetary gearset HS which output element is continually bound with the output drive shaft AB.

In the embodiment example portrayed in FIG. 21A, the state of the transmission ratios of the first of the four coupled planetary gearsets of the main planetary gearset HS, defined by the ratio of the tooth-count of the ring gear H134_HS and the tooth-count of the sun gear S1_HS, is of a numerical value greater than that of the state of the transmission ratio of the fourth of the four coupled planetary gearsets of the main planetary gearset HS, defined by the ratio of the tooth count of the ring gear H134_HS and the tooth count of the sun gear S4_HS, as well as by the ratio of the tooth-count of the stages of the stepped planetary gears P134_HS of the main planetary gearset HS. Thus there is arrived at, first, that the revised curve (hereinafter "line") of the fourth input element S4_HS of the main planetary gearset HS in the speed of rotation chart is neighboring the line of the first input element S1_HS of the main planetary gearset HS and lies to the right thereof, thus being nearer to the line labeled for the output element H2_HS, i.e., ST134_HS, of the main planetary gearset HS than the line of the first input element S1_HS of the main planetary gearset HS. Otherwise, the chart yields the information that the line of the third input element ST2_HS of the main planetary gearset HS, again in the speed of rotation chart lies to the right of the line of the fourth input element S4_HS of the main planetary gearset HS, thereby being nearer to the line of the output element H2_HS, i.e., ST134_HS, of the main planetary gearset HS than does the new line of the fourth input element S4_HS of the main planetary gearset HS. Relative to the input element of the main planetary gearset, the two shifting elements B, F, as well as the two shifting element D, E as seen in the speed of rotation chart, lie respectively on the same line, where conversely, the shifting element C lies upon its own single line.

Figure 22:
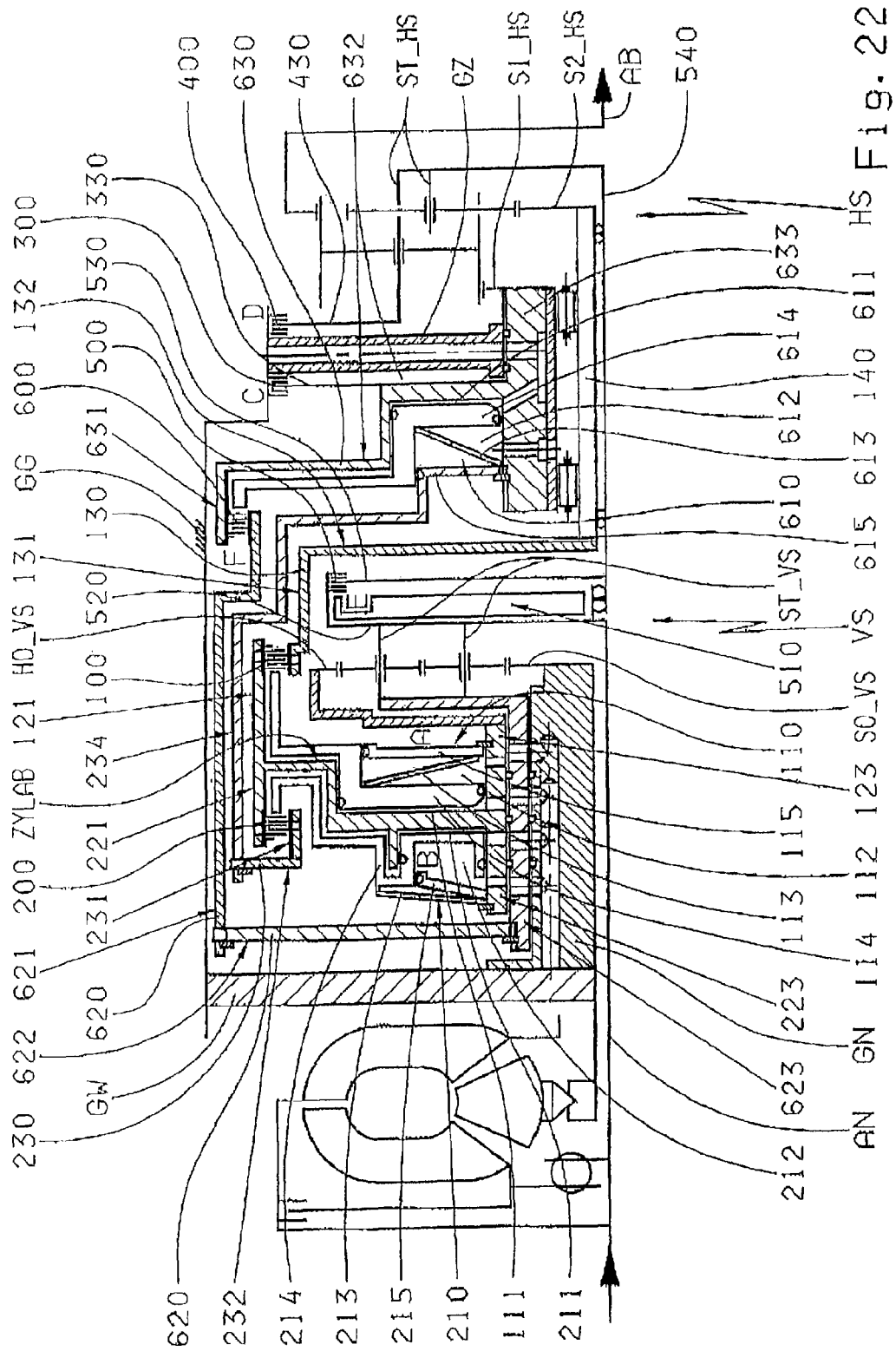
FIG. 22 is a twenty-first scheme of an inventive transmission.

Proceeding now to FIG. 22, at this point, a twenty-first embodiment example for a transmission scheme, according to the present invention, is described and explained. In comparison to the generic state of the technology as shown in FIG. 1A, there has been a change in the spatial positioning of the shifting elements A, B and F in relation to the gearsets VS, HS and relative to themselves, and to the other shifting elements C, D, E. This change is made, while retaining the kinetic coupling of the gearsets and shifting elements and the retention of the advantageous design of the co-axial, double running (but not directly contiguous to one another) arrangement of the planetary gearsets VS and HS.

In respect to FIG. 1A, the fifth shifting element E, which is designed as a clutch, remains unchanged and located between the transfer planetary gearset VS and the main planetary gearset HS, while axially bordering on the transfer planetary gearset VS. Thus the input element 520 of clutch E is designed as an outside disk carrier, geometrically in the shape of a cylindrical pot, opening in the direction of the main planetary gearset HS, the platelike bottom of which is, first, connected with the coupled carrier ST_VS of the transfer planetary gearset VS and, second, in the area of its smallest diameter, is bound with the input drive shaft AN and a cylindrical section of the cylindrical pot extension includes, within it inside diameter, the outer disks of the disk set 500 of clutch E. A carrier plate of the transfer planetary gearset VS, but proximal to the main planetary gearset HS, along with the outer disk carrier of clutch E, can also be manufactured as a one-piece component. A servoapparatus 510 of clutch E (only schematically shown) is placed within the a cylindrical space, which is formed by the outer disk carrier 520 of clutch E, and servoapparatus 510 is axially and slidably fixed onto the hub area of this disk carrier 520, where it rotates continually at the speed of rotation of the input drive shaft AN and activates the disk set 500, which packet is thereto assigned, upon the closing of clutch E axially in the direction of the main planetary gearset HS. The output element 530 of clutch E is correspondingly designed as an inner disk carrier, which is bound centrally with a carrier shaft 540, which runs axially from the hub area of this output element 530 of clutch E in the direction of the main planetary gearset HS and fully penetrates this main planetary gearset HS and is connected with the coupled carrier ST_HS on that side of the main planetary gearset HS which is remote from the transfer planetary gearset VS. This coupled carrier ST_HS forms the third input element of the main planetary gearset HS. The hub of the output element 530 of clutch E or the carrier shaft 540 is rotatably connected to the input drive shaft AN.

In relation to FIG. 1A, the spatial positioning of the two shifting elements C and D remains unchanged, which shifting elements are designed as disk brakes, in relation to the two gearsets VS and HS. The fourth shifting element D, including its disk set 400, is contingent to that side of the main planetary gearset HS proximal to the transfer planetary gearset VS. The output element 430 of brake D, which is designed as an inner disk carrier, is connected to the coupled carrier ST_HS of the main planetary gearset HS, in which case, this carrier ST_HS fully penetrates, in an axially direction, the main planetary gearset HS. Observed in the direction of the transfer planetary gearset VS, the disk set 300 of brake C attaches axially onto the disk set 400 of brake D. The output element 330 of brake C is designed as an inner disk carrier. The outside disk carrier of the two brakes C and D are enabled, in a simple manner, to be integrated into the transmission housing GG. Likewise, so integrated is the servoapparatuses for the activation of the disk sets and 400, 300 (not shown in Detail for sake of simplicity). Obviously, it is possible for brakes C and D to be provided with a separate outer disk carrier which, in such a case, would be rotatably bound to the transmission housing GG and also, the servoapparatus could slide brakes C and D in an axial direction.

Further considering FIG. 22, it can be now seen that the sixth shifting element F, which serves as a clutch, contrary to FIG. 1A, is now, when spatially observed, placed in an area axially disposed between the transfer planetary gearset VS and the main planetary gearset HS which, in the illustrated embodiment, is an axial location between clutch E and the main planetary gearset HS. Accordingly, the output element 630 of clutch F is designed as an outer disk carrier, geometrically in the shape of a pot, opening in the direction of the transfer planetary gearset VS. A hub 633 of the outer disk carrier of clutch F borders directly on the main planetary gearset HS and is rigidly fixed to the first sun gear S1_HS of the main planetary gearset HS. The sun gear S1_HS of the main planetary gearset HS, obviously, forms the first input element of the main planetary gearset HS. In this presented embodiment example, bent section 632, located approximately in the center of the hub area, is of the outer disk carrier 630 of clutch F, attaches onto this hub 633 and extends radially to the outside as far as a diameter, which is slightly greater than the outside diameter of the disk set 600 of clutch F. On the outside diameter of this plate-shaped section 632, a cylindrical section 631 of the outer disk carrier 630 of clutch F is connected and extends in the direction of the input-sided planetary gearset VS and picks up, on its inside diameter, the advantageously designed outer steel disks of the disk set 600 of clutch F. The plate-like section 632 of the outer disk carrier 630 of clutch F, in its bent area, is additionally connected to the output element 330 of brake C, which element is designed as an inner disk carrier. At this point, brake C, by the output element 630 of clutch F, is kinematically bound to the first input element (here the first sun gear S1_HS) of the main planetary gearset HS. The hub 633 of the output element (the outer disk carrier) 630 of clutch F, is rotatably attached to a second sun gear shaft 140, which allows the kinematic connection between the output element 130 of the second shifting element A and the second input element (in this case, the second sun gear S2_HS) of the main planetary gearset HS and, accordingly, centrally penetrates the hub 633 and entire clutch F in an axial direction. This second sun gear shaft 140, designed as a ring gear, in turn, is fixed to the carrier shaft 540, which forms the kinematic connection between the output element 530 of clutch E and the third input element (in this case the coupled carrier ST_HS) of the main planetary gearset HS and, accordingly again, completely penetrates the second sun gear shaft 140 in a central and axial direction.

Again in the embodiment example shown in FIG. 22, the disk sets 500 and 600 of clutches E and F, when seen in an axial direction, are placed beside one another, where the disk set 600 of clutch F possesses a greater diameter than does the disk set 500 of clutch E. Respectively, according to with the constructive design of these two clutches E, F with regard to axial installation length, it is possible that the disk set 600 of clutch F, considered spatially, would be at least partially placed in an area radially located above the disk set 500 of clutch F.

The servoapparatus 610 of clutch F is at least substantially located within the cylindrical space, which is formed by the output element 630 (i.e., the outer disk carrier) of clutch F. A pressure chamber 611 of this servoapparatus 610 is formed by a casing surface of this output element (outer disk carrier) 630 and a piston 614, which piston is axially slidable with respect to this output element (outer disk carrier) 630. A reset element 613, designed as a plate spring, for example, is axially fixed onto the hub 633 of the output element (outer disk carrier) 630 and exerts a spring force on the piston 614 axially against the output element (outer disk carrier) 630 of clutch F. In addition to this, for the offset of the dynamic pressure, continually generated by the rotation of the first input element (thus the first sun gear S1_HS) of the main planetary gearset HS, the servoapparatus 610 possesses a pressure offset chamber 612, which can be subjected to filling by non-pressurized lubricant. This pressure offset chamber 612 is to be found on that side of the pressure chamber 611, proximal to the transfer planetary gearset VS. In addition, the pressure offset chamber 612 is formed by a casing of the piston 614 and a sealing plate 615. This sealing plate 615 of the servoapparatus 610 is axially fixed to the hub 633 of the output element (outer disk carrier) 630 of clutch F and, in addition, is rotationally fixed with this hub 633. From a spatial view point, the pressure chamber 611 is closer to the main planetary gearset HS than the pressure offset chamber 612 where, at the same time, the pressure offset chamber 612 is placed nearer to the transfer planetary gearset VS than the pressure chamber 611. If the pressure chamber 611 is subjected to pressure, then the piston 614 axially activates the disk set 600 of clutch F against the opposed spring force of the reset element 613 in the direction of the transfer planetary gearset VS. In this presented embodiment example, the pressure medium is admitted to the pressure chamber 611 and lubricant material is introduced into the pressure offset chamber 612 by appropriate borings or conduits routed through the transmission housing GG. In this operation, an interposed housing wall GZ is rotationally fixed to the transmission housing GG or, alternately, a transmission housing fixed element is provided which, when seen from a spatial standpoint, is located in an area between brakes C and D and possesses the required pressure medium and lubricant material conduits. Pressure and lubricant fluids are first introduced through these pressure and lubricant conduits of the transmission interposed wall GZ or, as mentioned, the transmission housing fixed element of the rotating hub 633 of the output element (outer disk carrier) 630 of the sixth shifting element F and, second, from that point by way of appropriate borings or transport lines of the hub 633 to the chambers 611, 612 for pressure and pressure offset.

The input element 620 of clutch F is designed as an inner disk carrier, geometrically shaped in the form of a pot opening in the direction of the main planetary gearset HS, the cavity embraces a hub 623, a plate-like section 622 and a cylindrical section 621. The hub 633 is located, when seen spatially, on that side of the main planetary gearset HS, which side is remote from the transfer planetary gearset HS and is, in this location, rotatably connected onto a transmission wall fixed hub GN.

The extended length of the housing connected hub GN begins at a wall of the transmission fixed housing wall GW, which forms the end face of the transmission housing, proximal to the transfer planetary gearset VS and the hub runs axially as far as the transfer planetary gearset VS and is further, rotationally connected with the sun gear SO_VS of the planetary gearset VS. The hub 623 rotatably mounted on its side, is proximal to the transfer planetary gearset VS by a connecting plate of the coupled carrier ST_VS of the transfer planetary gearset VS. This coupled carrier ST_VS penetrates the transfer planetary gearset VS in an axial direction and joins the input element 620 of clutch F with the input drive shaft AN. The point of this connection is on that side of the transfer planetary gearset VS which is proximal to the main planetary gearset HS. The disk-shaped section 622 of the input element 620 of clutch F is bound to the hub 623 on that side thereof, which is remote from the transfer planetary gearset VS. This connection is carried out, in the presented example, by shape-fitting over a complementarily built profiled surface. Starting at the hub 623, this plate-like section 622 extends radially outward up to a diameter which, by a very small amount, is less than the inside diameter of the transmission housing GG. On its outside diameter, the plate-like section 622 is bound with the cylindrical section 621 of the input element 620 of clutch F. This connection is again accomplished by shape-fit over a complementary profiled receiving surface.

Starting from the plate-like section 622, this cylindrical section 621 extends axially in the direction of the main planetary gearset HS as far as the disk set 600 of clutch F. In accordance with its function as an internal disk carrier, on that end of this cylindrical section 621, proximal to the main planetary gearset HS, is to be found on the outside diameter of a shape-fit profiled connection means. This connection has the purpose of the acceptance and retention of the inner disks of the disk set 600, advantageously constructed as inward toothed and provided with coating. In its continuing run, the input element 620 of clutch F completely radially overlaps clutches B, A, the transfer planetary gearset VS and clutch E in an axial direction.

Obviously, it is possible that instead of the alternate-sided steel disks (without frictional coating) and instead of fully frictional disks, steel disks of one side fictional coating can be used. In such a case, outward-toothed steel disks and an inward-toothed coated, steel disk must be added to a disk set for alternate sided operation. Obviously, it is also possible to use disks made of carbon or carbon-fibers or another appropriate disk of a composition material instead of the proposed steel disks.

Contrary to FIG. 1A, FIG. 22 illustrates that a common disk carrier ZYLAB has been provided for the two shifting elements A, B, designed as clutches. This disk carrier ZYLAB, which forms the input element of two clutches A, B and is connected to the input drive shaft AN, is placed on that side of the transfer planetary gearset VS, which side is remote from the main planetary gearset HS. In the presented embodiment example, this disk carrier ZYLAB is made as an outer disk carrier for two clutches A, B, for the retention of (advantageously made as outward-toothed steel disks) the outer disks of the disk sets 100, 200 of two clutches A, B, respectively. The disk set 200 of the second shifting element B is located on that side of the transfer planetary gearset VS, which side is remote from the main planetary gearset HS. The disk set 100 of the first shifting element A is, when spatially observed, in an area above the transfer planetary gearset VS, but could also be located above clutch E. This clutch is axially bordering the transfer planetary gearset VS or again, is placed in the manner of the disk set 200, i.e., on that side of the transfer planetary gearset VS, which side is remote from the main planetary gearset HS. In any case, the disk set 100 of clutch A is located nearer the main planetary gearset HS than the disk set 200 of clutch B. The concept of the common outer disk carrier for clutches A, B favors the installation of identical components. This is true insofar as the disk sets 100 and 200 possess the same diameter.

Geometrically, the disk carrier ZYLAB, mutually common for clutches A, B, is designed as a cylindrical-shaped pot, open at both ends, having a cylindrical bottom located approximately in the middle thereof and a hub, which extends axially from end to end. That section of the hub of the disk carrier ZYLAB proximal to the transfer planetary gearset VS is designated as 123. The second section of this hub is designated as 223 and, by way of the pot bottom, is spatially separated from the first section 123 thereof, where the second section 223 is located remotely from the transfer planetary gearset VS. As may be inferred from this nomenclature, the first section 123 of the hub of the disk carrier ZYLAB of the first shifting element A is assigned to the second shifting element B. The hub of the disk carrier ZYLAB, on its side proximal to the transfer planetary gearset VS, is rotationally fixed by a plate-like element to the ring gear HO_VS of the transfer planetary gearset VS, for example, by a shape-fit profiling of the contacting surfaces. This plate-like element assumes the function of a ring gear carrier for the transfer planetary gearset VS and extends radially parallel to and bordering on that carrier plate of the transfer planetary gearset VS. This carrier plate is remote from the main planetary gearset HS. Rotatably attached to the hub 623 of the input element 620 of clutch F is the hub of the disk carrier ZYLAB with its sections 123 and 223. Seen from a spatial standpoint, this location is axially located between that carrier plate of the transfer planetary gearset VS, remote from the main planetary gearset HS and the section 622 of the input element 620 of clutch F, which disk-shaped section 622 is proximal to the housing wall GW.

Starting from approximately the midpoint of the hub of the disk carrier ZYLAB, the at least partially sectional disk-shaped, pot bottom of the disk sets 100 and 200 of the two clutches A, B extends radially to the outside as far as the outside diameter of the disk sets 100 and 200 of the two clutches A, B. On the outside diameter of the pot bottom of the disk carrier ZYLAB, and starting from this pot bottom, a cylindrical section 121 of the disk carrier ZYLAB, which disk carrier is associated with clutch A, extends axially in the direction of the main planetary gearset HS. On the inside diameter of this cylindrical section 121, a connecting profile is to be found for the acceptance of the outer disk carrier 100 of clutch A, where outer disk carrier advantageously carries outward-toothed, steel disks. In the embodiment example shown, the first cylindrical section 121 of the disk carrier ZYLAB overlaps the transfer planetary gearset VS in the axial direction. Starting from the outside diameter of the pot bottom of the disk carrier ZYLAB, a second cylindrical section 221 of the disk carrier ZYLAB extends, which is assigned to clutch B, and which runs axially that direction which is opposite to the direction to the main planetary gearset HS. On the inside diameter of this cylindrical section 221 is provided a profiled engagement for the fastening of the outer disks of the disk set 200 of clutch B, and which outer disks are advantageously outward-toothed steel disks.

A servoapparatus 110 of the first shifting element A is placed at least partially radially above the hub-section 123 of the common input element ZYLAB for the two clutches A and B within a cylindrical space, formed by the disk carrier ZYLAB and its cylindrical section 121. Accordingly, this servoapparatus 110 rotates continually at the same speed of rotation of the output element of the transfer planetary gearset VS, thus at the speed of rotation of the ring gear HO_VS and its assembly includes: a pressure chamber 111, which can be filled with pressurized medium; a pressure offset chamber 112, which can be filled with lubrication fluid under no pressure. This is for the offset of a dynamic pressure generated by the rotation of the pressure chamber 111; an axially slidable piston 114, placed on the disk carrier ZYLAB which carrier serves for the activation of the disk set 100 of clutch A; a sealing plate 115 and, finally, as a reset element 113 for the positional replacement of the piston 114. The pressure chamber 111 is formed by a casing surface of the disk carrier ZYLAB and the axially slidable piston 114, which piston is set on the hub-section 123. The pressure offset chamber is defined by the piston 114 and the sealing plate 115. Seen with consideration to spatial arrangements, the pressure offset chamber 112 is placed nearer to the transfer planetary gearset VS than the pressure chamber 111. For the purpose of engaging clutch A, if the pressure chamber 111 is filled with pressurized medium, than the piston 114 is axially impelled against the spring force of the reset element 113, moving in the direction of the main planetary gearset HS and thus exposes the disk set 100 of clutch A into frictional contact.

A servoapparatus 210 of the second shifting element B occupies a space located at least substantially radially above the hub-section 223, which hub-section 223 is remote from the transfer planetary gearset VS and which hub-section 223 serves the common input element ZYLAB, which acts for the two clutches A and B and is further at least partially within a cylindrical space which cylindrical space is created by its cylindrical section 221. Accordingly, this servoapparatus 210 continually rotates at the rotational speed of the output element of the transfer planetary gearset VS, hence also at the rotational speed of the ring gear HO_VS and includes a pressure chamber 211, which can be filled with pressurized medium; a pressure offset chamber 212 which can be filled with lubricant at atmospheric pressure for the offset of a dynamic pressure generated by the rotating pressure chamber 211; a piston 214, which is slidably fixed onto the disk carrier ZYLAB for the activation of the disk sets 200 of clutch B; a sealing plate 215, and finally a reset element 213 for the positional replacement of the piston 114. The pressure chamber 211 is formed from a combination of a casing surface of the disk carrier ZYLAB, together with an axially slidable piston 214, fixed on the hub-section 223. The pressure offset chamber 211 is bounded by the piston 214 and the sealing plate 215. Seen from spatial considerations, the pressure chamber 211 is placed nearer to the transfer planetary gearset VS than the pressure offset chamber 212. The pressure chambers 111, 211 of the servoapparatuses 110, 210 of two clutches A, B are separated from one another only by a casing surface of the disk carrier ZYLAB which, in common, serves two clutches A and B. In more detail, the separation is made by the plate-like pot bottom of the disk carrier ZYLAB. If the pressure chamber 211 of the servoapparatus 210, for the purpose of engaging clutch B, is subjected to pressure than the piston 214 moves axially against the spring force of the reset element 213 in a direction opposite to that toward the transfer planetary gearset VS. This direction is also opposite to that which leads to the main planetary gearset HS, where the disk set 200 of clutch B is brought into a frictional engagement. The activation directions of clutches A and B are also counter to one another.

As has already been mentioned, the hub for the disk carrier ZYLAB, which in common serves both clutches A, B, including its two hub-sections 123, 233 are rotatably fixed onto the hub 623 of the input element 620 of clutch F. Again as has been mentioned, this hub 623 is rotatably connected to the transmission housing fixed housing hub GN. The feed lines, as respectively required, for the pressure medium and for the lubricant to the pressure chambers 111, 211 and to the pressure offset chambers 112, 212 of the servoapparatuses 110, 210 of two clutches A, B is carried out by this housing hub GN by the rotating hub 623 of the input element 620 of clutch F. Accordingly, inside the housing hub GN and the hub 623 are to be found corresponding borings or conduits, as well as appropriate sealing elements for a rotating seal between the hub 623 and the two hub-sections 123, 223 as well as axially between the respective borings or conduits for the radial pressure and pressure offset chambers, i.e., the feed lines for pressure medium and lubricant.

The output element 130 of clutch A is designed as an inner disk carrier, which is geometrically in the shape of a pot, opening in that direction counter to the direction of the main planetary gearset HS. A cylindrical section 131 of this inner disk carrier 130 is furnished, on its outside diameter, with a profiled contoured connection to secure the inner disks of the disk set 100 of clutch A, which inner disks are advantageously made as inward-toothed, coated disks. The cylindrical section 131 extends from this disk set 100 axially in the direction of the main planetary gearset HS as far as just bordering clutch E. On that side, proximal to the main planetary gearset HS of this cylindrical section 131, a plate-like section 132 of the output element 130 of clutch A is attached to the cylindrical section 131 and radially extends toward the inside up to just above the carrier shaft 540 and is further rotationally fixed to the second sun gear shaft in its hub area. As above, this sun gear shaft 140 exhibits the kinematic connection between clutch A and the second input element (in this case, being sun gear S2_HS) of the main planetary gearset HS. Corresponding to the spatial positioning of the disk set 100 of clutch A, as presented in the illustration of the embodiment example, this positioning is radially located before clutch E, that is, above the transfer planetary gearset VS and in the direction of the main planetary gearset HS, the output element 130 of clutch A fully encapsulates clutch E, when seen from an axial viewpoint.

The output element 230 of clutch B is, likewise, designed as an inner disk carrier. A cylindrical section 231 of this inner disk carrier 230 possesses a profiled connection for the retention of the inner disks of the disk set 200 of clutch B on its outside diameter, where the disks are advantageously inwardly-toothed coated disks and extend from this disk set 200 axially in that direction opposite to a direction toward the transfer planetary gearset VS up to a narrow approach over the axial extension of the cylindrical section 221 of the (outer) disk carrier ZYLAB. Remote from the gearset, on its side, a plate-like section 232 of the output element 230 of clutch B attaches to this cylindrical section 231 and extends radially toward the outside until it reaches a diameter between the outside diameter of the cylindrical section 221 of the disk carrier ZYLAB and the inside diameter of the cylindrical section 621 of the input element 620 of clutch F, which is present in this axial area. On its outside diameter, this plate-like section 232 of the output element 230 of clutch B is rotationally fixed to a cylindrical section of the sealing plate 615 of the servoapparatus 610 of clutch F. This sealing plate 615 of the servoapparatus 610 of clutch F, besides its primary function of the formation of the pressure offset chamber for this servoapparatus 610, and additional function, namely, the torque transmission of the output torque of clutch B to the first input element (here the sun gear S1_HS) of the main planetary gearset HS. Correspondingly, the sealing plate 615, serving as an operative component, is dimensioned in the manner of a profiled connection between the sealing plate 615 and the hub 633 in such a way, that it can transmit the greatest possible output torque of clutch B. In the embodiment example presented in FIG. 22, the sealing plate 615 is depicted as a pot, opening in the direction of the transfer planetary gearset VS with a greater axial extension, the pot bottom rotationally fixed in the area of its inside diameter with the hub 633 of the output element 630 of clutch F and, in one section with a diameter radially above this hub 633, is sealed with pressure medium against the axially slidable piston 614 of the servoapparatus 610 of clutch F for the formation of the pressure offset chamber 612 of this servoapparatus 610. The cylindrical section of the sealing plate, which has attached to the pot bottom, is made to fit the outer contour of clutch E and the common outside disk carrier ZYLAB of clutches A and B and encloses, completely in the axial direction; the output element 130 of clutch A, clutch E, the transfer planetary gearset VS, clutch A and the disk set 200 of clutch B. On the side of the disk set 200 of clutch B, opposite to the transfer planetary gearset VS, the sealing plate is rotationally bound to the output element 230 of clutch B, which output element is serving as an inner disk carrier. In the illustrated embodiment example, on the outside diameter of the plate-like section 232 of this output element 230, a profiled connector is provided, engaging in a complementary profiled connector on that end of the sealing plate 615, which end is remote from the main planetary gearset HS. In another constructive arrangement of the connection between the output element of clutch B and the output element of clutch F, provision can be made so that the output element of clutch B may be made as a cylinder with a substantial axial extension. To the end that it is on the clutch output side connected with the disk set of clutch B, clutch A and the transfer planetary gearset VS, and completely, radially encloses clutch E in the axial direction and either directly or by the sealing plate of the servoapparatus of clutch F or indirectly is bound with the hub of the output element of clutch F.

Even if the transmission scheme, as presented in FIG. 22, possesses an output drive shaft AB, which runs co-axially to the input drive shaft AN, the expert has the knowledge, upon need, as to how a deviation to the outlined arrangement may be made, where the drive shafts for input and output are not co-axially aligned. In this way, the output drive shaft AB can be installed in a simple manner axis parallel to, or at an angle to, the output element of the main planetary gearset HS (in the example, also axis parallel or angularly to the ring gear HO_HS of the main planetary gearset HS) while, simultaneously, care is taken as to the spatial relationships of all other transmission components. As an alternative, it is possible, that the fourth shifting element D, designed as a brake, can then be placed on that side of the main planetary gearset HS, remote from the transfer planetary gearset VS in the area of a transmission end wall. Likewise upon need, the expert can render the carrier shaft 540, shown in FIG. 22 as a solid shaft, as a hollow shaft, in order to be able to run the input drive shaft AN centrally through this now hollowed shaft, if the motor of the transmission, which is operationally connected with the input drive shaft AN, is to be found on that side of the transmission end face which is near to the main planetary gearset HS.

Figure 23:
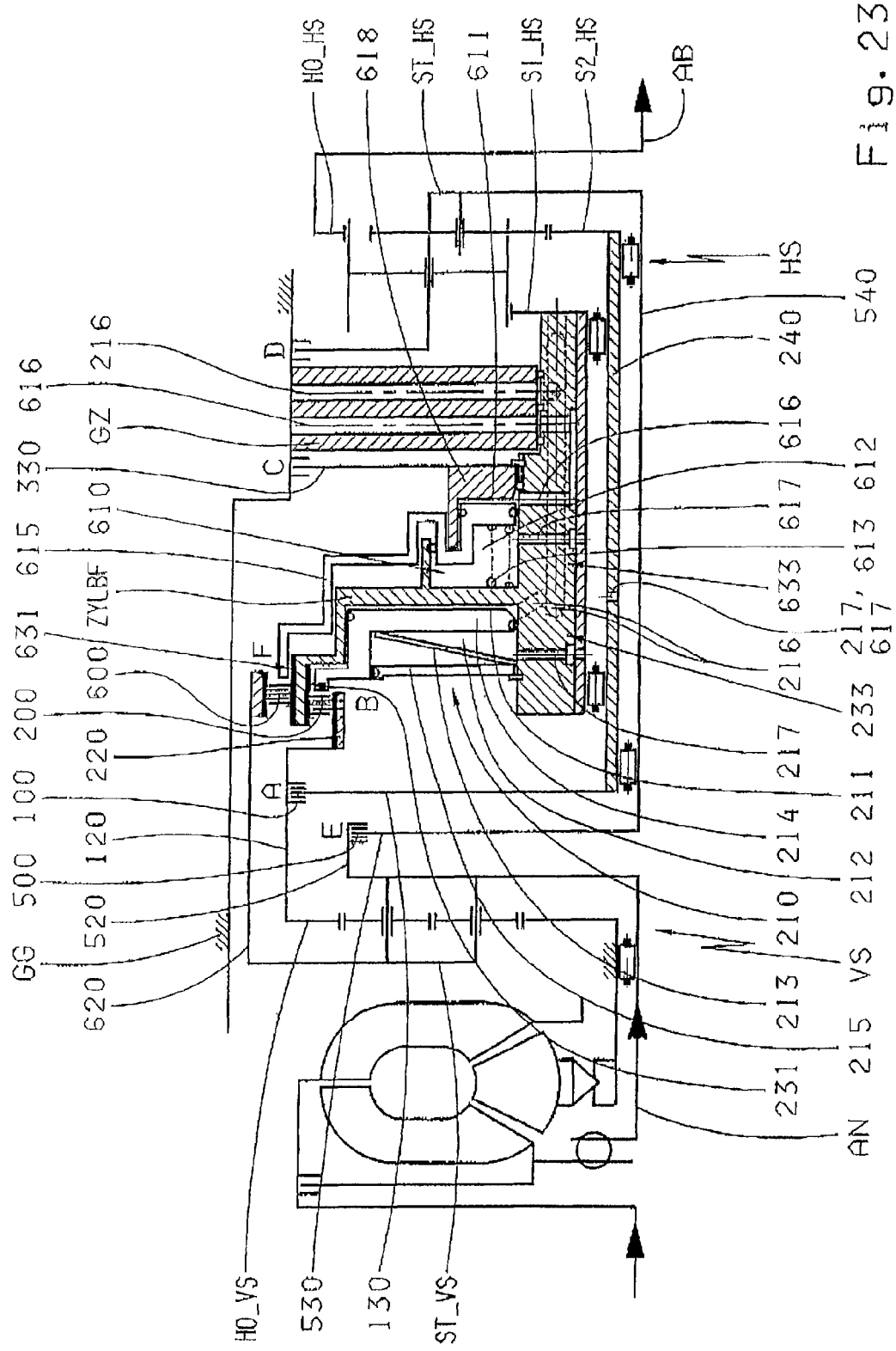
FIG. 23 is a twenty-second scheme of an inventive transmission.

Considering now FIG. 23, a twenty-second embodiment example of a transmission scheme, according to the present invention, is explained and described. Accordingly, this twenty-second embodiment example accepts the idea brought forth in FIG. 22, where the twenty-first embodiment example was described and explained in detail. The idea promoted the fact that the sixth shifting element of the transmission, i.e., clutch F, spatially considered between the transfer planetary gearset VS and the main planetary gearset HS is accordingly to be placed approximate the main planetary gearset HS and, combined this spatial arrangement of clutch F with the known and frequently used spatial arrangement of the second, third, fourth and fifth shifting elements, namely, B, C, D and E and to some extent also the first shifting element A, which idea is found in the state of the technology and depicted in FIG. 1A. The main planetary gearset HS is constructed, as in FIG. 1A and FIG. 22, for example, as a Ravigneaux-planetary gearset with two sun gears S1_HS, S2_HS and only one ring gear HO_HS. Input drive shaft AN and output drive shaft AB extend, as shown in FIG. 1A and FIG. 22, and are, for example, co-axially aligned.

As may be seen in FIG. 23, the two clutches B and F now form a pre-assembled component group to be installed axially on the main planetary gearset HS on that side, proximal to the transfer planetary gearset VS, which group further includes a common disk carrier ZYLBF for both clutches B, F, as well 210, 610 for the activation of the sets 200, 600. Accordingly, the disk carrier ZYLBF for the output element of both clutches B, F and is, correspondingly, rotationally fixed with the input element of the main planetary gearset HS, formed by the first sun gear S1_HS. Accordingly too, the disk carrier ZYLBF is designed as an inner disk carrier for clutch F and as an outer disk carrier for clutch B. Correspondingly the disk set 600 of clutch F, when spatially considered, is placed in an area located radially above the disk set 200 of clutch B. In regard to details about the constructive formation of the constructive group with two clutches B, F, this will be given consideration later in this text.

As may be further seen in FIG. 23, clutch E borders the transfer planetary gearset VS, in like manner to FIG. 1A, on that side thereof, proximal to the main planetary gearset HS, where the input element 520 of clutch E, which is here serving as an outer disk carrier, and with a carrier plate of the coupled carrier ST_VS, which plate is proximal to the main planetary gearset HS, the coupled carrier ST_VS being of the transfer planetary gearset VS and which carrier plate is rotationally fixed to the drive shaft AN. For the sake of simplification, a servoapparatus for the activation of the disk set 500 of clutch E in FIG. 23 is not shown. It could, however, be advantageously placed within a cylindrical space formed by the input element 520 where it would continually rotate at the same speed of rotation as does the input drive shaft AN. The output element 520 of clutch E, which appears as a substantially plate-like inner disk carrier, is rotationally fixed on its inside diameter with a carrier shaft 540, where this carrier shaft 540 serves for the rotationally fixed connection of this output element 530 with the third input element, which latter is formed by the coupled carrier ST_HS of the main planetary gearset HS and, in its axial extent, centrally penetrates at least the component group of clutches B and F as well as the main planetary gearset HS.

The disk set 100 of clutch A is in an area which is located radially above clutch E. In the embodiment example depicted in FIG. 23, the disk set 100 of clutch A is accordingly, when seen with consideration of spatial occupation, in an area beside the disk set 500 of clutch E on that side of the this disk set 500 which side is proximal to the main planetary gearset HS. However, the disk set 500 can also be advantageously, modified, to be placed radially above the disk set 500 or even closer to the transfer planetary gearset VS. The input element 120 of clutch A, which is presented as an outer disk carrier, is rotationally fixed with the ring gear HO_VS of the transfer planetary gearset VS and fully overlaps clutch E in the axial direction. The output element 130 of clutch A is accordingly designed as an inner disk carrier, which borders on the output element 530, i.e., on the inner disk carrier of clutch E on its side, proximal to the main planetary gearset HS and output element 130 extends radially inward and on its inside diameter is rotationally fixed to the a sun gear shaft 240. This sun gear shaft, in turn, creates the rotationally fixed connection of this output element 130 with the second input element of the main planetary gearset HS, which second element is formed by the second sun gear S2_HS, remote from the transfer planetary gearset VS. In its axial extent, the sun gear shaft further includes the carrier shaft 540 and accordingly penetrates the component group of clutches B and F, as well as the first sun gear S1_HS of the main planetary gearset HS, this sun gear S1_HS being located proximal to the transfer planetary gearset VS. Accordingly, the sun gear shaft 240 is rotationally fixed onto the carrier shaft 540. For the sake of simplicity, a servoapparatus of clutch A is not shown in greater detail but, however, this component can be placed on either side of the disk set 100 in FIG. 23 and, according to the respective placement, rotate at the rotational speed of the input drive shaft AN or at the rotational speed of the second input element (namely, the second sun gear S2_HS) of the main planetary gearset HS. If the servoapparatus of clutch A turns at the rotational speed of the second input element of the main planetary gearset HS, then it is possible that the input element 120 of clutch A, in a deviation from the depicted arrangement in FIG. 23, can serve as an inner disk carrier and the output element 130 of clutch A can be designed as an outer disk carrier.

Again, as may be inferred from FIG. 23, the two, radially superimposed disk sets 200, 600 of clutches B, F, are directly neighboring to and axially placed beside the disk set 100 of clutch A on that side thereof, which side is proximal to the main planetary gearset HS. From a logical standpoint, at least a section of a piston of the servoapparatus of clutch A would have been placed between the disk set 100 of clutch A and the disk set 200 of clutch B, if the servoapparatus of clutch A had been placed on that side of the disk set 100, proximal to the main planetary gearset HS. According to the respective, torque requirements of the two clutches A and B, the disk set 200 of clutch B, as in the presented embodiment, is placed at a space-saving diameter, which is only slightly less than the diameter of the disk set 100 of clutch A. Obviously, an expert could determine the geometrical dimensioning of the three neighboring disk sets 100, 200 and 600 of the respective clutches A, B and F. The expert could do this, not only with the aid of the torque, which is to be carried by each respective clutch, but also on the basis of the allowable outside diameter of the transmission housing permissible in this area. The input element 220 of clutch B is, in this case, designed as a substantially cylindrically shaped inner disk carrier for the retention of inward-toothed disks of the disk set 200 of clutch B. The kinematic connection of the input element 220, i.e., clutch B, to the ring gear HO_VS of the transfer planetary gearset VS is accomplished by the input element 120 of clutch A. In this respect, in that area of that end of the disk set 100 of clutch A, proximal to the main planetary gearset HS, the input element 220 is rotationally fixed to the input element 120. As an example, it is possible that the input element 220 and the input element 120 can be made as a one-piece component. Advantageously, provision can also be made, that the input element 220 of clutch B, contrary to the illustration of FIG. 23, can be attached to the sun gear shaft 240 and as a consequence thereof, would also pickup the servoapparatus of clutch A.

The input element 620 of clutch F is, in this case, presented as an outside disk carrier for the outer disks of the disk set 600 of clutch F. Geometrically considered, this outside disk carrier 620 is designed as a cylindrical pot, opening in the direction of both the main planetary gearset HS and the transfer planetary gearset VS and further radially enclose clutches E and A, located beside the transfer planetary gearset VS. A pot bottom of the outer disk carrier 620 is placed on that side of the transfer planetary gearset VS, lying opposite to the disk set 600, i.e., opposite to that side of the transfer planetary gearset, which side is opposite to the main planetary gearset HS and is rotationally fixed to a carrier plate of the coupled carrier ST_VS of the transfer planetary gearset VS. As a matter of principle, it is possible that the carrier plate of the carrier ST_VS could also, simultaneously, be the pot bottom of the outer disk carrier 620. On the outside diameter of the pot bottom, a cylindrical-shaped section of the outer disk carrier 620 of clutch F is attached and extends axially in the direction of the main planetary gearset HS as far as above the disk set 600 of clutch F. Correspondingly, on the inside diameter of this cylindrical-shaped section of the outer disk carrier 620, in the area of its end, proximal to the main planetary gearset HS, is provided a complementarily profiled connection element for retaining the outside disks of the disk set 600.

In the following, the constructive formation of the component groups with two clutches B, F will be described and explained in detail. Geometrically observed, the common disk carrier ZYLBF, which serves both clutches B, F, possesses an essentially cylindrical structure with a hub, rotatable on the sun gear shaft 240, and which is subdivided into two sections, namely 633 and 233, with an at least partial plate-shaped section, extending radially outward from the hub of the disk carrier ZYLBF in the area axially located between the hub-sections 633, 233 approximately into an area of the radial inner disk set 200, as well as with a cylindrical section, which extends axially from the outside diameter of the plate-shaped section of the disk carrier ZYLBF in the direction of the transfer planetary gearset VS as far as a point above the radially inner disk set 200 of clutch B. On the outside diameter of the cylindrical section of the disk carrier ZYLBF, a complementary profile connection for the retention of the inward-toothed disks of the disc set 600 of clutch F is to be found which, corresponding to its belonging to the output element of clutch F, is given the reference number of 631. On the inside diameter of the cylindrical section of the disk carrier ZYLBF is provided a complementary profiled connection for the outer disks of the disk set 200 of clutch B and, corresponding to its belonging to the output element of clutch B, is designated as 231. The hub-section 233 of the hub of the disk carrier ZYLBF extends in the axial direction to that side of the plate-like section of the disk carrier ZYLBF, proximal to the transfer planetary gearset VS, radially beneath the disk set 200 of clutch B. The hub-section designated as 633 of the hub of the disk carrier ZYLBF extends on that side of the of the plate-like section of the disk carrier ZYLBF, proximal to the main planetary gearset HS, this extension proceeds in an axial direction as far as the first sun gear S1_HS of the main planetary gearset HS, where the sun gear is proximal to the main planetary gearset HS and is rotationally bound to the sun gear S1_HS. Accordingly, this hub-section 633 of the disk carrier ZYLBF penetrates in the axial direction a central boring of a transmission housing fixed interposed housing wall GZ. As shown in FIG. 22, this interposed housing wall GZ is placed near to the main planetary gearset HS and extends from the inside diameter of the transmission housing GG, for example, axially between two brakes C and D, inward up to an area approximately beside the first sun gear S1_HS of the main planetary gearset HS, where the sun gear is proximal to the transfer planetary gearset VS. Respectively in accord with the structure of the transmission housing GG, it is possible that the interposed housing wall GZ can also be onepiece or a rigid section of the transmission housing GG.

The servoapparatus 210 of clutch B includes the following components: a pressure chamber 211; a pressure offset chamber 212; a piston 214; a reset element 213; and a sealing plate 215. The servoapparatus 210 is further entirely enclosed by a cylindrical space, formed by the disk carrier ZYLBF (more exactly by way of the cylindrical section 231 and the platelike section of the disk carrier ZYLBF) and is placed radially above the hub-section 233 of the disk carrier ZYLBF. The piston 214 is slidingly fixed on the disk carrier ZYLBF in an axial direction. Consequently, the servoapparatus 210 continually rotates at the rotational speed of the first input element (thus the first sun gear S1_HS) of the main planetary gearset HS. For the offset of the pressure generated by the rotating pressure chamber 211 of the servoapparatus 210, a dynamic pressure offset is provided by the pressure offset chamber 212, which can be filled with lubricating material under atmospheric pressure. Accordingly, the pressure chamber 211 is placed nearer to the main planetary gearset HS than the pressure offset chamber 212 and the pressure offset chamber 212 is located nearer to the transfer planetary gearset VS than the pressure chamber 211. The pressure chamber 211 is bounded by a casing surface of the disk carrier ZYLBF (more exactly of the cylindrical section 231 and the plate-like section and a part of the hub-section 233 of the disk carrier ZYLBF) and by the piston 214. The pressure offset chamber 212 is formed by the piston 214 and the sealing plate 215, fixed on the axial end of the hub-section 233 of the disk carrier ZYLBF, where the end is proximal to the transfer planetary gearset VS. The sealing plate 214 is axially sealed against the sliding piston 214 by lubricant material. The piston 214 is forcibly acted upon by the reset element 213, designed as a plate spring, and acts against the hub-section 233 of the disk carrier ZYLBF. In the case of a subjection of the pressure chamber 211 to pressurized medium, for the purpose of engaging clutch B, then the piston 214 moves axially in the direction of the transfer planetary gearset VS and activates the disk set 200, which is assigned to it, against the spring force of the reset element 213.

Considered from a spatial requirement standpoint, the servoapparatus 610 of clutch F is placed nearer to the main planetary gearset HS than the servoapparatus 210 of clutch B and, accordingly, only by a casing surface of the disk carrier ZYLBF are the two servoapparatuses 210 separated, one from the other. Further, the servoapparatus 610 of clutch F, from a space standpoint, is at least substantially in an area located radially above the hub-section 633 of the disk carrier ZYLBF, which hub-section is proximal to the main planetary gearset HS and, axially, is slidingly fixed to the disk carrier ZYLBF. Correspondingly, the servoapparatus 610 rotates continually at the speed of rotation of the first input element, (namely the first sun gear S1_HS) of the main planetary gearset HS. The servoapparatus 610 of clutch F includes a pressure chamber 611; a pressure offset chamber 612; a partly irregularly shaped piston 614; a reset element 613 and, finally, a partially cylindrical support structure 618. For the offset of the pressure generated by the rotation of the pressure chamber 611 of the servoapparatus 610, a dynamic pressure offset is provided by a pressure offset chamber 612. The support structure 618 borders directly on the interposed housing wall GZ and is held by rotational affixation and axial securement for the formation of the pressure chamber 611 in a pressure medium tight connection with the hub-section 633 of the disk carrier ZYLBF. In the presented illustration, the connection is accomplished by a complementary profiled binding and a securement ring. A plate-like section of the support structure 618 extends axially parallel to the interposed housing wall GZ, a cylindrical section of the support structure 618 continues through the outside diameter of its own plate-like section, thus extending in the direction of the transfer planetary gearset VS. For the formation of the pressure offset chamber 612 of the servoapparatus 610, a second cylindrical section of the disk carrier ZYLBF is provided, which extends from the plate-like section, this being radially above hub-section 633 on a diameter which is greater than the outside diameter of the support structure 618. This is axially extending in the direction of the main planetary gearset HS, approximately at that end of the cylindrical section of the support structure 618, proximal to the transfer planetary gearset VS. The piston 614 of the servoapparatus 610 is axially slidable on and sealed against the following components, namely the cylindrical section of the support structure 618, the hub-section 633 of the disk carrier ZYLBF, and the second cylindrical section of the disk carrier ZYLBF. Accordingly, the irregular-shaped piston 614 engages in this area independently, the cylindrical section of the support structure 618 in an axial and radial direction, also picks up the second cylindrical section of the disk carrier ZYLBF, again, in an axial and a radial direction. The piston 614 also penetrates a radial opening between the cylindrical section of the support structure 618 and the second cylindrical section of the disk carrier ZYLBF. Correspondingly, the pressure chamber 611 of the servoapparatus 610 of clutch F is formed by the following components: the piston 614, the cylindrical section of the support structure 618, the plate-like section of the support structure 618, which is to be found radially below the cylindrical section of the support structure 618, as well as a part of the hub-section 633 of the disk carrier ZYLBF. The pressure offset chamber 612 of the servoapparatus 610 of clutch F is bordered by the piston 614, the second cylindrical section of the disk carrier ZYLBF and the plate-like section of the disk carrier ZYLBF, radially placed under this second cylindrical section of the disk carrier ZYLBF. Further, the pressure offset chamber is only separated from the pressure chamber 211 of the servoapparatus 210 of clutch B by a casing surface of the common disk carrier ZYLBF for two clutches B, F.

In its further extending length, the piston 614 of the servoapparatus 610 of clutch F extends at least substantially along the outer contour of the radial upper area of the disk carrier ZYLBF and proceeds radially to the outside and axially in the direction of the transfer planetary gearset VS as far as that side of the disk set 600 of clutch F, proximal to the main planetary gearset HS, wherein the disk carrier 600 is assigned to the piston 614. The piston 614 is axially biased by the reset element 613 which, in this case for example, is designed as a helical gear set axially located between the plate-like section of the disk carrier ZYLBF and the piston 614. In the case of a pressure filling of the pressure chamber 611 with pressure medium, for the purpose of engaging clutch F, then the piston 614 moves axially in the direction of the transfer planetary gearset VS and activates the disk set 600 counter to the spring force of the reset element 613. The piston 614 engages, practically totally, also the disk carrier ZYLBF, which disk carrier serves in common for two clutches B, F.

Because of the placement of the disk carrier ZYLBF in the transmission housing fixed interposed housing wall GZ, there arises a constructive, relatively simple pressure medium and lubricant substance feed to two clutches B, F. In the embodiment presented in FIG. 23, the pressure medium feeds to the respective pressure chambers 211, 611 of the servoapparatuses 210, 610 of two clutches B, F is carried out by corresponding conduits or borings, which partially run within the interposed housing wall GZ and partly within the hub of the disk carrier ZYLBF, and are respectively designated as 216 and 616. A pressure medium feed to the pressure chamber 211 of the servoapparatus 210 of clutch B is designated 216, while a pressure fluid feeds to the pressure chamber 611 of the servoapparatus 610 of clutch F has the reference number of 616. The pressure medium is introduced radially from the outside into the hub of the disk carrier ZYLBF by the hub-section 633 thereof. Obviously, the pressure medium conduits 216, 616 in the hub-section 633 in the area of its penetration, through the corresponding central boring of the interposed housing wall GZ, are provided with anti-rotation sealing against one another and against the interposed housing wall GZ. The lubricant material feeds to the pressure offset chambers 212, 612 is done, in this case, by a central boring of the carrier shaft 540 (not further described) and at least a radial boring of the first sun gear shaft 240 which, in this area, radially engages the carrier shaft 540. A lubricating material feed to the pressure offset chamber 212 of the servoapparatus 210 of clutch B is designated as 217, a lubricant feed to the pressure offset chamber 612 of the servoapparatus 610 of clutch F has the reference number, 617.

An additional, exceptional feature of the transmission, according to FIG. 23, is the torque transferring connection of brake C on the first input element, in this case, which is formed by the first sun gear S1_HS of the main planetary gearset HS. Brake C, for example, is designed as a disk-brake, although it could, obviously—as is brake D—be constructed as a band-brake. Correspondingly, the output element 330 of brake C serves as an inner disk carrier. In this respect, provision is made that the output element 300 is to be rotationally fixed over the support structure plate 618 of the servoapparatus 610 of clutch F with the disk carrier ZYLBF, where this disk carrier ZYLBF (as previously noted) serves as the output element of clutches B and F, and independently is rotationally bound with the first sun gear S1_HS of the main planetary gearset HS.

Finally, mention should be emphatically made, that the described alternative versions of main planetary gearset HS types, as shown in FIGS. 17 to 21, can be combined very easily with all previously described component arrangements as seen in FIGS. 2 to 16, 22 and 23.

REFERENCE NUMERALS

A first shifting element, a clutch
B second shifting element, a clutch
C third shifting element, a brake
D fourth shifting element, a brake
E fifth shifting element, a clutch
F sixth shifting element, a clutch
AN input drive shaft
AB output drive shaft
GD housing cover
GG transmission housing
GN hub of housing wall
GW housing wall
GZ interposed housing wall
ZYL cylindrical connection element
ZYLB cylindrical connection element
ZYLF cylindrical connection element
ZYLAB common disk carrier of the first and second shifting elements
ZYLBF common disk carrier of the second and sixth shifting elements
VS transfer planetary gearset
HO-VS ring gear of transfer planetary gearset
SO-VS sun gear of transfer planetary gearset
ST-VS (coupled) carrier of the transfer planetary gearset
P1-VS inner planetary gear of the transfer planetary gearset
P2-VS outer planetary gear of the transfer planetary gearset
HS main planetary gearset
HO_HS (single) ring gear for the main planetary gearset
H1_HS first ring gear for the main planetary gearset
H13_HS coupled (first) ring gear of the main planetary gearset
H134_HS coupled (first) ring gear of the main planetary gearset
H2_HS second ring gear of the main planetary gearset
S1_HS first sun gear of the main planetary gearset
S2_HS second sun gear of the main planetary gearset
S3_HS third sun gear of the main planetary gearset
S4_HS fourth sun gear of the main planetary gearset ST_HS coupled (single) carrier of the main planetary gearset
ST1_HS first carrier of the main planetary gearset
ST13_HS coupled (first) carrier of the main planetary gearset
ST134_HS coupled (first) carrier of the main planetary gearset
ST2_HS second carrier of the main planetary gearset
P1_HS long planetary gear of the main planetary gearset
P13_HS coupled long planetary gear of the main planetary gearset
P2_HS short planetary gear of the main planetary gearset
PL_HS first planetary gear of the main planetary gearset
PLa_HS outer planetary gear of the main planetary gearset
PLi_HS inner planetary gear of the main planetary gearset
100 disks of the first shifting element
110 servoapparatus of the first shifting element
111 pressure chamber of the servoapparatus of the first shifting element
112 pressure offset chamber of the first shifting element
113 reset element of the servoapparatus of the first shifting element
114 piston of the servoapparatus of the first shifting element
115 sealing plate of the servoapparatus of the first shifting element
120 input element of the first shifting element
121 cylindrical section of the entry element of the first shifting element
123 hub of the entry element of the first shifting element
130 output element of the first shifting element
131 cylindrical section of the output element of the first shifting element
132 platelike section of the output element of the first shifting element
140 second sun shaft
150 complementary profiled connection
200 disks of the second shifting element
210 servoapparatus of the second shifting element
211 pressure chamber of the servoapparatus of the second shifting element
212 pressure offset chamber of the servoapparatus of the second shift element
213 reset element of the servoapparatus of the second shifting element
214 piston of the servoapparatus of the second shifting element
215 sealing plate of the servoapparatus of the second shifting element
216 feed line of pressure medium to the pressure chamber of the servoapparatus of the second shifting element
217 lubricant feed to the pressure offset chamber of the servoapparatus of the second shifting element
218 support structure of the servoapparatus of the second shifting element
220 input element of the second shifting element
221 cylindrical section of the input element of the second shifting element
222 platelike section of the input element of the second shifting element
223 hub of the input element of the second shifting element
230 output element of the second shifting element
231 cylindrical section of the output element of the second shifting element
232 platelike section of the output element of the second shifting element
233 hub of the output element of the second shifting element
234 second cylindrical section of the output element of the second shifting element
240 first sun gear
250 complementary profiled connection
300 disks of the third shifting element
310 servoapparatus of the third shifting element
330 output element of the third shifting element
400 disks of the fourth shifting element
410 servoapparatus of the fourth shifting element
430 output element of the fourth shifting element
500 disks of the fifth shifting element
510 servoapparatus of the fifth shifting element
520 input element of the fifth shifting element
530 output element of the fifth shifting element
540 carrier shaft
600 disks of the sixth shifting element
610 servoapparatus of the sixth shifting element
611 pressure chamber of the servoapparatus of the sixth shifting element
612 pressure offset chamber of the servoapparatus of the sixth shifting element
613 reset element of the servoapparatus of the sixth shifting element
614 piston of the servoapparatus of the sixth shifting element
615 sealing plate of the servoapparatus of the sixth shifting element
616 pressure medium feed to the pressure chamber of the servoapparatus of the sixth shifting element
617 lubricant feed to the pressure offset chamber of the servoapparatus of the sixth shifting element
618 support structure of the servoapparatus for the sixth shifting element
620 input element of the sixth shifting element
621 cylindrical section of the input element of the sixth shifting element
622 platelike section of the input element of the sixth shifting element
623 hub of the input element of the sixth shifting element
630 output element of the sixth shifting element
631 cylindrical section of the output element of the sixth shifting element
632 platelike section of the output element of the sixth shifting element
633 hub of the output element of the sixth shifting element

The invention claimed is:
1. A multistage automatic transmission having an input drive shaft (AN), an output drive shaft (AB), an transfer planetary gearset (VS), an main planetary gearset (HS), and at least first, second, third, fourth, fifth and sixth shifting elements (A to F), the transmission having the following features:
the transfer planetary gearset (VS) is a double planetary gearset;
an output element of the transfer planetary gearset (VS) rotates at a speed of rotation which is less than a speed of rotation of the input drive shaft (AN);
an input element of the transfer planetary gearset (VS) is continually connected to the input drive shaft (AN);
an element of the transfer planetary gearset (VS) is connected to a transmission housing of the transmission;
the main planetary gearset (HS) is a coupled planetary gearset with a plurality of input elements which are not coupled with one another and a single output element;
the output element of the main planetary gearset (HS) is continually connected with the output drive shaft (AB);
an input element (120) of the first shifting element (A) is connected with the output element of the transfer planetary gearset (VS);

an output element (130) of the first shifting element (A) is connected with a second input element of the main planetary gearset (HS);

an input element (220) of the second shifting element (B) is connected with the output element of the transfer planetary gearset (VS);

an output element (230) of the second shifting element (B) is connected with a first input element of the main planetary gearset (HS);

an input element of the third shifting element (C) is connected with the transmission housing (GG);

an output element (330) of the third shifting element (C) is connected to a first input element of the main planetary gearset (HS);

an input element of the fourth shifting element (D) is connected with the transmission housing (GG);

an output element (430) of the fourth shifting element (D) is connected with a third input element of the main planetary gearset (HS);

an input element (520) of the fifth shifting element (E) is connected with the input drive shaft (AN);

an output element (530) of the fifth shifting element (E) is connected with the third input element of the main planetary gearset (HS);

an input element (620) of the sixth shifting element (F) is connected with the input drive shaft (AN);

an output element (630) of the sixth shifting element (F) is connected with he first input element of the main planetary gearset (HS), for the transfer planetary gearset (VS), the following components are connected: a sun gear (S0_VS), a ring gear (HO_VS), as well as a coupled carrier (ST_VS) on which inner and outer planet gears (P1_VS, P2_VS) are rotationally fixed, whereby the inner planet gears (P1_VS) of the transfer planetary gearset (VS) mesh with the sun gear (SO_VS) and with the outer planet gears (P2_VS) of the transfer planetary gearset (VS);

the outer planet gears (P2_VS) of the transfer planetary gearset (VS) mesh with the inner planet gears (P1_VS) and with the ring gear (HO_VS) of the transfer planetary gearset (HS);

the carrier (ST_VS) of the transfer planetary gearset (VS) forms the input element of the transfer planetary gearset (VS) which input element is continually connected to the input drive shaft (AN);

the ring gear (HO_VS) of the transfer planetary gearset (VS) forms the output element of the transfer planetary gearset (VS) which is connected with the input elements of the main planetary gearset (HS), and the sun gear (SO_VS) of the transfer planetary gearset (VS) is rigidly fixed to the transmission housing (GG), and the main planetary gearset (HS) is constructed as a two-carrier, four shaft transmission, with two coupled single planetary gearsets, which include first and second sun gears, (S1_HS, S2_HS), first and second ring gears (H1_HS, H2_HS), a first carrier (ST1_HS), onto which are rotationally fixed first planet gears (PL_HS) as well as a coupled second carrier (ST2_HS) onto which is rotationally fixed inner and outer planet gears (PLi_HS, PLa_HS), whereby:

the first planet gears (PL_HS) of the main planetary gearset (HS) mesh with the first ring gear (H1_HS) and with the first sun gear (S1_HS) of an output-side of the planetary gearset (HS);

the inner planet gears (PLi_HS) of the main planetary gearset (HS) mesh with the outer planet gears (PLa_HS) and with the second sun gear (S2_HS) of the main planetary gearset (HS);

the outer planet gears (PLa_HS) of the main planetary gearset (HS) mesh with the inner planet gears (PLi_HS) and with the second ring gear (H2_HS) of the main planetary gearset (HS);

the first sun gear (S1_HS) and the coupled second carrier (ST2_HS) of the main planetary gearset (HS) are mutually connected together and form the first input element of the main planetary gearset (HS) and are connected to the output elements (230, 330, 630) of the second, the third and the sixth shifting element (B, C, F);

the second sun gear (S2_HS) of the main planetary gearset (HS) forms the second input element of the main planetary gearset (HS) and is connected to the output element (130) of the first shifting element (A);

the first carrier (ST1_HS) and the second ring gear (H2_HS) of the main planetary gearset (HS) are connected mutually together and thus form the third input element of the main planetary gearset (HS) and are connected with the output elements (430, 530) of the fourth and fifth shifting element (D, E), and the first ring gear (H1_HS) of the main planetary gearset (HS) forms the output element of the main planetary gearset and is connected to the output drive shaft (AB), wherein a servoapparatus (610), for activation of the sixth shifting element (F), continually rotates at the same rotational speed of the first input element of the main planetary gearset (HS).

2. The multistage automatic transmission according to claim 1, wherein the output element (630) of the sixth shifting element (F) is connected, via the output element (230) of the second shifting element (B), with the first input element of the main planetary gear set (HS).

3. The multistage automatic transmission according to claim 1, wherein the sixth shifting element (F) and the second shifting element (B) are connected, via a common output element (ZYLBF), with the first input element of the main planetary gear set (HS).

4. The multistage automatic transmission according to claim 1, wherein a servoapparatus (210), for the activation of the second shifting element (B), continually rotates at the speed of rotation of the first element of the main planetary gearset (HS).

5. The multistage automatic transmission according to claim 1, wherein the second and the sixth shifting elements (B, F), when considered spatially, are placed axially in an area between the transfer planetary gearset (VS) and a radially extending housing wall (GW) of the transmission housing (GG), and when considered spatially, on a side of the transfer planetary gearset (VS) which is remote from the main planetary gearset (HS), whereby the transfer planetary gearset (VS) and the main planetary gearset (HS) are co-axially aligned with one another.

6. The multistage automatic transmission according to claim 1, wherein the second and the sixth shifting elements (B, F), when considered spatially, are at least partially in an area axially aligned between the transfer planetary gearset (VS) and the main planetary gearset (HS), whereby the transfer planetary gearset (VS) and the main planetary gearset (HS) are arranged to be co-axial with one another.

7. The multistage automatic transmission according to claim 1, wherein the second and the sixth shifting elements (B, F) form a component-group which, when seen with consideration of space occupancy, are at least one of:

located axially between the first and the third shifting elements (A, C);

axially between the first shifting element (A) and the main planetary gearset (HS);

axially between the fifth and the third shifting elements (E, C);

axially between the fifth shifting element (E) and the main planetary gearset (HS);

axially beside the first shifting element (A);

axially beside the first shifting element (A) and axially beside a disk set (100) of the first shifting element (A);

axially beside the third shifting element (C);

axially beside the third shifting element (C) and axially beside a disk set (300) of the third shifting element (C).

8. The multistage automatic transmission according to claim 1, wherein a disk set (200) of the second shifting element (B), when seen in an axial direction, is located at least partially radially above a disk set (600) of the sixth shifting element (F).

9. The multistage automatic transmission according to claim 1, wherein disk sets (200, 600) of the second and the sixth shifting elements (B, F) are arranged axially adjacent the transfer planetary gearset (VS), the servoapparatus (210) of the second shifting element (B) is arranged on a side of the disk set (200) of the second shifting element (B) remote from the input-sided planetary gearset (VS), and the servoapparatus (610) of the sixth shifting element (F) is arranged on a side of the disk set (600) of the sixth shifting element (F) remote from the transfer planetary gearset (VS).

10. The multistage automatic transmission according to claim 1, wherein a disk set (600) of the sixth shifting element (F), when seen in an axial direction, is placed at least partially radially above a disk set (200) of the second shifting element (B).

11. The multistage automatic transmission according to claim 10, wherein a servoapparatus (210) of the second shifting element (B) and the servoapparatus (610) of the sixth shifting element (F) are placed so as to be axially adjacent the transfer planetary gearset (VS), and the disk sets (200, 600) of the second and the sixth shifting elements (B, F) are placed on a side of the servoapparatuses (210, 610) of the second and the sixth shifting elements which is remote from the transfer planetary gearset (VS).

12. The multistage automatic transmission according to claim 1, wherein a disk set (200) of the second shifting element (B) is placed in axial alignment beside a disk set (600) of the sixth shifting element (F).

13. The multistage automatic transmission according to claim 1, wherein the input element (220) of the second shifting element (B) is connected to at least one of:

the output element of the transfer planetary gearset (VS), and the input element (620) of the sixth shifting element (F), which is connected with the input drive shaft (AN) and includes, in a direction radially outward, disk sets (200, 600) of the second and the sixth shifting elements (B, F).

14. The multistage automatic transmission according to claim 1, wherein the second shifting element (B), when viewed spatially, is placed at least partially in an area between the transfer planetary gearset (VS) and the main planetary gearset (HS) and the sixth shifting element (F), when spatially observed, is placed in an area axially aligned between the transfer planetary gearset (VS) and a radially extending housing wall (GW) of the transmission housing (GG) on a side of the transfer planetary gearset (VS) which is remote from the main planetary gearset (HS), whereby the transfer planetary gearset (VS) and the main planetary gearset (HS) are co-axial with one another.

15. The multistage automatic transmission according to claim 1, wherein the output element (230) of the second shifting element (B) are connected with the first input element of the output side of the planetary gear set (HS) by the output element (630) of the sixth shifting element (F).

16. The multistage automatic transmission according to claim 1, wherein the second shifting element (B), when considered from a space demand, is at least partially placed in an area between the transfer planetary gearset (VS) and a housing wall (GW) which extends radially and is part of the transmission wall (GG) to be situated, again spatially considered, on a side of the transfer planetary gearset (VS) which is remote from the main planetary gearset (HS), and the sixth shifting element (F), when spatially considered, is at least partially placed axially in an area between the transfer planetary gearset (VS) and the main planetary gearset (HS), whereby the planetary gearsets (VS and HS) are co-axial with one another.

17. The multistage automatic transmission according to claim 16, wherein a servoapparatus (210), for the activation of the second shifting element (B), continuously rotates at the speed of rotation of the output element of the transfer planetary gearset (VS).

18. The multistage automatic transmission according to claim 1, wherein the sixth shifting element, when viewed spatially, is placed at least one of:

axially between the fifth and the third shifting elements (E, C);

axially between the fifth shifting element (E) and the main planetary gearset (HS);

axially beside the fifth shifting element (E); and axially beside the third shifting element (C), and the second shifting element, when viewed spacially, is placed on a side of the first shifting element (A) which lies opposite to the sixth shifting element (F).

19. The multistage automatic transmission according to claim 1, wherein the output element (630) of the sixth shifting element (F) is fixed to the input element (620) of the sixth shifting element (F), and the input element (620) of the sixth shifting element (F) is connected to the input drive shaft (AN);

the input element (620) of the sixth shifting element (F) is connected to a rotationally fixed hub (GN) of a housing wall (GW) of the transmission housing (GG); and the hub (GN) of the housing wall (GW) possesses passages for supplying at least one of pressure and lubricating media to at least one of the servoapparatuse (610) of the sixth shifting element (F), a servoapparatus (210) of the second shifting element (B) and a servoapparatus (110) of the first shifting element (A).

20. The multistage automatic transmission according to claim 1, wherein at least one of the output element (630) of the sixth shifting element (F) and the output element (230) of the second shifting element (B) is respectively fastened to a rotationally fixed hub (GN) of a housing wall (GW) of the transmission housing (GG); and the hub (GN) of the housing wall (GW) possesses passages for supplying at least one of pressure and lubricating media to at least one of the servoapparatuse (610) of the sixth shifting element (F), a servoapparatus (210) of the second shifting element (B) and a servoapparatus (110) of the first shifting element (A).

21. The multistage automatic transmission according to claim 1, wherein an input element (120) of the first shifting element (A), which is connected to the output element of the transfer planetary gearset (VS), is connected to the input element (620) of the sixth shifting element (F), which is connected to the input drive shaft (AN).

22. The multistage automatic transmission according to claim 1, wherein the output element (130) of the first shifting element (A), which is connected to the second input element of the main planetary gearset (HS), is connected to the input element (220) of the second shifting element (B), which is connected to the transfer planetary gearset (VS).

23. The multistage automatic transmission according to claim 1, wherein the input element (220) of the second shifting element (B), which is connected with the output element of the transfer planetary gearset (VS), is connected to the input element (620) of the sixth shifting element, which is connected to the input drive shaft (AN).

24. The multistage automatic transmission according to claim 1, wherein by selective engagement of desired ones of the first, the second, the third, the fourth, the fifth and the sixth shifting elements (A to F), at least eight forward gear stages can be shifted in a manner such that the speed of rotation of the input drive shaft (AN) is transferred to the output drive shaft (AB), and for shifting from one gear stage to a next successive higher or lower gear stage, only one shifting element is disengaged and only one additional shifting element is engaged, whereby the following gear stages are possible:
for a first forward gear, the first and the fourth shifting elements (A, D) are engaged;
for a second forward gear, the first and the third shifting elements (A, C) are engaged;
for a third forward gear, the first and the second shifting elements (A, B) are engaged;
for a fourth forward gear, the first and the sixth shifting elements (A, F) are engaged;
for a fifth forward gear, the first and the fifth shifting elements (A, E) are engaged;
for a sixth forward gear, the fifth and the sixth shifting elements (E, F) are engaged;
for a seventh forward gear, the second and the fifth shifting elements (B, E) are engaged, and
for an eighth forward gear, the third and the fifth shifting elements (C, E) are engaged, and/or
whereby when shifting for reverse travel, the fourth shifting element (D) and additionally either the second shifting element (B) or the sixth shifting element (F) are engaged.

25. A multistage automatic transmission having an input drive shaft (AN), an output drive shaft (AB), an transfer planetary gearset (VS), an main planetary gearset (HS), and at least first, second, third, fourth, fifth and sixth shifting elements (A to F), the transmission having the following features:
the transfer planetary gearset (VS) is a double planetary gearset;
an output element of the transfer planetary gearset (VS) rotates at a speed of rotation which is less than a speed of rotation of the input drive shaft (AN);
an input element of the transfer planetary gearset (VS) is continually connected to the input drive shaft (AN);
an element of the transfer planetary gearset (VS) is connected to a transmission housing of the transmission;
the main planetary gearset (HS) is a coupled planetary gearset with a plurality of input elements which are not coupled with one another and a single output element;
the output element of the main planetary gearset (HS) is continually connected with the output drive shaft (AB);
an input element (120) of the first shifting element (A) is connected with the output element of the transfer planetary gearset (VS);
an output element (130) of the first shifting element (A) is connected with a second input element of the main planetary gearset (HS);
an input element (220) of the second shifting element (B) is connected with the output element of the transfer planetary gearset (VS);
an output element (230) of the second shifting element (B) is connected with a first input element of the main planetary gearset (HS);
an input element of the third shifting element (C) is connected with the transmission housing (GG);
an output element (330) of the third shifting element (C) is connected to the first input element of the main planetary gearset (HS);
an input element of the fourth shifting element (D) is connected with the transmission housing (GG);
an output element (430) of the fourth shifting element (D) is connected with a third input element of the main planetary gearset (HS);
an input element (520) of the fifth shifting element (E) is connected with the input drive shaft (AN);
an output element (530) of the fifth shifting element (E) is connected with the third input element of the main planetary gearset (HS);
an input element (620) of the sixth shifting element (F) is connected with the input drive shaft (AN);
an output element (630) of the sixth shifting element (F) is connected with the first input element of the main planetary gearset (HS),
the transfer planetary gearset (VS) possesses a ring gear (HO_VS) as well as a coupled carrier (ST_VS), on which inner and outer planet gears (P1_VS, P2_VS) are rotationally fixed, whereby:
the inner planet gears (P1_VS) of the transfer planetary gearset (VS) mesh with a sun gear (SO_VS) and the outer planet gears (P2_VS) of the transfer planetary gearset (VS);
the outer planet gears (P2_VS) of the transfer planetary gearset (VS) mesh with the inner planet gears (P1_VS) and with the ring gear (HO_VS) of the transfer planetary gearset (HS);
the carrier (ST_VS) of the transfer planetary gearset (VS) forms the input element of the transfer planetary gearset (VS);
the ring gear (HOVS) of the transfer planetary gearset (VS) forms the output element of the transfer planetary gearset (VS);
the sun gear (SO_VS) of the transfer planetary gearset (VS) is rigidly fixed to the transmission housing (GG), and
the main planetary gearset (HS) is a reduced three-carrier transmission with first, second and third sun gears (S1_HS, S2_HS, S3_HS), a coupled ring gear (H13_HS), a second ring gear (H2_HS), a coupled carrier (ST13_HS), which supports long planet gears (P13_HS), and a second carrier (ST2_HS), which supports short planet gears (P2_HS), whereby:
the third sun gear (S3_HS) of the main planetary gearset (HS) is placed axially between the first and the second sun gears (S1_HS, S2_HS) of the main planetary gearset (HS);

the long planet gears (P13_HS) of the main planetary gearset (HS) mesh with the coupled ring gear (H13_HS) and with the first and the third sun gears (S1_HS, S3_HS) of the main planetary gearset (HS);

the short planet gears (P2_HS) of the main planetary gearset (HS) mesh with the second ring gear (H2_HS) and with the second sun gear (S2_HS) of the main planetary gearset (HS);

the second and the third sun gears (S2_HS, S3_HS) of the main planetary gearset (HS) are rigidly connected together;

the first sun gear (S1_HS) of the main planetary gearset (HS) forms the first input element of the main planetary gearset (HS) and is connected to the output elements (230, 330, 630) of the second, the third and the sixth shifting element (B, C, F);

the coupled ring gear (H13_HS) of the main planetary gearset (HS) forms the second input element of the main planetary gearset (HS) and is connected to the output element (130) of the first shifting element (A);

the second carrier (ST2_HS) of the main planetary gearset (HS) forms the third input element of the main planetary gearset (HS) and is connected with the output element (430, 530) of the fourth and the fifth shifting elements (D, E), and the coupled carrier (ST13_HS) and the second ring gear (H2_HS) of the main planetary gear set (HS) are connected fixedly with one another and form the output element of the main planetary gearset (HS) and are connected with the output drive shaft (AB), wherein a servoapparatus (610), for activation of the sixth shifting element (F), continually rotates at the same rotational speed as the first input element of the main planetary gearset (HS).

26. A multistage automatic transmission having an input drive shaft (AN), an output drive shaft (AB), an transfer planetary gearset (VS), an main planetary gearset (HS), and at least first, second, third, fourth, fifth and sixth shifting elements (A to F), the transmission having the following features:

the transfer planetary gearset (VS) is a double planetary gearset;

an output element of the transfer planetary gearset (VS) rotates at a speed of rotation which is less than a speed of rotation of the input drive shaft (AN);

an input element of the transfer planetary gearset (VS) is continually connected to the input drive shaft (AN);

an element of the transfer planetary gearset (VS) is connected to a transmission housing of the transmission;

the main planetary gearset (HS) is a coupled planetary gearset with a plurality of input elements which are not coupled with one another and a single output element;

the output element of the main planetary gearset (HS) is continually connected with the output drive shaft (AB);

an input element (120) of the first shifting element (A) is connected with the output element of the transfer planetary gearset (VS);

an output element (130) of the first shifting element (A) is connected with a second input element of the main planetary gearset (HS);

an input element (220) of the second shifting element (B) is connected with the output element of the transfer planetary gearset (VS);

an output element (230) of the second shifting element (B) is connected with a first input element of the main planetary gearset (HS);

an input element (320) of the third shifting element (C) is connected with the transmission housing (GG);

an output element (330) of the third shifting element (C) is connected with one of the first input element of the main planetary gearset (HS) and one of another input element of the main planetary gearset (HS);

an input element of the fourth shifting element (D) is connected with the transmission housing (GG);

an output element (430) of the fourth shifting element (D) is connected with a third input element of the main planetary gearset (HS);

an input element (520) of the fifth shifting element (E) is connected with the input drive shaft (AN);

an output element (530) of the fifth shifting element (E) is connected with the third input element of the main planetary gearset (HS);

an input element (620) of the sixth shifting element (F) is connected with the input drive shaft (AN);

an output element (630) of the sixth shifting element (F) is connected with one of the first input element of the main planetary gearset (HS) and one of another input element of the main planetary gearset (HS);

for the transfer planetary gearset (VS), the following components are connected: a sun gear (S0_VS), a ring gear (HO_VS), as well as a coupled carrier (ST_VS) on which inner and outer planet gears (P1_VS, P2_VS) are rotationally fixed, whereby the inner planet gears (P1_VS) of the transfer planetary gearset (VS) mesh with the sun gear (SO_VS) and with the outer planet gears (P2_VS) of the transfer planetary gearset (VS);

the outer planet gears (P2_VS) of the transfer planetary gearset (VS) mesh with the inner planet gears (P1_VS) and with the ring gear (HO_VS) of the transfer planetary gearset (HS);

the carrier (ST_VS) of the transfer planetary gearset (VS) forms the input element of the transfer planetary gearset (VS) which input element is continually connected to the input drive shaft (AN);

the ring gear (HO_VS) of the transfer planetary gearset (VS) forms the output element of the transfer planetary gearset (VS) which is connected with the input elements of the main planetary gearset (HS), and the sun gear (SO_VS) of the transfer planetary gearset (VS) is rigidly fixed to the transmission housing (GG), and the main planetary gearset (HS) is constructed as a two-carrier, four shaft transmission, with two coupled single planetary gearsets, which include first and second sun gears, (S1_HS, S2_HS), first and second ring gears (H1_HS, H2_HS), a first carrier (ST1_HS), onto which are rotationally fixed first planet gears (PL_HS) as well as a coupled second carrier (ST2_HS) onto which is rotationally fixed inner and outer planet gears (PLi_HS, PLa_HS), whereby:

the first planet gears (PL_HS) of the main planetary gearset (HS) mesh with the first ring gear (H1_HS) and with the first sun gear (S1_HS) of an output-side of the planetary gearset (HS);

the inner planet gears (PLi_HS) of the main planetary gearset (HS) mesh with the outer planet gears (PLa_HS) and with the second sun gear (S2_HS) of the main planetary gearset (HS);

the outer planet gears (PLa_HS) of the main planetary gearset (HS) mesh with the inner planet gears (PLi_HS) and with the second ring gear (H2_HS) of the main planetary gearset (HS);

the first sun gear (S1_HS) and the coupled second carrier (ST2_HS) of the main planetary gearset (HS) are mutually connected together and form the first input element of the main planetary gearset (HS) and are connected to the output elements (230, 330, 630) of the second, the third and the sixth shifting element (B, C, F);

the second sun gear (S2_HS) of the main planetary gearset (HS) forms the second input element of the main planetary gearset (HS) and is connected to the output element (130) of the first shifting element (A);

the first carrier (ST1_HS) and the second ring gear (H2_HS) of the main planetary gearset (HS) are connected mutually together and thus form the third input element of the main planetary gearset (HS) and are connected with the output elements (430, 530) of the fourth and fifth shifting element (D, E), and the first ring gear (H1_HS) of the main planetary gearset (HS) forms the output element of the main planetary gearset and is connected to the output drive shaft (AB), wherein a servoapparatus (610), for activation of the sixth shifting element (F), continually rotates at the same rotational speed of the first input element of the main planetary gearset (HS).

* * * * *